US012728049B2

(12) United States Patent
Canavan et al.

(10) Patent No.: US 12,728,049 B2
(45) Date of Patent: Sep. 8, 2026

(54) DIRECTIONAL WHEEL LOCK ASSEMBLIES AND COTS HAVING DIRECTIONAL WHEEL LOCK ASSEMBLIES

(71) Applicant: Ferno-Washington, Inc., Wilmington, OH (US)

(72) Inventors: Donald J. Canavan, Morrow, OH (US); John A. Burnett, Lebanon, OH (US); Cody A. Cooper, South Charleston, OH (US); Robert Louis Potak, Medina, OH (US); Michael J. Burrell, Xenia, OH (US); Jacob L. Cartner, Clarksville, OH (US); Jonathan R. Abernathy, Latham, OH (US); Randall T. Baughman, Greenfield, OH (US); Charles S. Chambliss, Leesburg, OH (US); Qusai F. Takruri, Dayton, OH (US); William H. Benedict, Jamestown, OH (US)

(73) Assignee: FERNO WASHINGTON, INC., Wilmington, OH (US)

( * ) Notice: Subject to any disclaimer, the term of this patent is extended or adjusted under 35 U.S.C. 154(b) by 315 days.

(21) Appl. No.: 18/640,739

(22) Filed: Apr. 19, 2024

(65) Prior Publication Data

US 2024/0350331 A1 Oct. 24, 2024

Related U.S. Application Data

(60) Provisional application No. 63/547,208, filed on Nov. 3, 2023, provisional application No. 63/460,690, filed on Apr. 20, 2023.

(51) Int. Cl.

*A61G 1/02* (2006.01)
*A61G 1/013* (2006.01)

(Continued)

(52) U.S. Cl.

CPC ............ *A61G 1/048* (2013.01); *A61G 1/013* (2013.01); *A61G 1/0243* (2013.01);

(Continued)

(58) Field of Classification Search

CPC .... A61G 1/048; A61G 1/0243; A61G 1/0287; A61G 1/04; A61G 1/06; A61G 3/08; H01R 13/629

(Continued)

(56) References Cited

U.S. PATENT DOCUMENTS

| | | | | |
|---|---|---|---|---|
| 8,156,586 B2 * | 4/2012 | Reed | A61G 1/0287 | 296/20 |
| 8,789,662 B2 * | 7/2014 | Childs | A61G 7/05 | 16/35 R |

(Continued)

FOREIGN PATENT DOCUMENTS

GB 2390062 A 12/2003

OTHER PUBLICATIONS

International Search Report and Written Opinion, pertaining to International Patent Application No. PCT/US2024/025486, dated Sep. 16, 2024 (18 pages).

*Primary Examiner* — Christopher P Schwartz
(74) *Attorney, Agent, or Firm* — DINSMORE & SHOHL LLP

(57) ABSTRACT

A directional wheel lock assembly includes, a pedal, a linking rod coupled to the pedal such that the pedal is configured to be offset from a wheel, an actuation plunger comprising an upper opening, an actuation pin disposed through the upper opening of the actuator plunger, wherein the linking rod is coupled to an end of the actuation pin. The directional wheel lock assembly further includes an actuation plate having a recess and an opening within the recess, wherein the actuation plunger is positioned within the open- (Continued)

ing, and a wheel lock plate comprising a lock opening. The wheel lock plate is operable to be coupled to a wheel.

19 Claims, 54 Drawing Sheets

(51) Int. Cl.

| | |
|---|---|
| ***A61G 1/04*** | (2006.01) |
| ***A61G 1/048*** | (2006.01) |
| ***A61G 1/06*** | (2006.01) |
| ***A61G 3/08*** | (2006.01) |
| ***H01R 13/629*** | (2006.01) |
| ***H02J 7/70*** | (2026.01) |

(52) U.S. Cl.
CPC ............. *A61G 1/0287* (2013.01); *A61G 1/04* (2013.01); *A61G 1/06* (2013.01); *A61G 3/08* (2013.01); *H01R 13/629* (2013.01); *H02J 7/70* (2026.01)

(58) Field of Classification Search
USPC .............................. 5/611; 16/35 R; 188/1.12
See application file for complete search history.

(56) References Cited

U.S. PATENT DOCUMENTS

| | | | | |
|---|---|---|---|---|
| 10,555,866 | B2 * | 2/2020 | Pan .......................... | A61H 3/04 |
| 2006/0265807 | A1 | 11/2006 | Choy et al. | |
| 2017/0252235 | A1 | 9/2017 | Valentino et al. | |
| 2024/0350332 | A1 * | 10/2024 | Canavan .............. | A61G 1/0243 |
| 2024/0350333 | A1 * | 10/2024 | Canavan .............. | A61G 1/0243 |
| 2024/0356351 | A1 * | 10/2024 | Canavan .............. | A61G 1/0243 |

* cited by examiner

163
X
Z
Y
176-1
175
176-1
172
176-2
173
159
P
174
176-2
175
169
P
172
171-1
159
157
176-1

166
176-1
176-7
178
176-8
165-8
164-9
164-3
164-8
165-6
165-1
167-3
167-3
164-7
164-5
164-4

DIRECTIONAL WHEEL LOCK ASSEMBLIES AND COTS HAVING DIRECTIONAL WHEEL LOCK ASSEMBLIES

CROSS-REFERENCE TO RELATED APPLICATIONS

This application claims priority to U.S. Provisional Application No. 63/460,690 entitled "Emergency Cots" filed on Apr. 20, 2023 and U.S. Provisional Application No. 63/547,208 entitled "Emergency Cots" filed on Nov. 3, 2023, the contents of their entirety of which are incorporated by reference herein.

BACKGROUND

Cots, such as emergency cots for supporting and transporting patients, may include caster wheels that not only rotate but also swivel to provide easy turning. Some cots may include a wheel lock that prevents a swivel motion of one or more wheels but still allows rotation. These wheel locks may be provided by a pedal that is actuated by a user. However, present cots have a placement of one or more pedals that are aligned with one or more wheels, which may be difficult for a user to access with his or her foot.

Accordingly, alternative wheel lock assemblies and cots having wheel locks may be desired.

SUMMARY

In one embodiment, a directional wheel lock assembly includes, a pedal, a linking rod coupled to the pedal such that the pedal is configured to be offset from a wheel, an actuation plunger comprising an upper opening, an actuation pin disposed through the upper opening of the actuator plunger, wherein the linking rod is coupled to an end of the actuation pin. The directional wheel lock assembly further includes an actuation plate having a recess and an opening within the recess, wherein the actuation plunger is positioned within the opening, and a wheel lock plate comprising a lock opening. The wheel lock plate is operable to be coupled to a wheel. Actuation of the pedal into a locked position pushes the linking rod such that the linking rod rotates the actuation pin, which causes the actuation pin to drop into the recess and lower the actuation plunger into the lock opening of a wheel lock plate to prevent a swivel motion of the wheel. Actuation of the pedal into an unlocked position pulls the linking rod such that the linking rod rotates the actuation pin, which causes the actuation pin to raise out of the recess and raise the actuation plunger from the lock opening of the wheel lock plate to allow the swivel motion of the wheel.

In another embodiment, a wheeled device includes a frame, a base frame coupled to the frame, a first pair of wheels coupled to the frame and a second pair of wheels coupled to the frame, and a directional wheel lock assembly. The directional wheel lock assembly includes a pedal, a linking rod coupled to the pedal such that the pedal is configured to be offset from a wheel, an actuation plunger having an upper opening, an actuation pin disposed through the upper opening of the actuator plunger, wherein the linking rod is coupled to an end of the actuation pin, an actuation plate having a recess and an opening within the recess, wherein the actuation plunger is positioned within the opening, and a wheel lock plate having a lock opening. The wheel lock plate is operable to be coupled to a wheel. Actuation of the pedal into a locked position pushes the linking rod such that the linking rod rotates the actuation pin, which causes the actuation pin to drop into the recess and lower the actuation plunger into the lock opening of a wheel lock plate to prevent a swivel motion of the wheel. Actuation of the pedal into an unlocked position pulls the linking rod such that the linking rod rotates the actuation pin, which causes the actuation pin to raise out of the recess and raise the actuation plunger from the lock opening of the wheel lock plate to allow the swivel motion of the wheel.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein are directed to improved cots, such as emergency cots. The cots described herein have improved functionalities over existing cots, such as handle assemblies and side rails that provide the ability to change the length of the cot with one hand actuation, and improved fastener post assemblies for improved secure fastening between a cot and a fastener of a vehicle, such as an emergency vehicle (e.g., an ambulance), charging assemblies for charging a cot battery using a vehicle battery, and directional wheel locks for improved ergonomics for locking wheels of a cot.

Figure 1:
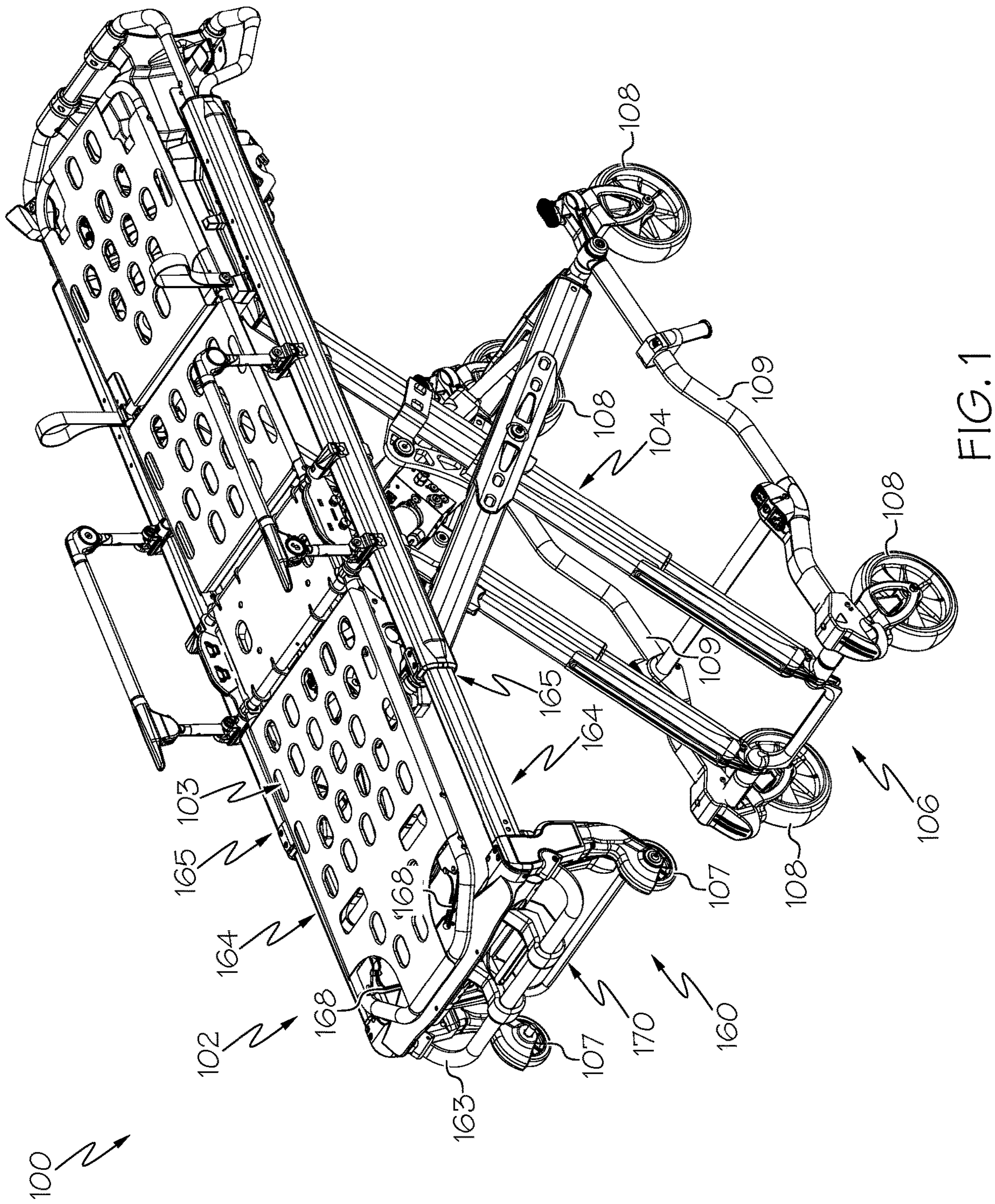
FIG. 1 depicts a perspective view of an example cot according to one or more embodiments described and illustrated herein.

Referring now to FIG. 1, an example cot 100 (also referred to herein as a patient support device) according to one or more embodiments is schematically illustrated. The cot 100 is operable to transport a patient, such as a patient at the site of an emergency. The patient may be placed on the cot 100, wheeled toward an emergency vehicle, and then loaded into a cargo area of the emergency vehicle to be transported to a hospital or other health care facility. At the hospital, the cot 100 may be unloaded from the cargo area of the emergency vehicle and the patient wheeled to a location within the hospital or other health care facility.

The cot 100 generally includes a base 106 having four wheels 108. The base 106 of the example cot 100 further includes two members 109 having a bent shape providing clearance at an elevation higher from the ground than the wheel center and to accommodate a locking post oriented either upwards or downwards from each member 109 centerline. The wheels 108 are caster wheels that can swivel in addition to rotating. The wheels 108 may be large in diameter such that the cot 100 can traverse rough or uneven terrain without disturbing the patient. As a non-limiting example, the diameter of the wheels may be within a range of 190 mm to 205 mm, including endpoints.

The cot 100 further includes a support frame 102 that is coupled to the base 106 by an X-frame 104 comprising two pairs of legs. Two of the four legs of the X-frame 104 are operable to extend and retract by an actuator to both extend and collapse the cot 100. When the legs of the X-frame 104 are extended, the base 106 is moved further away from the support frame 102. When the legs of the X-frame 104 are retracted, the base 106 is brought closer to the support frame 102.

The support frame 102 includes two side rails each comprising a first rail 164 and a second rail 165. As described in more detail below, the first rail 164 is configured to slide in and out of the second rail 165 to lengthen or shorten the cot 100. A patient bed 103 is attached to the support frame 102. The patient bed 103 may have different sections that can tilt up and down. For example, a back portion may be tilted up to place the patient in a seated position by pulling handle actuators 168 and pushing the back portion of the patient bed 103 upward.

Figure 2:
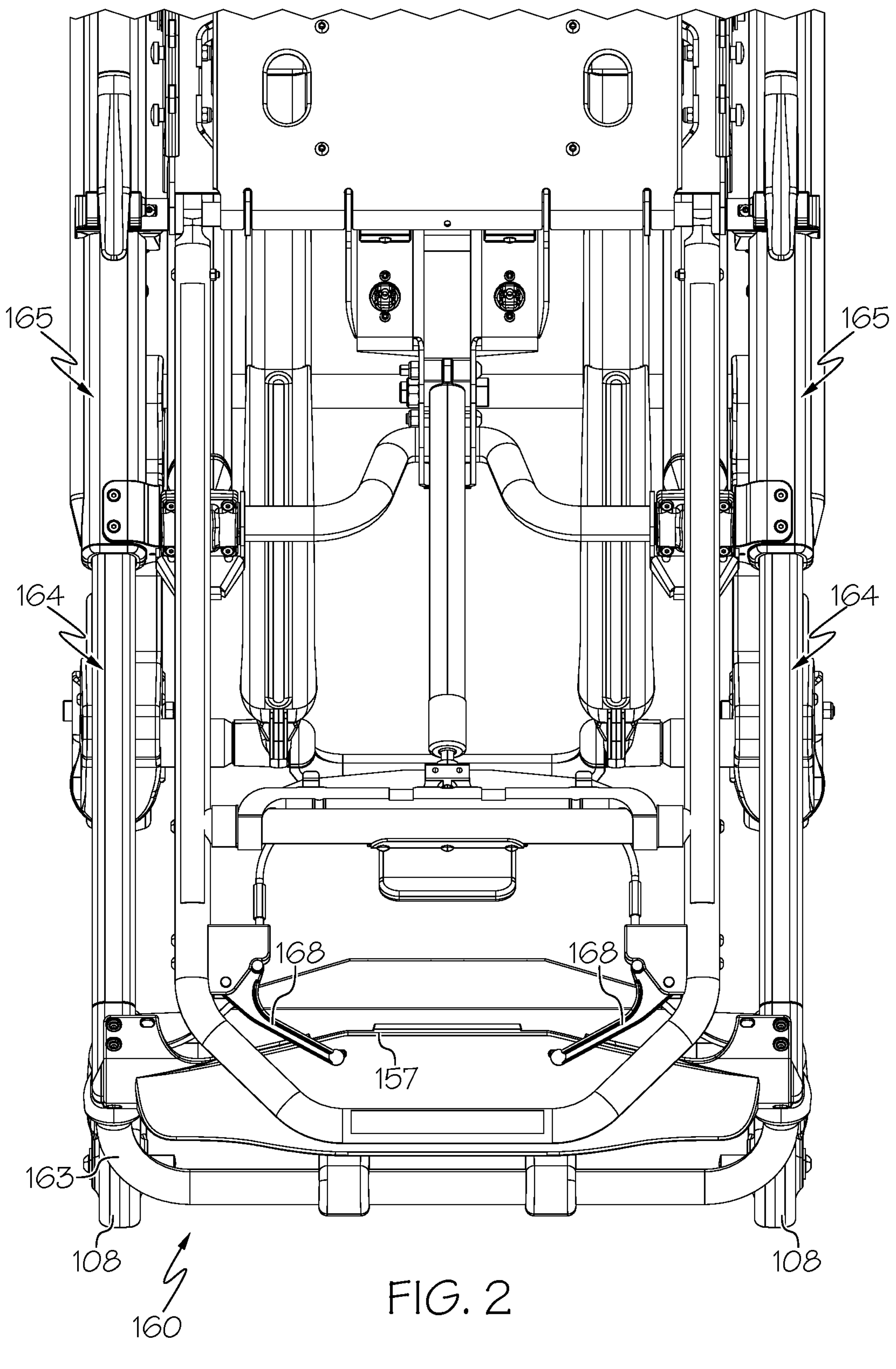
FIG. 2 depicts a partial top view of the cot of FIG. 1 according to one or more embodiments described and illustrated herein.
Figure 3:
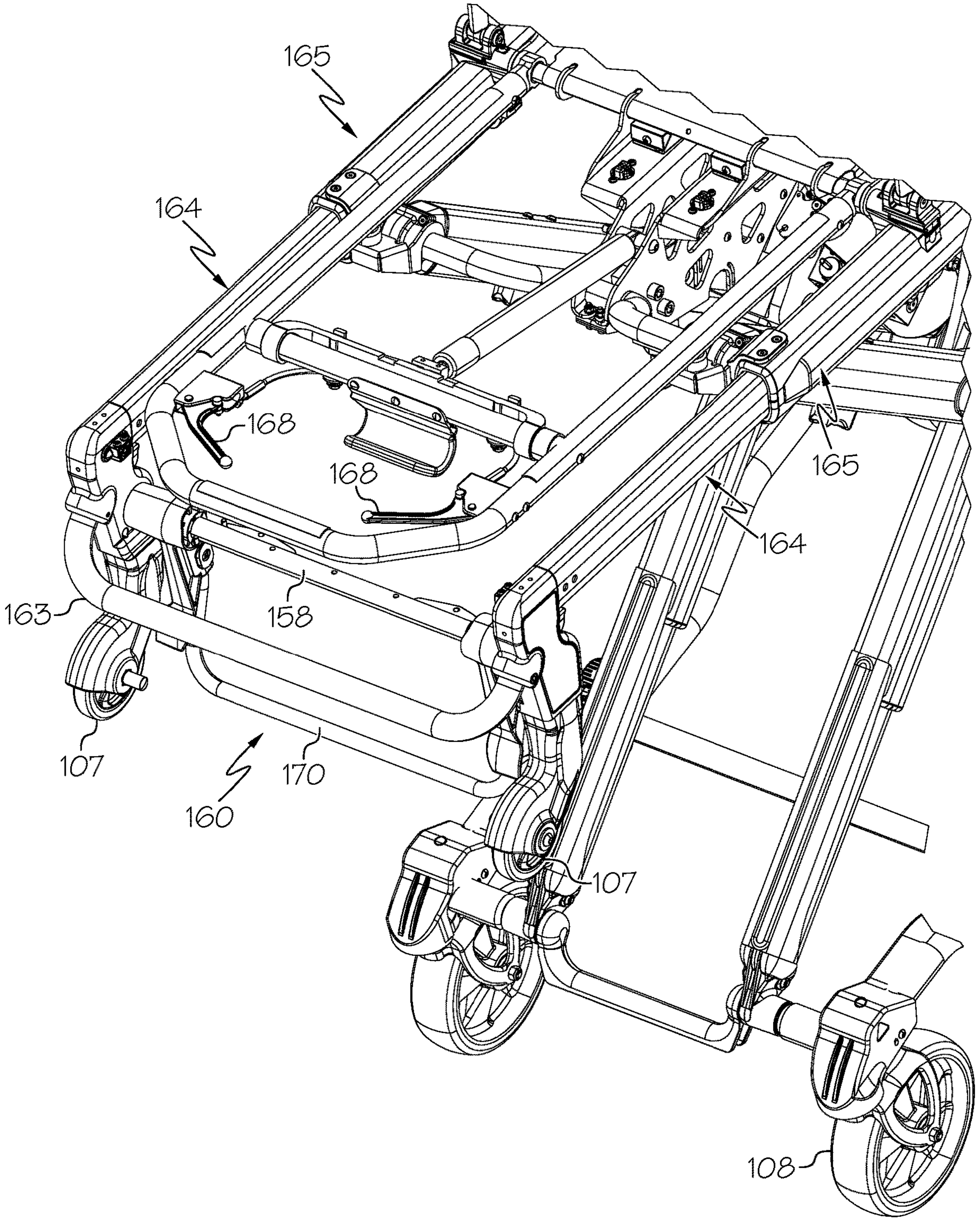
FIG. 3 depicts a partial perspective view of the cot of FIG. 1 illustrating an example handle assembly according to one or more embodiments described and illustrated herein.

Referring to FIGS. 1-3, the cot includes a head portion 160 that is proximate to a patient's head. The head portion 160 includes two load wheels 107 that support the head portion 160 of the cot 100 when it is being loaded into the cargo area of an emergency vehicle. The head portion 160 may further include a bail 170 that limits the translation of the cot 100 along the floor of the emergency vehicle, thereby selectively preventing the cot 100 from being unloaded from the emergency vehicle.

The head portion 160 further includes a bar 163 and a crossbar 157 that couple the two side rails of the support frame 102 together. As stated above, in some embodiments, the length of the cot 100 may be adjusted by extending the head portion 160 out away from the patient bed 103, or pushing the head portion 160 toward the patient bed 103.

Figure 4:
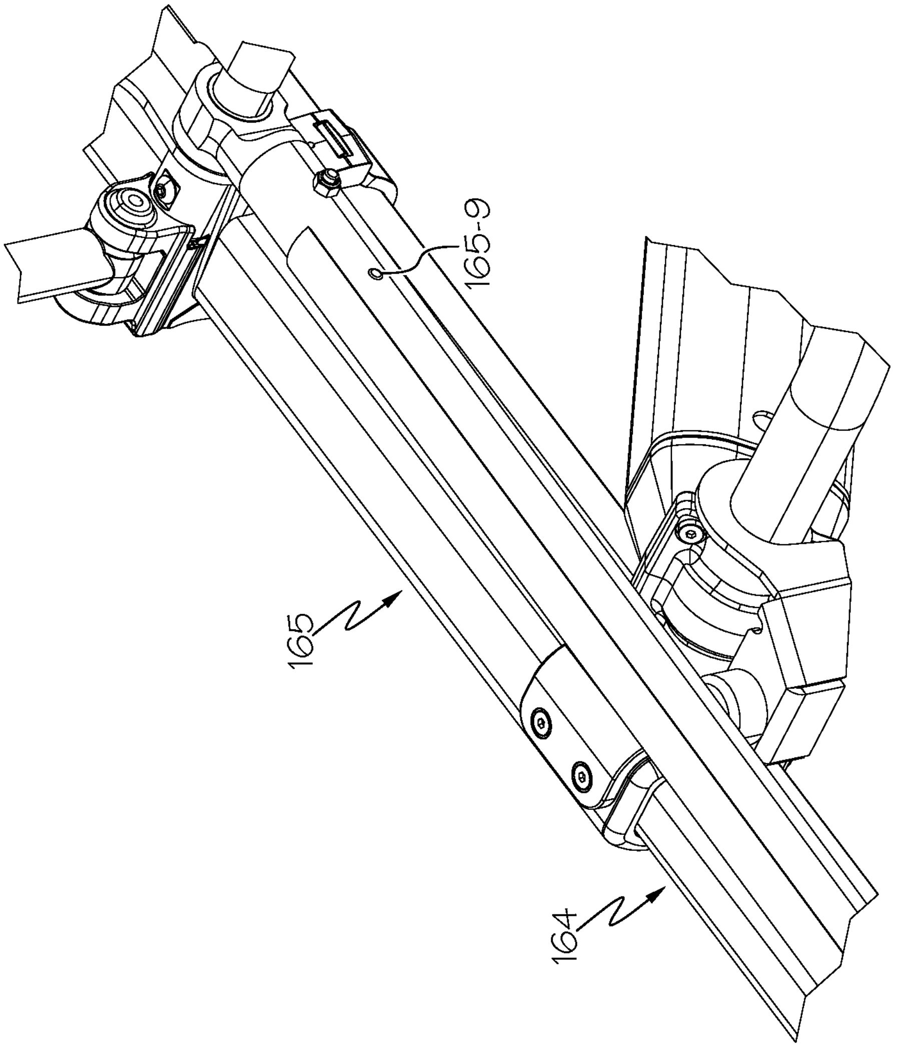
FIG. 4 depicts a perspective view of a side rail of the cot of FIG. 1 according to one or more embodiments described and illustrated herein.

Referring to FIG. 4, the second rail 165 may include a plurality of lock openings 165-9 corresponding with different lengths of the cot 100. A locking linkage assembly 166 (see FIGS. 5D-5I) is disposed within the second rail 165. As described in more detail below, a distal end of the locking linkage assembly 166 includes a locking pin 165-3 that is disposed within one of the lock openings 165-9 to lock the position of the first rail 164 with respect to the second rail 165 (see FIG. 5J). When a handle is actuated, the locking pin 165-3 is pulled out of the lock opening 165-9 so that the first rail 164 can be translated within the second rail 165.

Figure 5A:
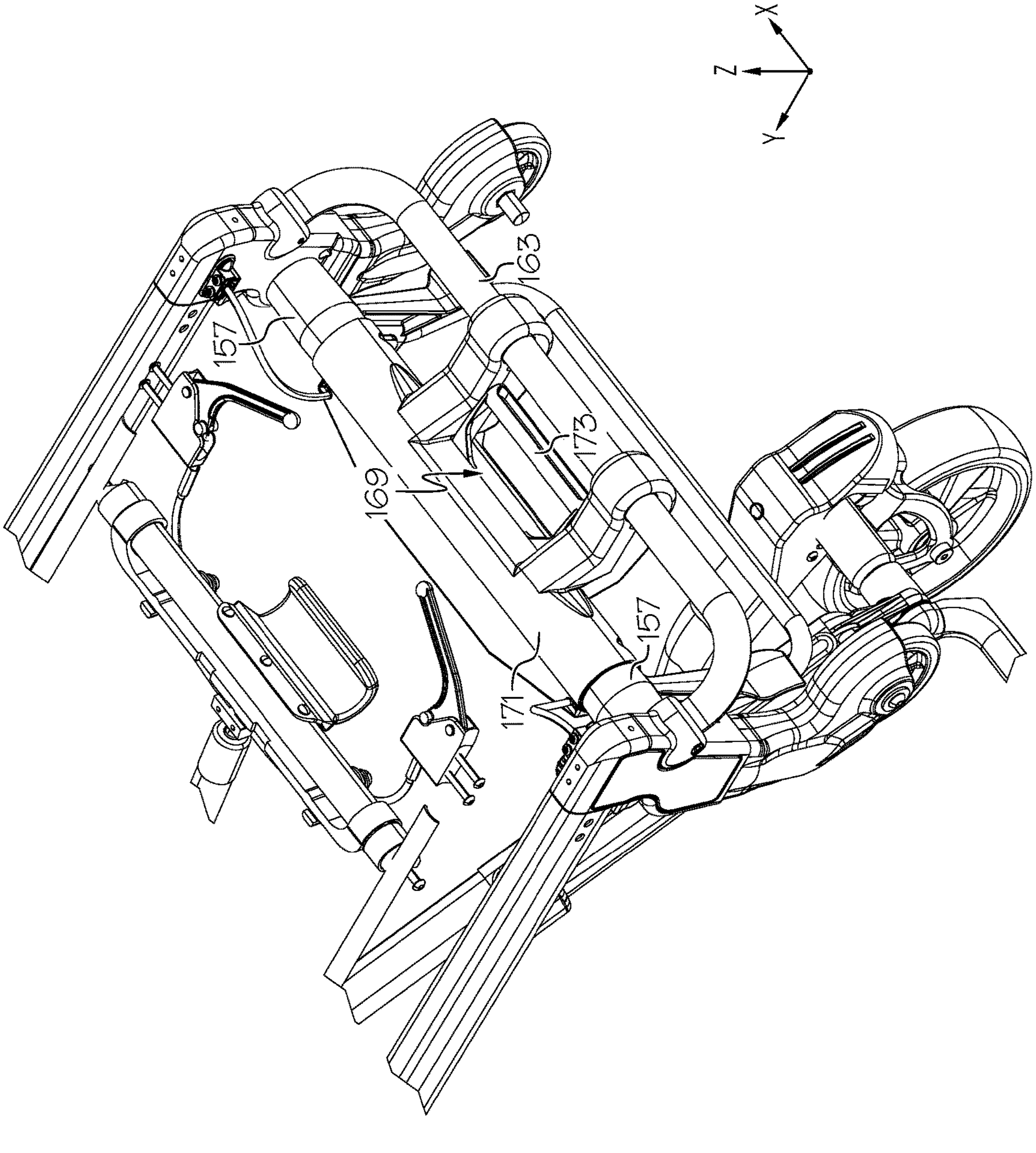
FIG. 5A depicts close-up perspective view of an example handle assembly of the cot of FIG. 1 according to one or more embodiments described and illustrated herein.
Figure 5B:
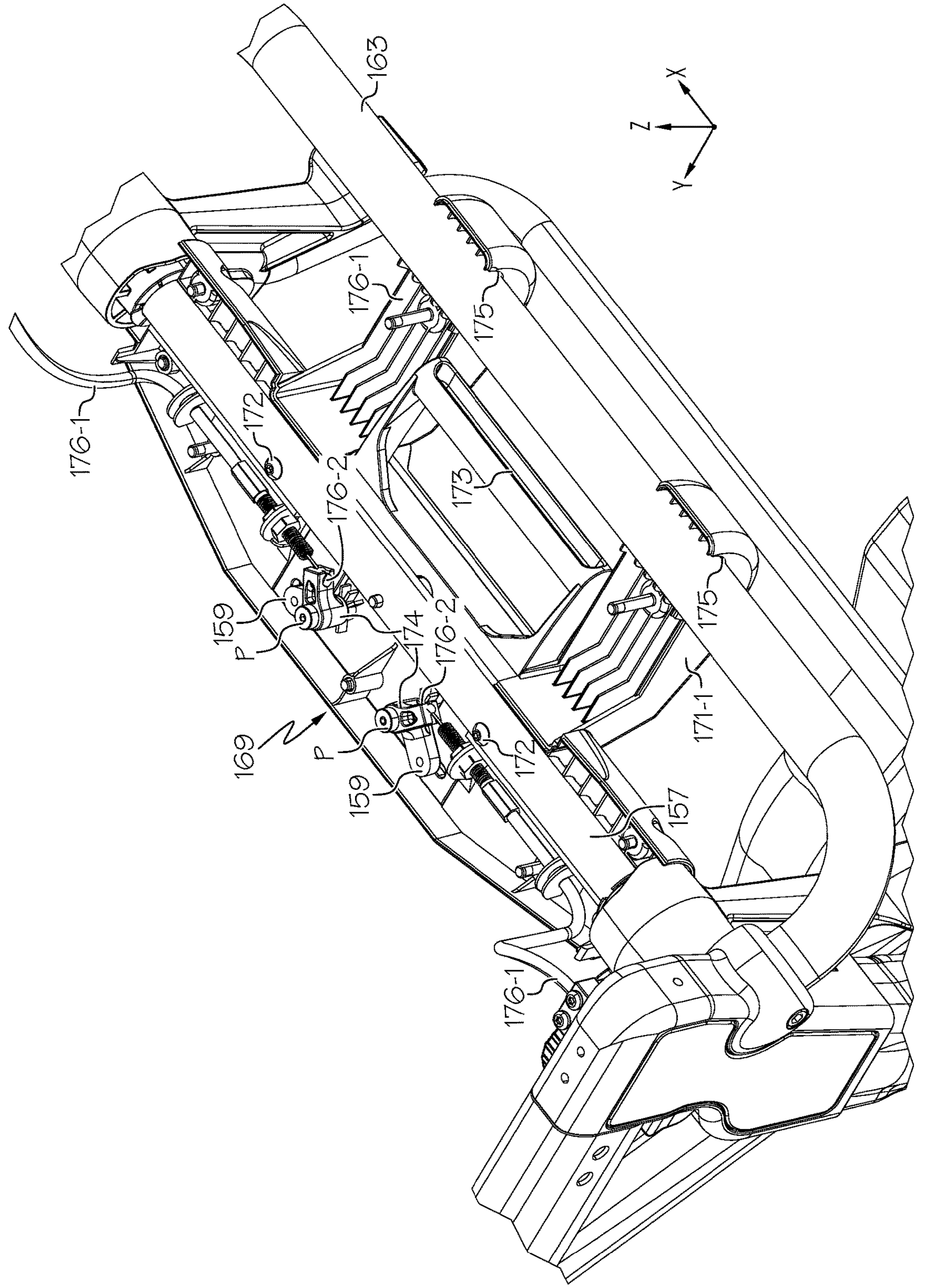
FIG. 5B depicts another close-up perspective view of an example handle assembly of the cot of FIG. 1 according to one or more embodiments described and illustrated herein.

Referring now to FIGS. 5A and 5B, an improved design of a handle assembly 169 and locking assembly 166 (see FIGS. 5D-5I) for unlocking the first rails 164 from the second rails 165 for lengthening and shortening the cot 100 is illustrated. The handle assembly 169 includes a handle body 171 that is attached to the bar 163 at locations 175. The handle body 171 may comprise an upper shell and a lower shell that are mated together to surround the bar 163 and the crossbar 157. FIG. 5A illustrates the handle body 171 including both shells, while FIG. 5B illustrates only the lower shell of the handle body 171. The upper shell may act as a cover for the components maintained within the handle body 171.

The locations 175 at which the handle body 171 is attached to the bar 163 are defined by arms 171-1 having an inner surface adapted to receive the bar 163. The handle body 171 is attached to the crossbar 157 at locations 172, which is configured as a feature operable to receive the crossbar 157. Fasteners, such as screws, may be used to attach the handle body 171 to the crossbar 157 at locations 172.

A handle actuator 173 is positioned between the two arms 171-1 of the handle body 171, and is coupled to the handle body 171 such that it translates back and forth along direction the Y axis when pulled and released by a user. The handle actuator 173 is centrally positioned with respect to the first rails 164 for easy access by the user operating the cot 100. When the user pulls the handle actuator 173 toward the bar 163, the locking pins 165-3 are withdrawn from the lock openings 165-9 of the second rail 165, which allows the first rail 164 to be translated within the second rail 165, thereby allowing the user to adjust the length of the cot.

Figure 5C:
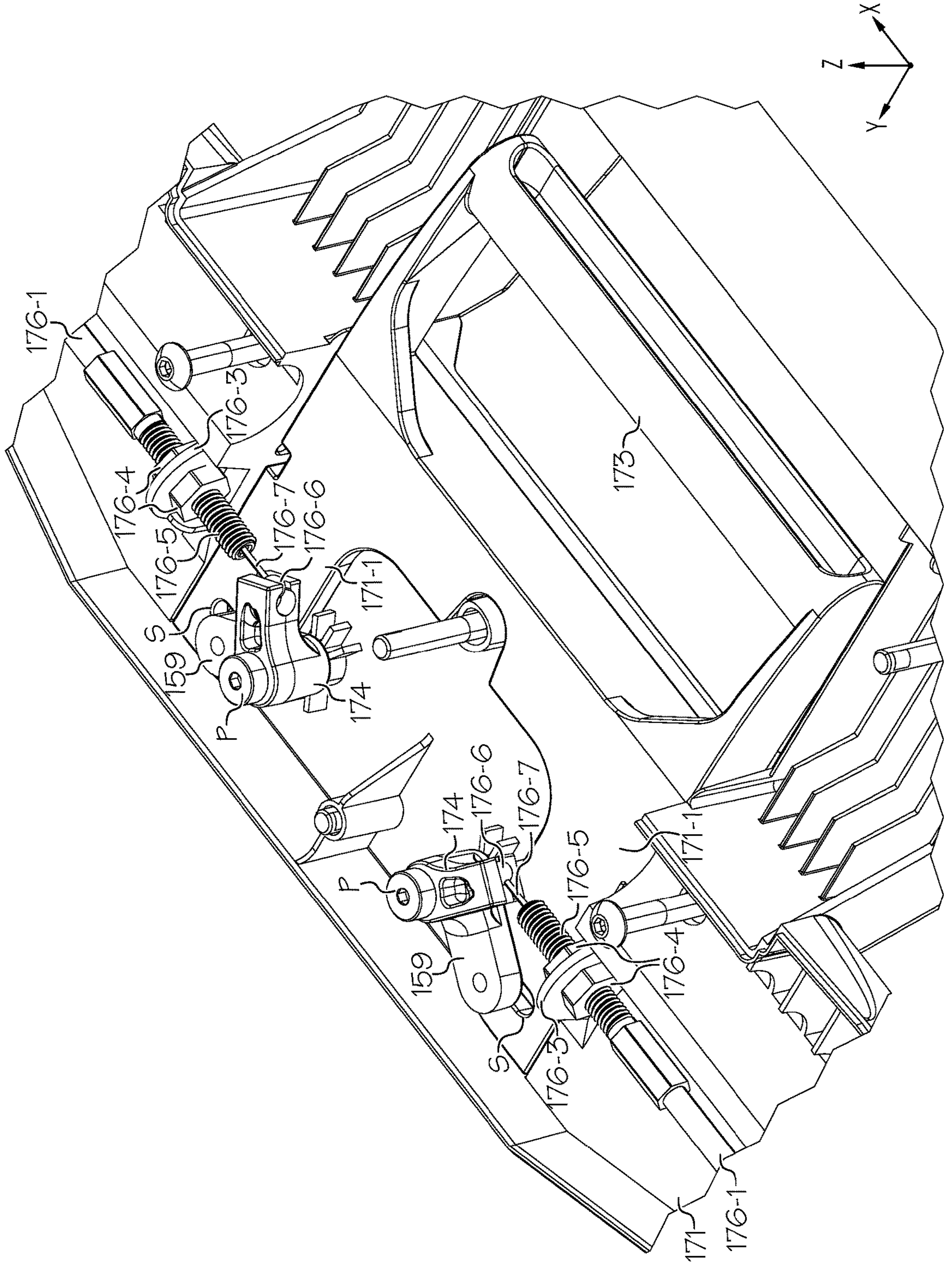
FIG. 5C depicts another close-up perspective view of an example handle assembly of the cot of FIG. 1 according to one or more embodiments described and illustrated herein.

Referring now to FIGS. 5B and 5C, the handle assembly 169 further includes two first link arms 174 each having a first end coupled to a pivot point P and a second end coupled to a cable that is further coupled to the locking linkage assembly. The handle assembly 169 also includes second link arms 159 coupled to the pivot point P, the two first link arms 174 and the handle actuator 173. A portion of the second link arms 159 is disposed with slots S of a distal end of the handle actuator 173 to allow rotation of the second link arms 159 when the handle actuator 173 is pulled by the user. For example, each of the second link arms 159 may include a peg that is disposed within the slots S of the handle actuator 173. In some embodiments, the first link arm 174 and the second link arm 159 are formed by a single, unitary component. The first link arm 174 and the second link arm 159 are collectively referred to herein as a "link."

The handle assembly 169 includes two actuator assemblies 176-1 each including a cable 176-7 that is terminated by a ball joint 176-6. The ball joint 176-6 is disposed within a slot or groove of a first link arm 174. In the illustrated embodiment, the actuator assemblies 176-1 are each secured to the handle body 171 by a mounting bracket 176-3 extending from a floor of the handle body 171. The mounting bracket 176-3 has an opening through which the actuator assembly 176-1 is disposed. The actuator assembly 176-1 of the illustrated embodiment includes a threaded end 176-5, and is secured to the mounting bracket 176-3 by nuts 176-4. The cable 176-7 is free to translate within the jacket of the actuator assembly 176-1. It should be understood that in other embodiments the actuator assembly 176-1 does not include a cable but rather other components capable of extending and retracting a distal device, such as a series of linkages or a elastic material, for example.

Pulling the handle actuator 173 towards the bar 163 rotates the second link arms 159 about the pivot point P toward the crossbar 157, and also rotates the first link arms 174 toward one another about the pivot point P, which pulls the cables 176 toward one another. Pulling the cables 176 toward one another pulls the locking pin 165-3 out of the lock opening 165-9, as described in more detail below. Releasing the handle actuator 173 causes it to translate away from the bar 163 to return to its nominal, unactuated position, which in turn rotates the first link arms 174 and the second link arms 159 to their nominal unactuated positions to remove the pulling force on the cables 176 and push the locking pins 165-3 into respective openings 165-9.

Figure 5D:
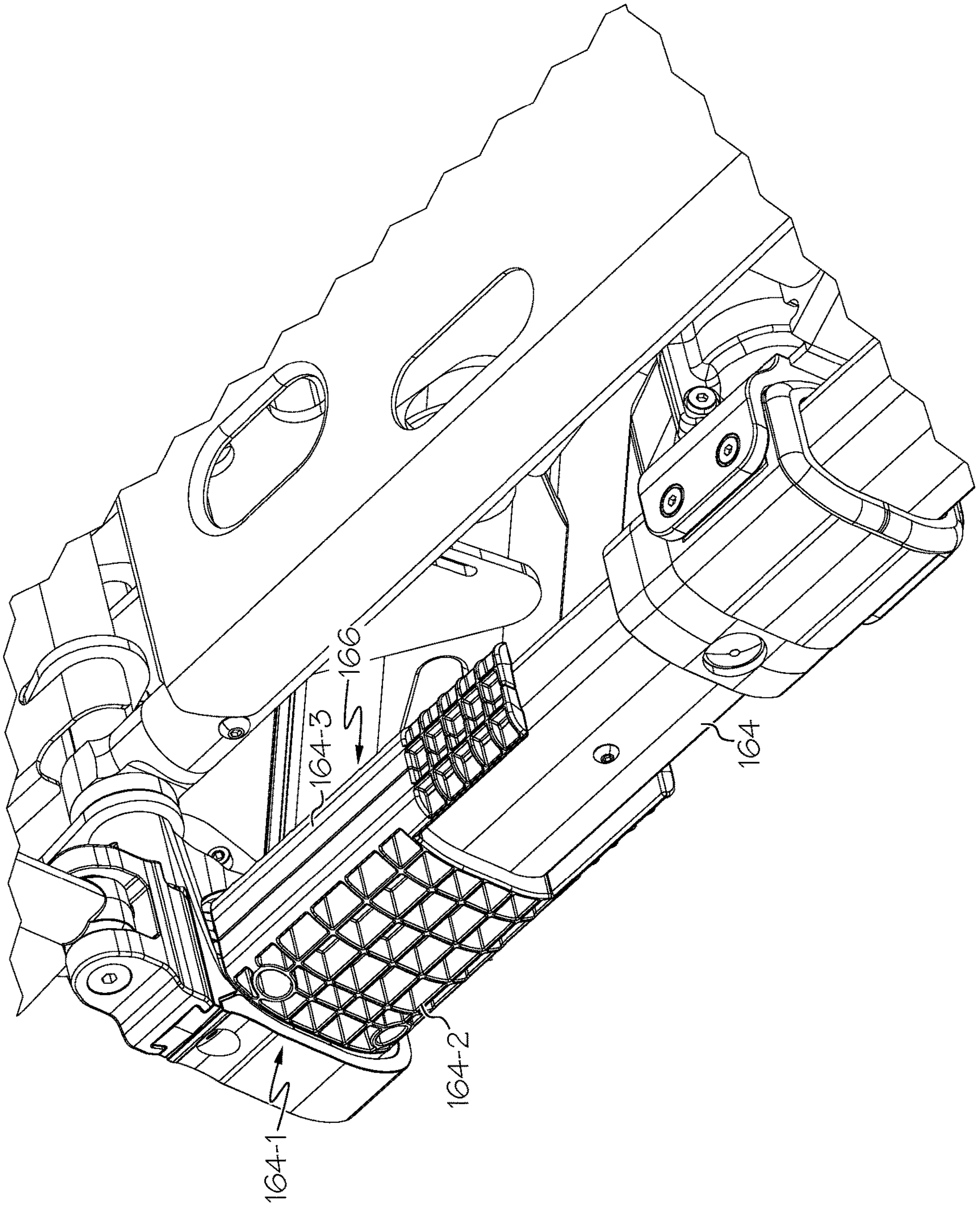
FIG. 5D illustrates a perspective view of a side rail of the cot of FIG. 1 according to one or more embodiments described and illustrated herein.
Figure 5E:
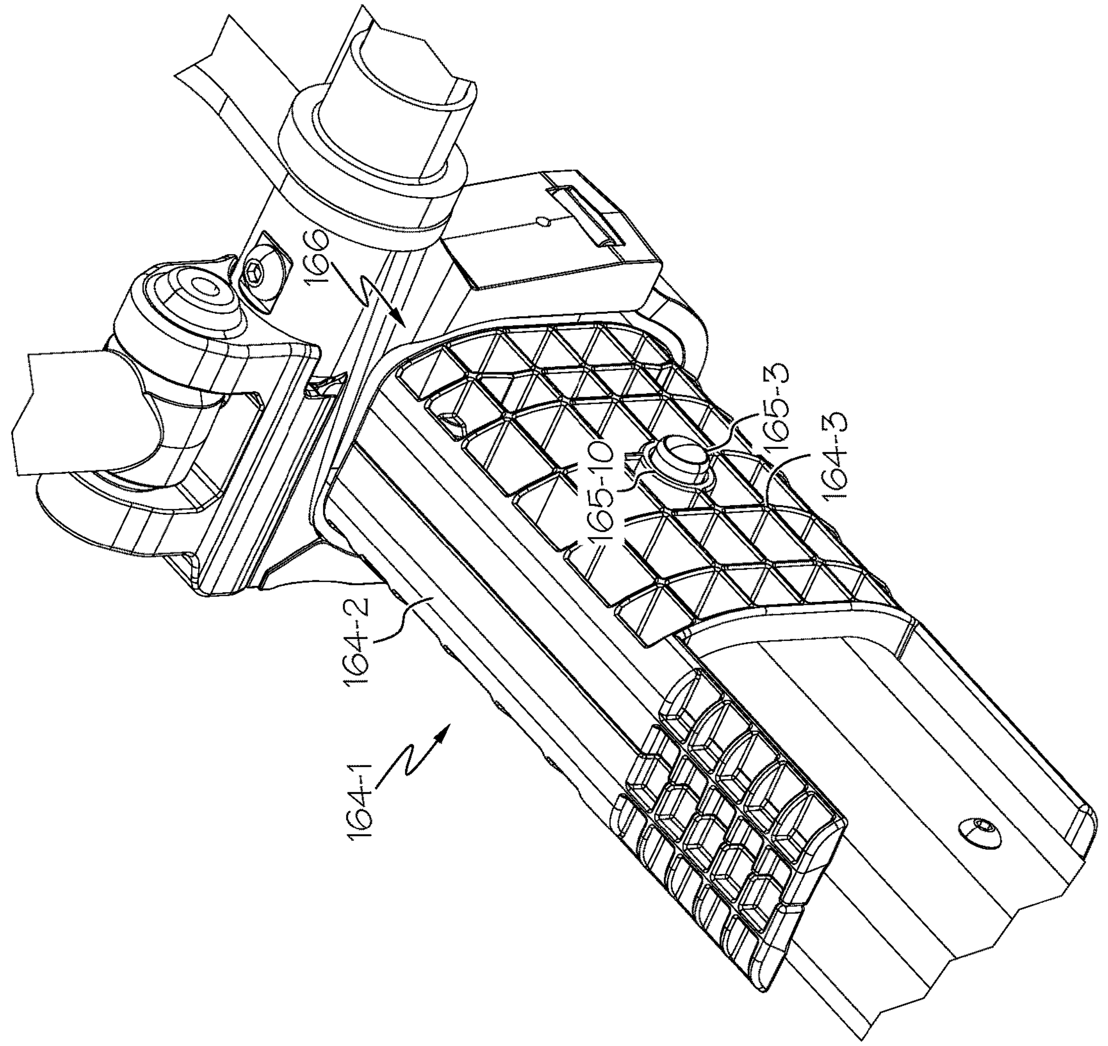
FIG. 5E illustrates another perspective view of a side rail of the cot of FIG. 1 according to one or more embodiments described and illustrated herein.

Referring now to FIGS. 5D and 5E, a locking linkage assembly 166 at the distal end of a first rail 164 is illustrated. It is noted that the second rail 165 is not shown in FIGS. 5D and 5E to show the locking linkage assembly 166. The locking linkage assembly 166 includes a linkage housing 164-1 that includes a first half 164-2 and a second half 164-3 that surround the distal end of the first rail 164. The linkage housing 164-1 may be fabricated from molded plastic, for example. It is sized so as to be able to translate within the second rail 165. As shown in FIG. 5E, the second half 164-3 has an opening 165-10 through which the locking pin 165-3 extends.

Figure 5F:
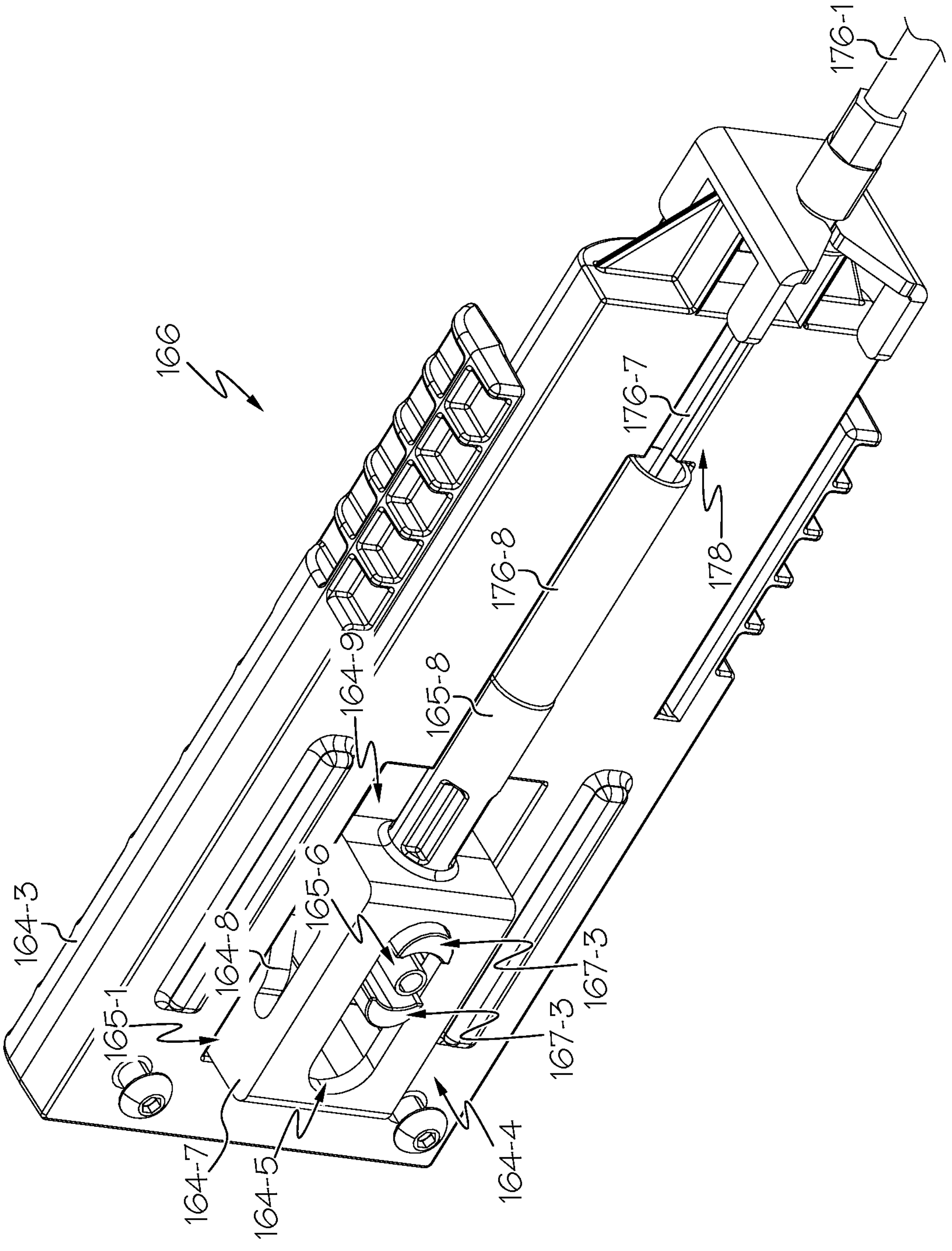
FIG. 5F illustrates a perspective of internal components of a side rail of the cot of FIG. 1 according to one or more embodiments described and illustrated herein.

FIG. 5F illustrates a perspective view of the locking linkage assembly 166 with the first half 164-2 removed to reveal components maintained within the linkage housing 164-1. The cable 176-7 is positioned within a channel 178 of the second half 164-3 (as well as the first half 164-2, not shown) and terminates within a coupler 165-8. The second half 164-3 includes a recess 164-9 in which a slider body 164-4 is positioned. The recess 164-9 is sized so that the slider body 164-4 can translate back and forth therein. In embodiments, the coupler 165-8 is integral with the slider body 164-4 such that the coupler 165-8 extends from a side surface of the slider body 164-4. The locking linkage assembly 166 further includes a sleeve 176-8 through which the cable 176-7 is disposed. The coupler 165-8 is operable to slide back and forth along the sleeve 176-8 as the user activates and deactivates the handle actuator 173.

The slider body 164-4 further includes a longitudinal slot 164-5 that receives the locking pin 165-3, a cross-pin 165-4, a guide 165-6, and a pin holder body 167. The slot longitudinal slot 165-5 enables the slider body 164-4 to move back and forth with respect to the locking pin 165-3, the cross-pin 165-4, the guide 165-6, and the pin holder body 167.

Figure 5G:
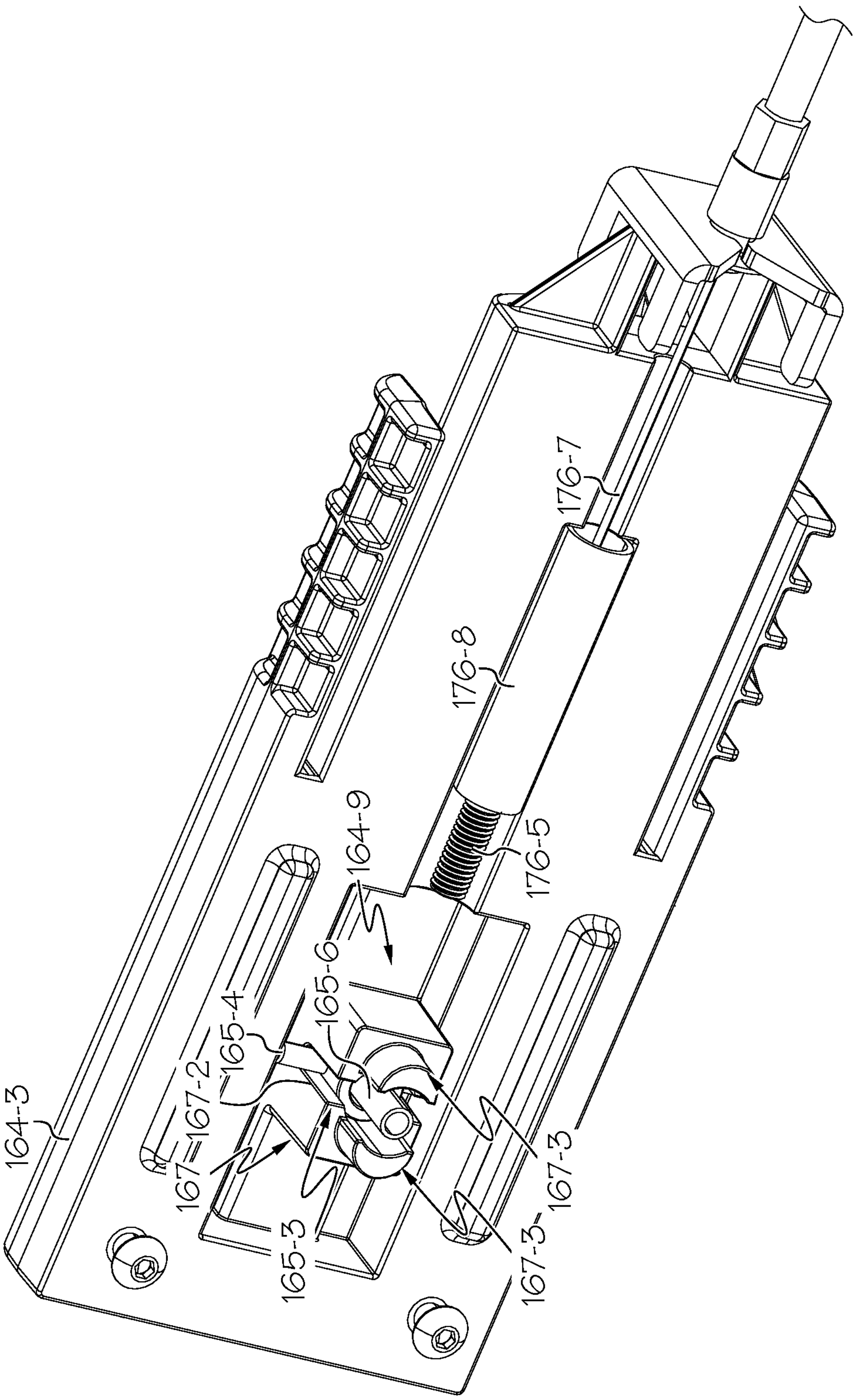
FIG. 5G illustrates another perspective of internal components of a side rail of the cot of FIG. 1 according to one or more embodiments described and illustrated herein.

FIG. 5G illustrates the locking linkage assembly 166 with the slider body 164-4 removed. The pin holder body 167 is integral with the second half 164-3 of the housing 164-1. Thus, the pin holder body 167 may be a molded feature of the second half 164-3 of the housing 164-1. The pin holder body 167 may be centrally disposed within the recess 164-9. The cable 176-7 is terminated by a coupling end 176-5 that has a threaded portion. The coupler 165-8 includes a threaded portion (not shown) that receives the threaded coupling end 176-5 of the cable 176-7 to affix the cable 176-7 to the coupler 165-8.

Figure 5H:
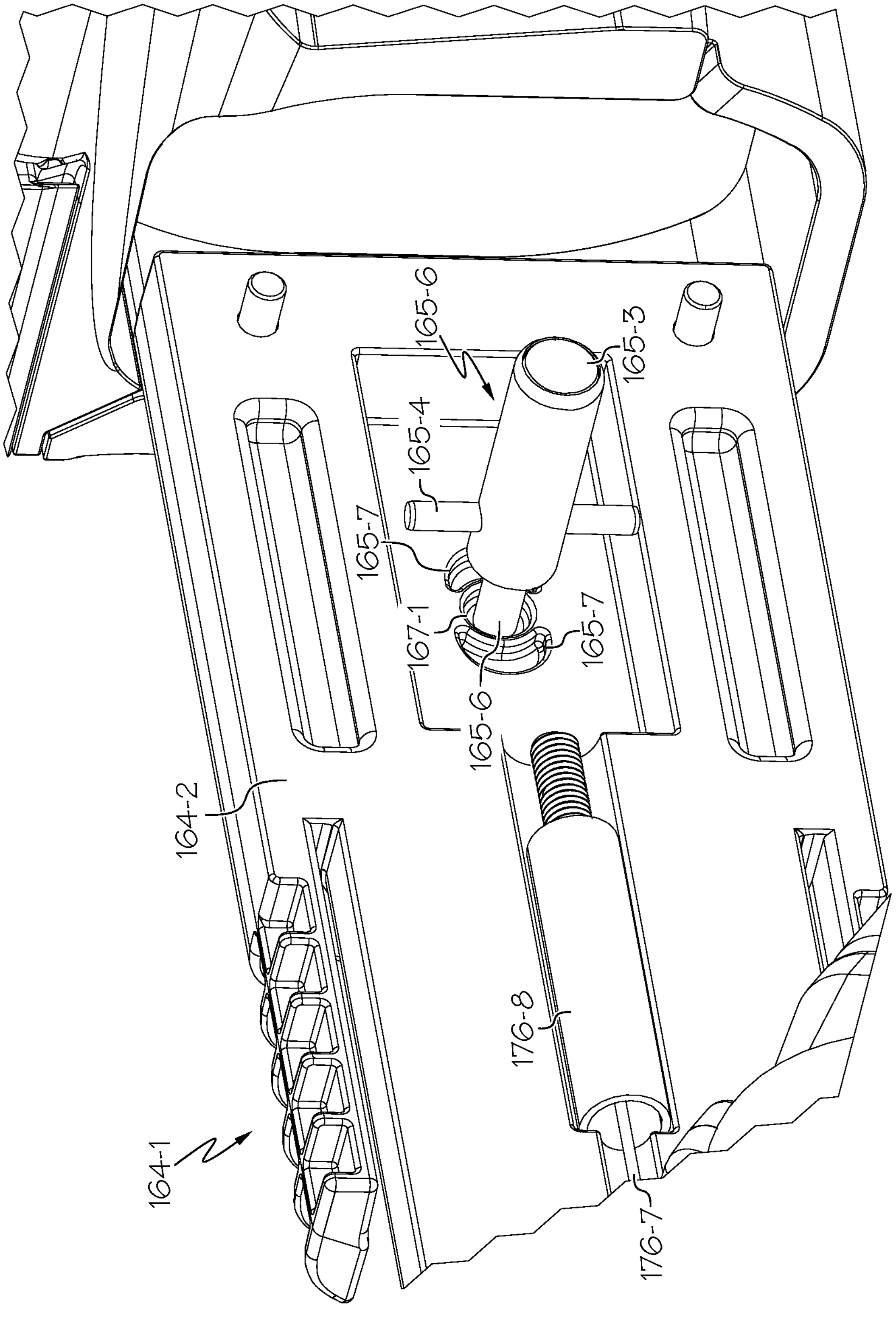
FIG. 5H illustrates another perspective of internal components of a side rail of the cot of FIG. 1 according to one or more embodiments described and illustrated herein.

The pin holder body 167 has at least one slot 167-2 in which the cross-pin 165-4 of the locking pin 165-3 is positioned. The example pin holder body 167 also includes two shroud portions 167-3 that surround the guide 165-6. As shown in FIG. 5H, the guide 165-6 is operable to be positioned within a guide opening 167-1 of the first half 164-2 of the housing 164-1. The guide 165-6 is also inserted into a hollow cavity of the locking pin 165-3 such that the locking pin 165-3 is operable to translate on the guide 165-6. The first half 164-2 of the housing also includes shroud recesses 165-7 that receive shroud portions 167-3 of the second half 164-3 when the first half 164-2 is coupled to the second half 164-3 of the housing 164-1. A biasing spring may be disposed on the guide 165-6 between an inner surface of the first half 164-2 and an end of the locking pin 165-3. The biasing spring biases the locking pin 165-3 in an extended position such that it returns to the extended position when the handle actuator is released by the user.

Figure 5I:
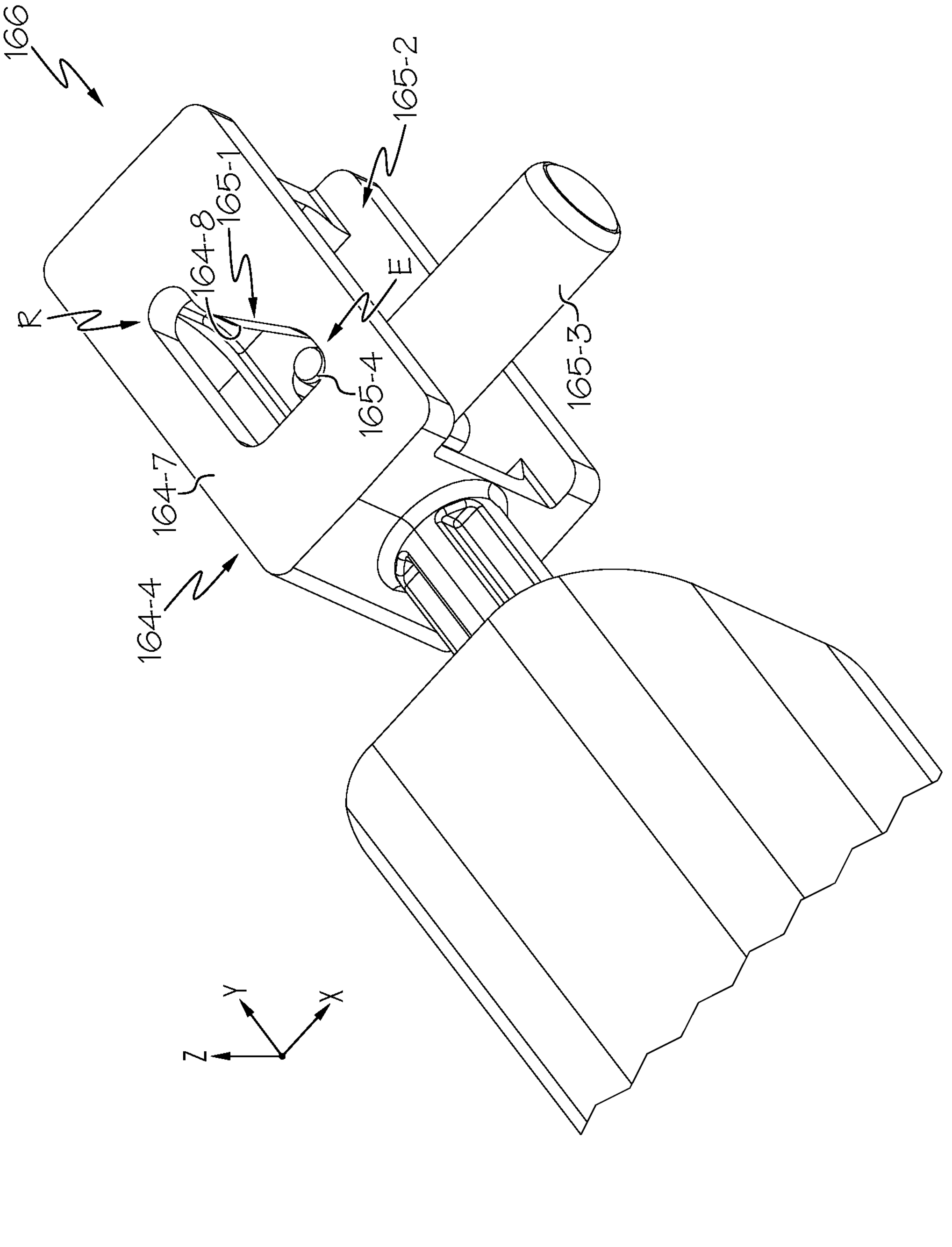
FIG. 5I illustrates a perspective of internal components including a locking pin according to one or more embodiments described and illustrated herein.
Figure 5J:
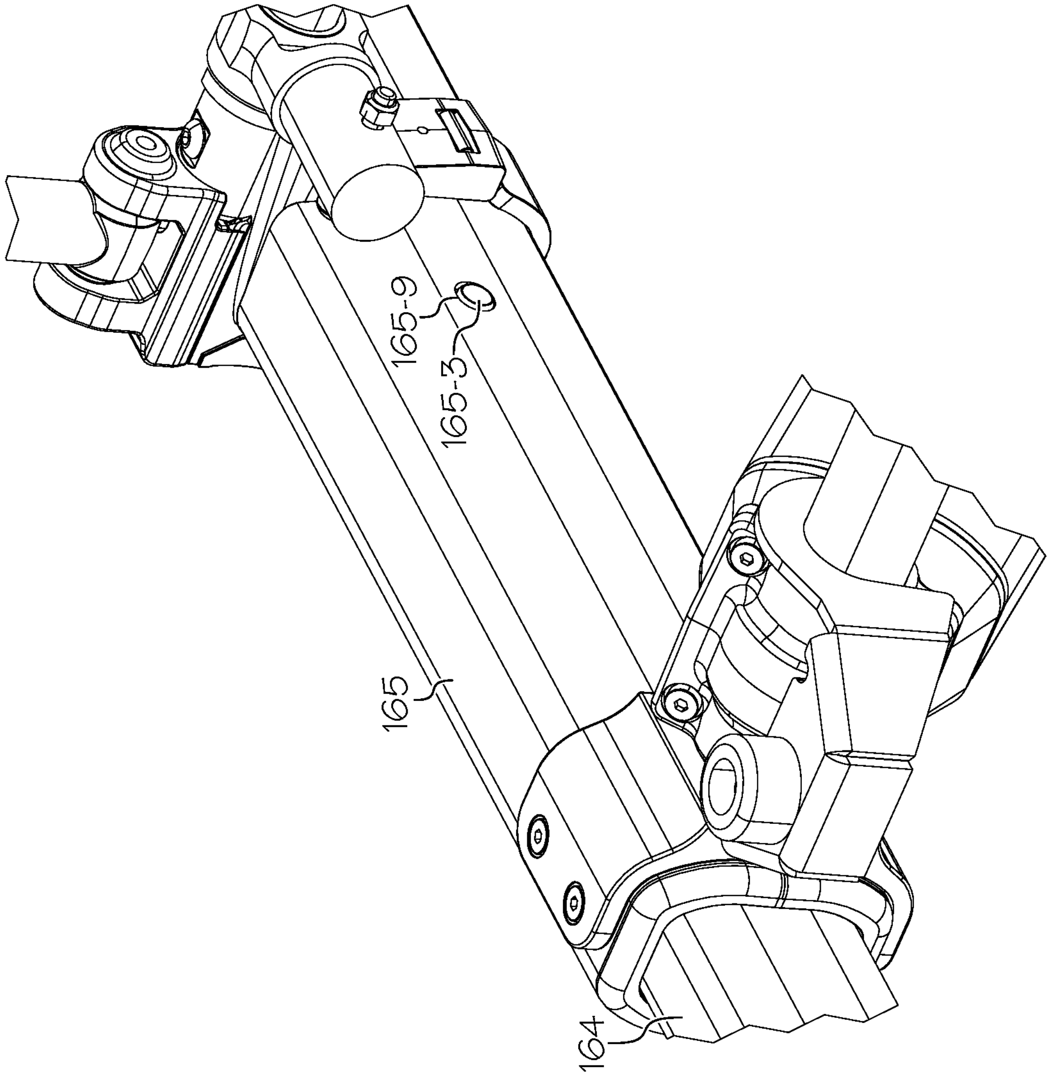
FIG. 5J illustrates another perspective view of a side rail of the cot of FIG. 1 including a locking pin and an opening according to one or more embodiments described and illustrated herein.

Referring now to FIG. 5I, an upper surface 164-7 and an opposite lower surface of the slider body 164-4 includes a cam recess 165-1. The cross-pin 165-4 is disposed within both cam recesses 165-1. The cam recesses 165-1 each include a cam surface 164-8 that is tapered to provide a locking pin extended region E and a locking pin retracted region R. FIG. 5I illustrates the slider body 164-4 and locking pin 165-3 in an extended state. The cross-pin 165-4 is within the locking pin extended region E and the locking pin 165-3 is biased forward through a slot 165-2 of the slider body 164-4 in an extended position (e.g., by a biasing spring). As the guide 165-6 is disposed within an opening of the first half 164-2 of the housing 164-1, and the locking pin 165-3 is disposed through an opening 165-10 of the second half 164-3 of the housing 164-1, the cross-pin 165-4 and the locking pin 165-3 do not translate along the x-direction as shown in FIG. 5I. When the user pulls on the handle actuator 173, the cable 176-7 pulls the slider body 164-4 such that it translates in the negative Y-axis direction. The cross-pin 165-4 rides along the cam surfaces 165-1. The tapered cam surfaces 165-1 cause the cross-pin 165-4 to move in the negative X-axis direction, which also pulls the locking pin 165-3 in the negative X-axis direction, thereby retracting the locking pins 165-3 out of lock openings 165-9 of the second rails 165 as shown by FIG. 5J. When the locking pins 165-3 are retracted out of the lock openings 165-9, the first rails 164 are free to translate within the second rails 165 to adjust the length of the cot 100. When the user releases the handle actuator 173, the locking pins 165-3 are biased into the extended position and will move into openings of the second rails 165 when they are aligned with such openings. In this manner, a user may adjust the length of the cot 100 using the handle actuator 173.

Figure 6A:
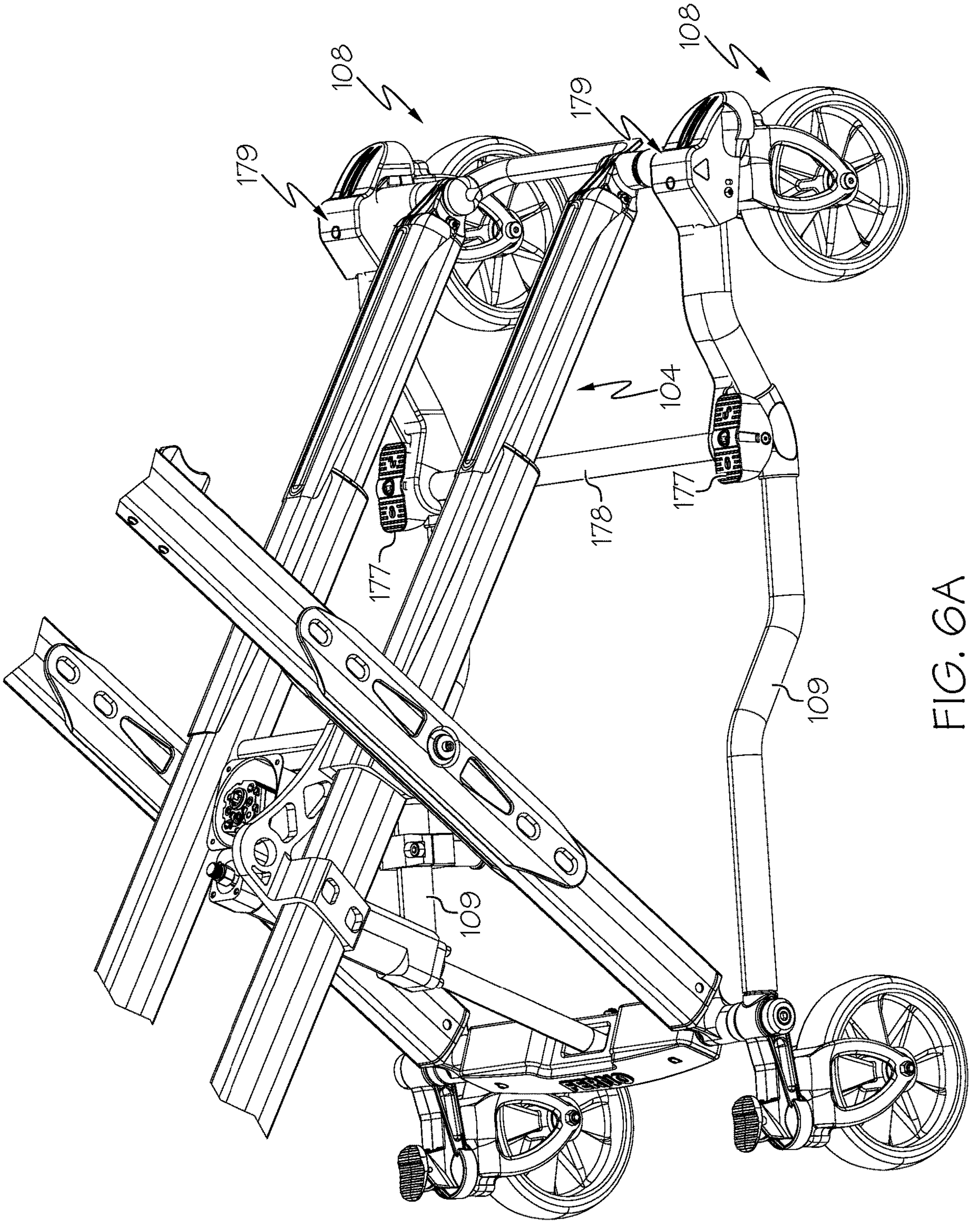
FIG. 6A illustrates a perspective view of an example directional wheel lock assembly of a cot according to one or more embodiments described and illustrated herein.

Referring now to FIG. 6A, the cots 100, as well as any other wheeled device such as wheelchairs, of the present disclosure may include a directional wheel lock assembly that, when actuated, prevents the wheels 108 from swiveling. The directional wheel lock assembly includes two pedals 177, a crossbar 178 and linkage assembly 179. When the pedals 177 are pushed by a user's foot in a locking direction, the linkage assembly 179 is driven to lock the wheels 108 to prevent them from swiveling; however, they may still rotate to allow longitudinal movement of the cot 100. When the pedals 177 are pushed by a user's foot in the unlocking direction, the linkage assembly 179 is driven to unlock the wheels 108 to allow them to swivel, thereby allowing latitudinal movement of the cot 100. The crossbar 178 is configured such that actuation of one pedal 177 causes the same actuation of the other pedal 177.

Unlike traditional directional wheel locks, the pedals 177 are not positioned directly above the wheels that they directionally lock. Rather, the pedals 177 are offset from the wheels by the linkage assembly 179 and positioned on the base members 109. As a non-limiting example, the pedals 177 may be offset from the wheels by a distance of greater than or equal to ten centimeters. This location for the pedals 177 is more accessible for users. However, it should be understood that the pedals 177 may be located at any position along the base members 109.

Figure 6B:
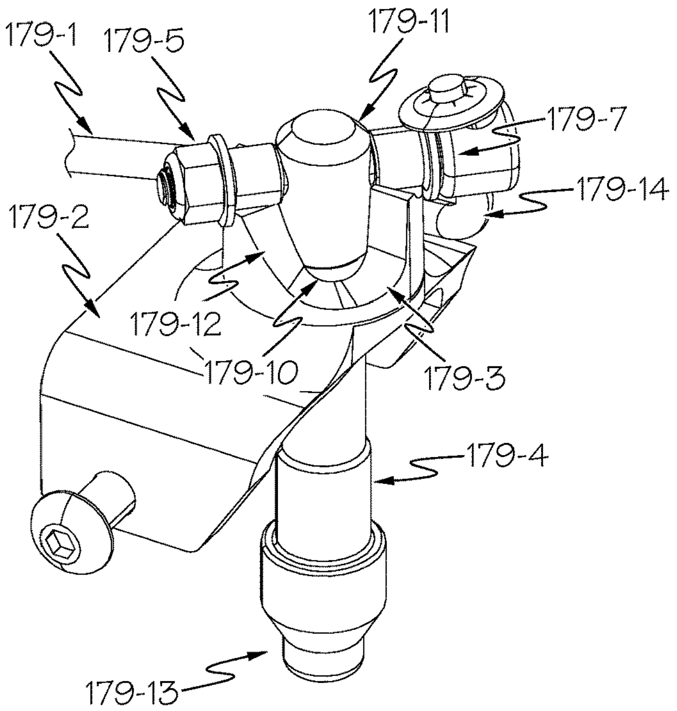
FIG. 6B illustrates a perspective view of components of the directional wheel lock assembly according to one or more embodiments described and illustrated herein.

FIG. 6B illustrates the example directional wheel lock assembly having a linking rod 179-1, an actuation plate 179-2, an actuator plunger 179-4, and an actuation pin 179-5. FIG. 6B shows the directional wheel lock assembly in an unlocked state. Each linking rod 179-1 is coupled to the cross-bar 178 and or an individual pedal 177 such that actuation of the pedals 177 by the user causes the linking rod 179-1 to translate toward or away from the wheels 108 depending on which direction the pedal 177 is actuated by the user. Each linking rod 179-1 is coupled to an end 179-7 of an actuation pin 179-5, which is disposed through an upper opening 179-11 of the actuator plunger 179-4.

Activation of the of the pedals 177 causes the linking rod 179-1 to move toward the wheels 108 to rotate the actuation pin 179-5, which causes it to be lowered and seated in a recess 179-3 of the actuation plate 179-2. The recess 179-3 of the actuation plate 179-2 has a tapered wall 179-12 to guide the actuator pin 179-5 both into and out of the recess 179-3. In the illustrated embodiment, the linking rod 179-1 has a bent portion 179-14 such that it bends around a portion of the actuation plate 179-2 having the recess 179-3.

Figure 6C:
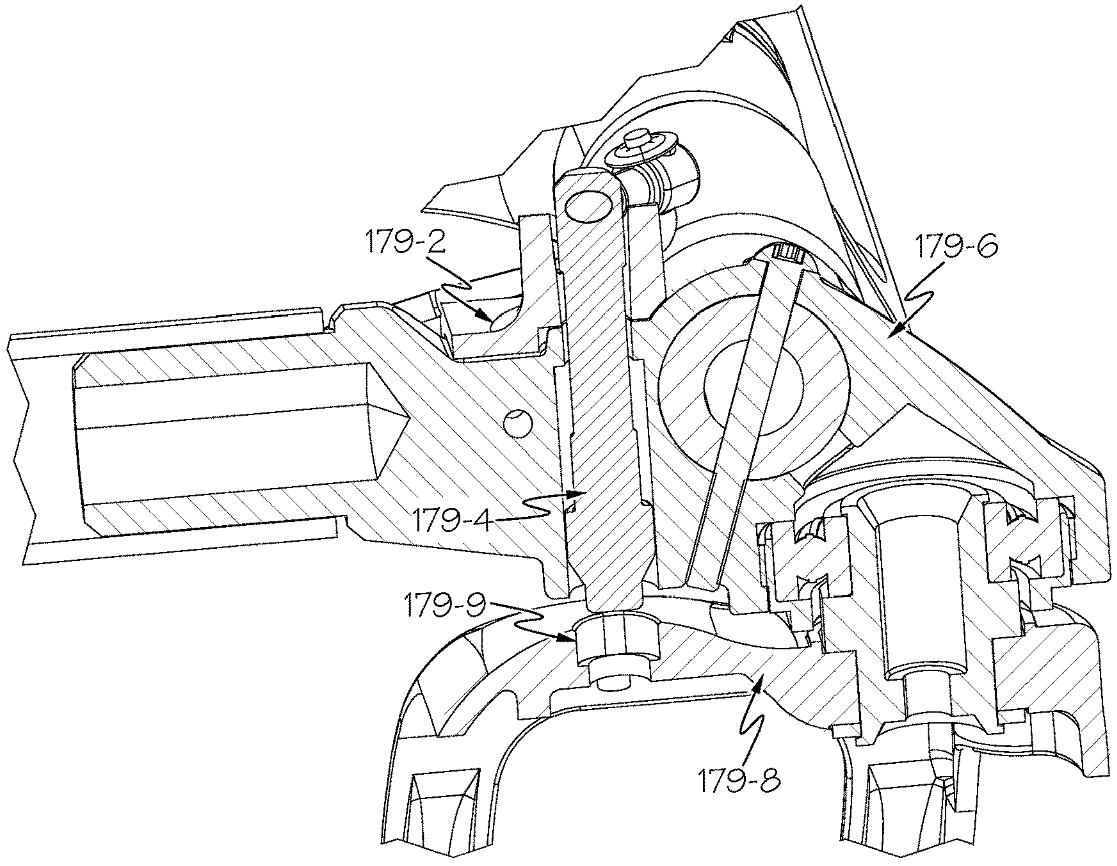
FIG. 6C illustrates a cross-sectional view of components of the directional wheel lock assembly according to one or more embodiments described and illustrated herein.

Referring to FIG. 6C, the actuator plunger 179-4 passes through a wheel cover 179-6. When the actuation pin 179-5 is seated in the recess 179-3, the actuation plunger 179-4 is lowered so it is positioned within a lock opening 179-9 in a wheel lock plate 179-8. The actuation plunger 179-4, prevents swivel rotation of the wheels of the cot when it is positioned within the lock opening 179-9. The actuation plunger has an end 179-13 that has a shape corresponding to the shape of the lock opening 179-9. Returning the pedals 177 to the unlocked position causes rotation of the actuation pin 179-5, which removes it from the recess 179-3 and moves the actuation plunger 179-4 up out of the lock opening 179-9.

It is noted that the directional wheel locks of the present disclosure may be used on other wheeled devices, such as wheel chairs, tables, carts, and the like.

As stated above, the cots 100 of the present disclosure are operable to be loaded and secured within a cargo area of an emergency vehicle, such as an ambulance. The cargo area may include a cot loading system for receiving and securing the cot. The cots disclosed herein include structures that releasably and securely couple to one or more receivers within the cot loading system.

Figure 7:
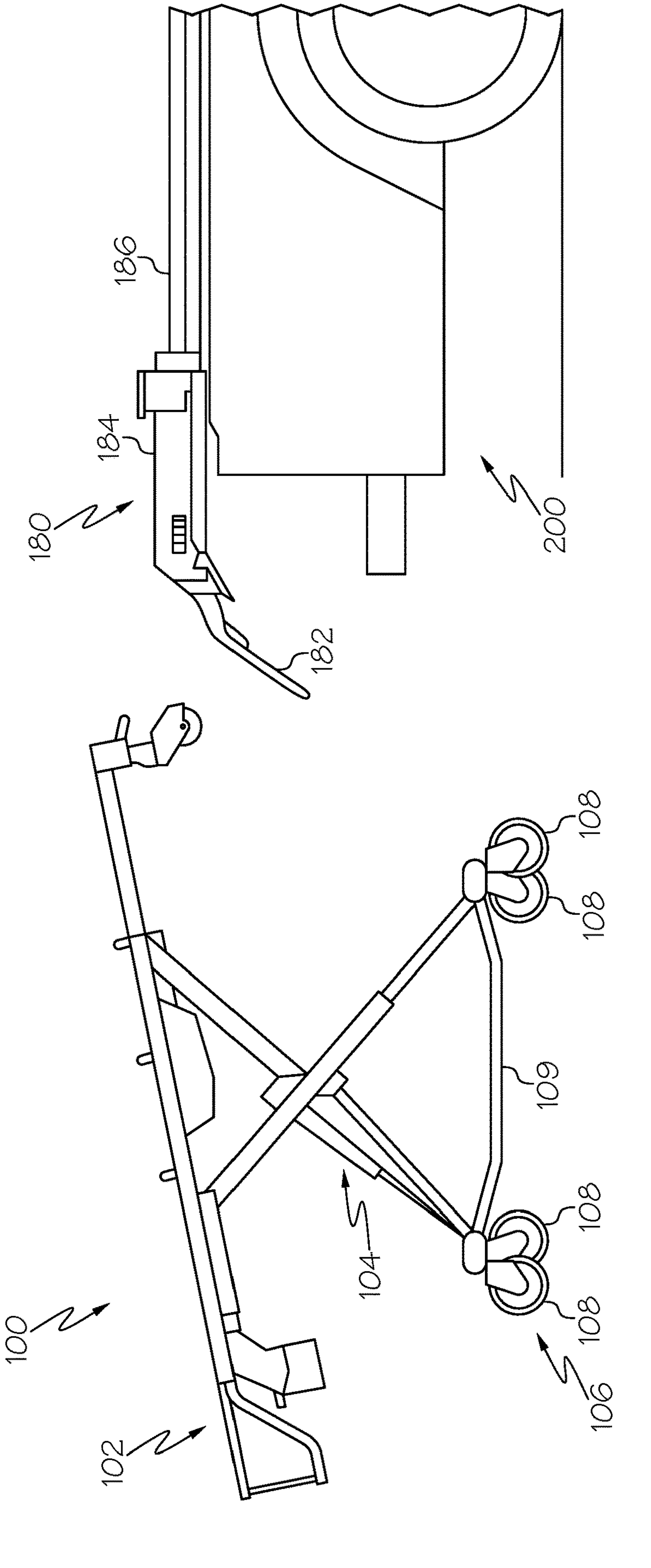
FIG. 7 illustrates a side view of an example cot and an example vehicle according to one or more embodiments described and illustrated herein.

Referring now to FIG. 7, an example cot 100 and an example cot fastener system 180 coupled to the floor of an emergency vehicle 200 in a cargo area is schematically illustrated. Embodiments of the present disclosure are not limited to the configuration and type of the cot fastener system 180 as the cots described herein may be secured to different types of cot fastener systems.

The example cot fastener system 180 of FIG. 7 includes a carriage 184 that linearly travels along a fixed rail 186 that is fixed to the floor of the cargo area of the emergency vehicle 200. The carriage 184 includes arms 182 that are operable to raise and meet an underside of the cot 100 to support the cot so that the base 106 may be raised toward the support frame 102. When the arms 182 have supported the cot 100 and the base 106 is fully collapsed, the carriage 184 moves backward into the cargo area thereby moving the cot 100 into the cargo area of the emergency vehicle 200. A fastener post assembly 110 (see FIG. 10B) of the cot 100 is then disposed within a receiver on the fixed rail 186 to secure the cot 100 to the fixed rail 186 within the cargo area.

Figure 8:
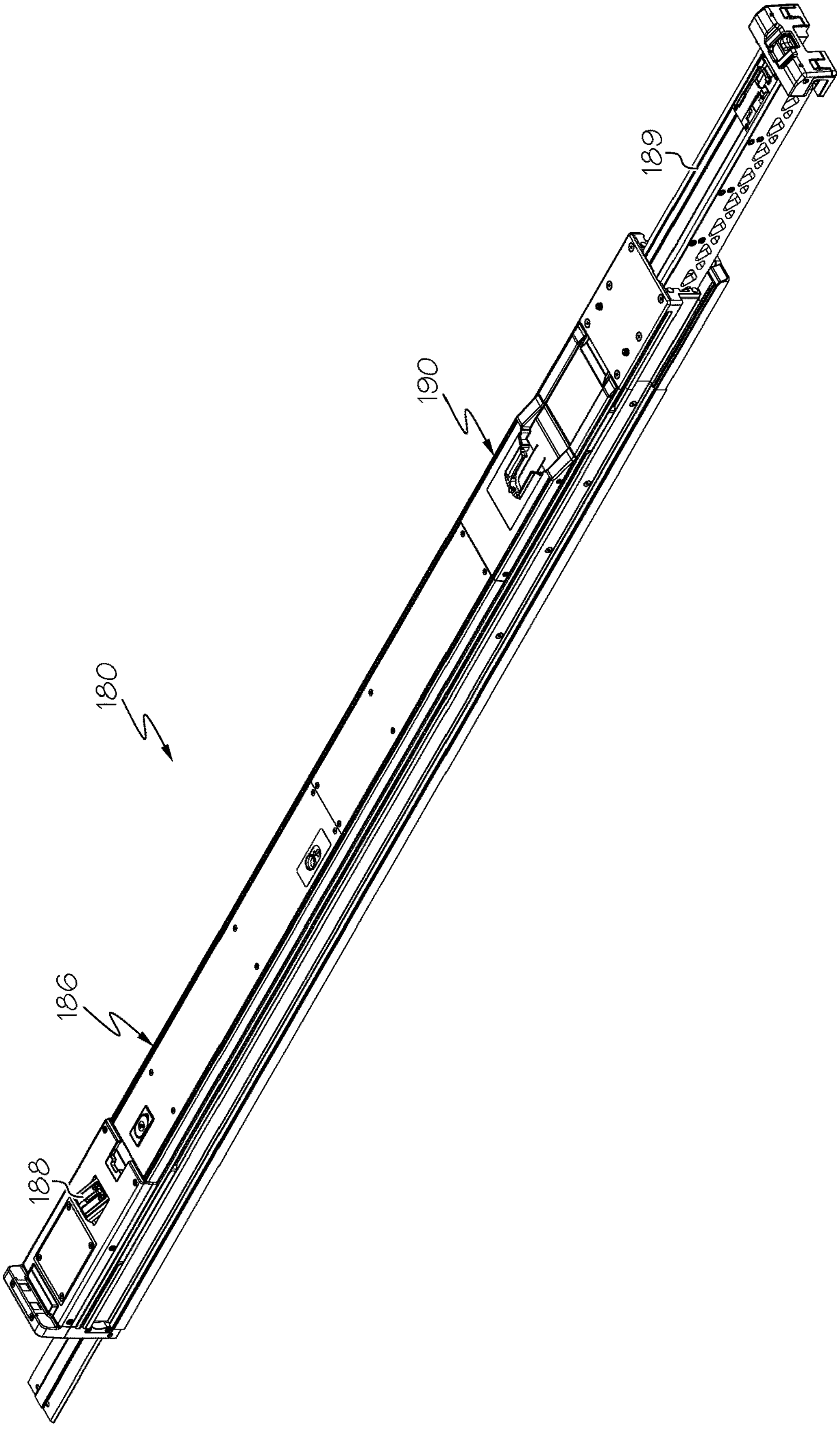
FIG. 8 illustrates a perspective view of an example fastener for mounting in a vehicle according to one or more embodiments described and illustrated herein.

FIG. 8 illustrates a non-limiting example of a fixed rail 186 of a cot loading system 180. Generally the fixed rail 186 includes a carriage fastener 188 operable to releasably lock the carriage 184 to the fixed rail 186, and a fastener 190 to receive the fastener post assembly 110 of the cot 100 to releasably secure the cot 100 to the fixed rail 186. Providing the fastener 190 on the fixed rail 186 provides a fixed location (i.e., a location on the cot loading system 180) for the fastening of the cot, therefore providing a stable locking location. The cot loading system 180 further includes a movable support beam 189 that extends from the fixed rail 186 such that it supports the carriage 184 at its fully extended position.

Figure 9:
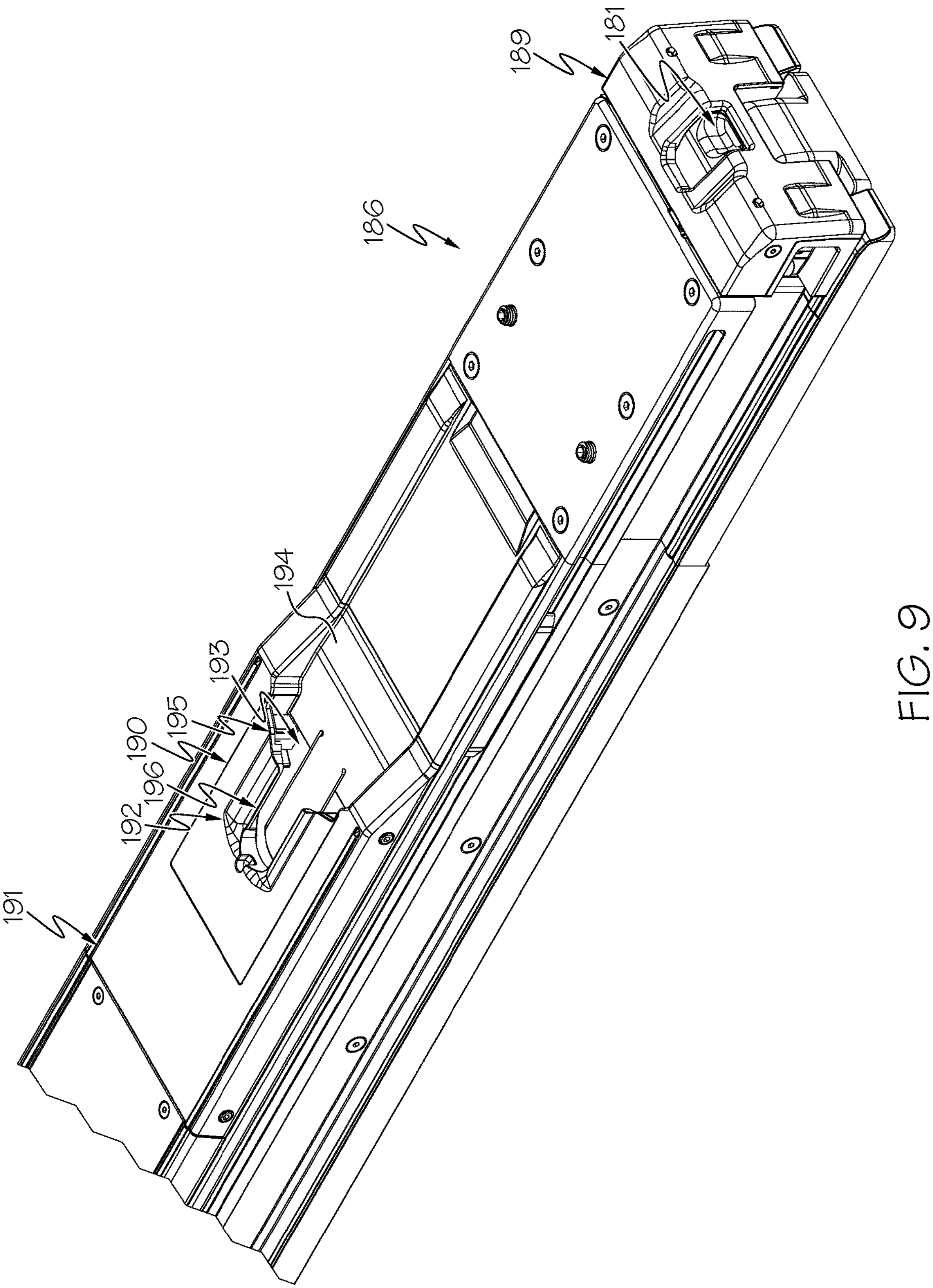
FIG. 9 illustrates a close-up perspective view of the example fastener of FIG. 8 according to one or more embodiments described and illustrated herein.

FIG. 9 is a close-up perspective view of the fixed rail 186 illustrating the fastener 190, as well as the support beam 189 in a retracted position (i.e., positioned within the fixed rail 186). The fastener 190 includes a ramp portion 194 and a slot 192 at the end of the ramp portion 194. The ramp portion 194 raises the height of the slot 192 as compared to the end of the fixed rail. The slot 192 has a wide opening 195 and a narrow portion 196. The wide opening 195 helps to guide the fastener post assembly 110 into the narrow portion 196. The fastener 190 further includes latch 193 that releasably locks the fastener post assembly 110 into the fastener 190 to secure the cot 100 to the cot loading system 180. The latch 193 may release the fastener post assembly 110 by way of a linkage (not shown) coupled to an unlock button 181 on the support beam 189. The latch 193 releases the fastener post assembly 110 when the user presses the unlock button 181.

Figure 10A:
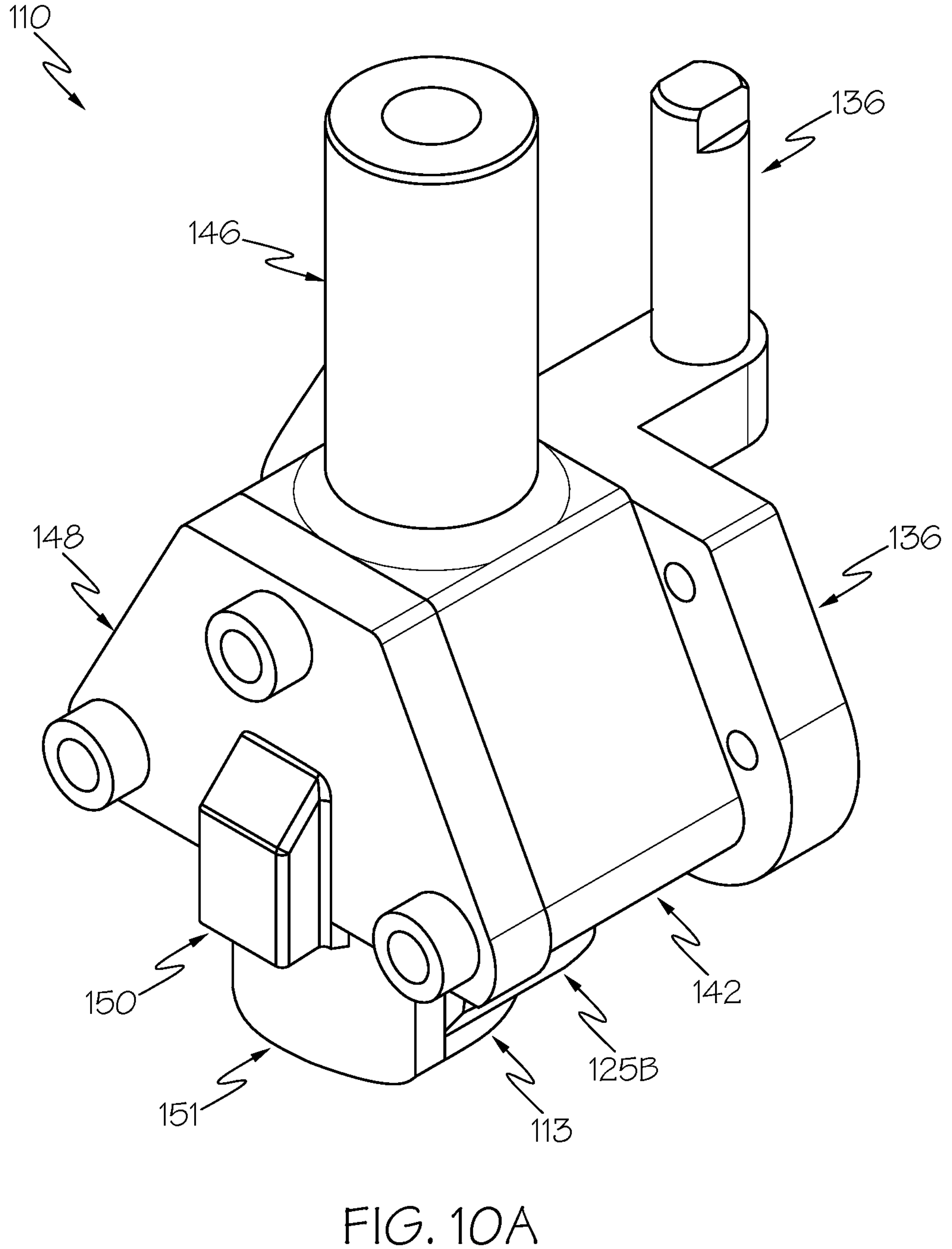
FIGS. 10A, 10B and 11-15 illustrate various views of an example fastener post assembly for mating with a fastener of a vehicle according to one or more embodiments described and illustrated herein.

Referring now to FIG. 10A, a non-limiting example of a fastener post assembly 110 is illustrated. The fastener generally includes a post 146 for coupling the fastener post assembly 110 to a frame of a cot 100, and two locking tabs 125A (not visible in FIG. 8A), 125B that are biased inwardly toward each other. In a non-actuated state, the locking tabs 125A, 125B are retracted and a majority of them are positioned behind a guard portion 151 of a front plate 148. The guard portion 151 protects the locking tabs 125A, 125B and prevents their unintentional contact with other objects. As described in more detail below, movement of an actuator body 113 in an upward direction causes the locking tabs 125A, 125B to move outwardly away from each other in an extended position. Referring briefly to FIG. 7, when the cot 100 is manually loaded into the cot fastener system 180, the actuator body 113 contacts the ramp portion 194, which causes it to move upwardly toward the support frame of the cot 100, which further causes the locking tabs 125A, 125B to move to their extended position. When the cot 100 is loaded automatically using the arms 182, the fastener post assembly 110 is lowered into the latch 193 and the actuator body 113 does not contact the ramp portion 194. The locking tabs 125A, 125B engage a lip portion of the slot 192 as well as the latch 193 such that the fastener post assembly 110 is locked in the fastener 190 to secure the cot 100 to the cot loading system 180.

Figure 10B:
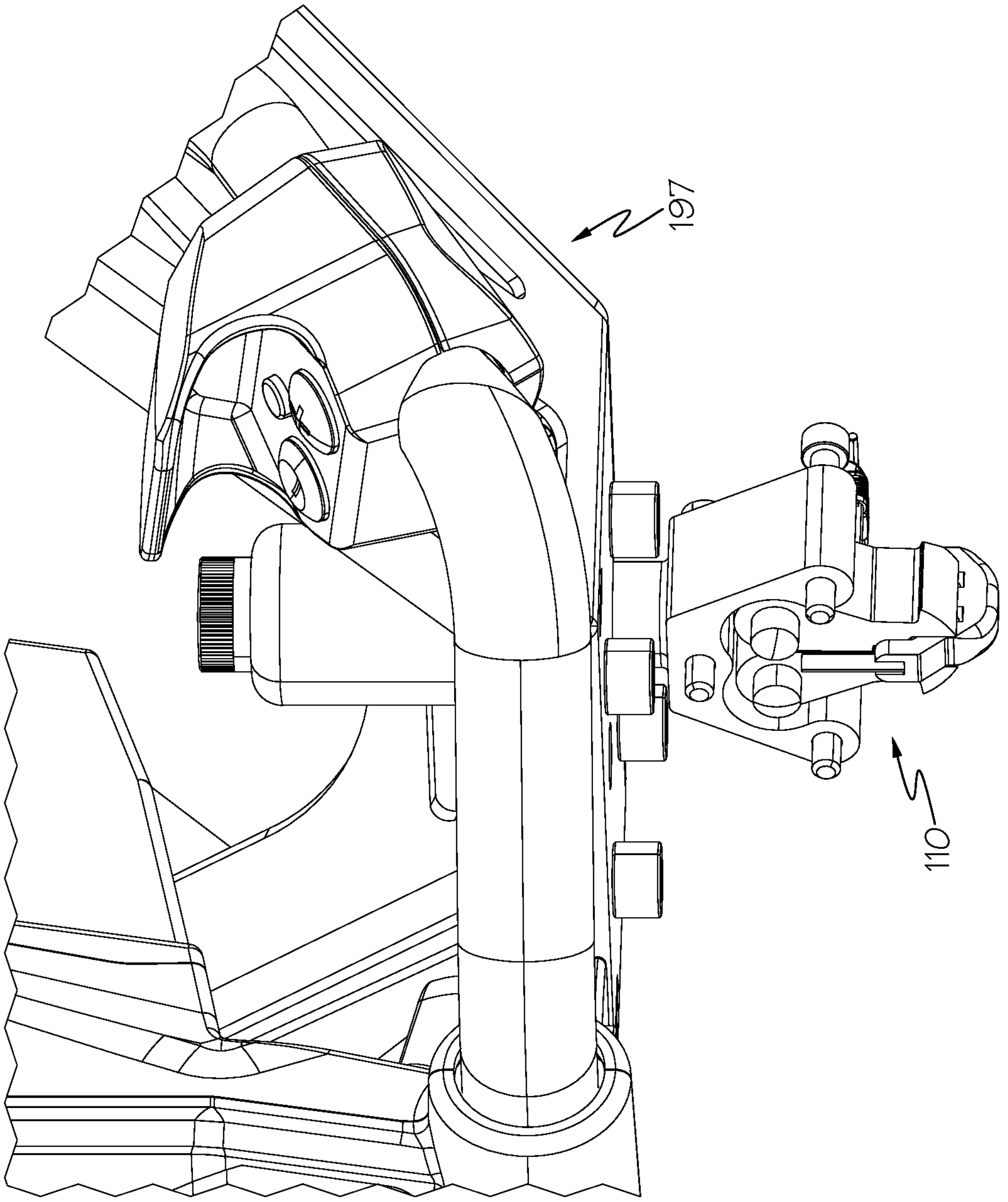

FIG. 10B illustrates an example fastener post assembly 110 coupled to a support frame of a cot by way of a bracket 197. The bracket 197 is configured to position the bottom of the actuator body 113 such that it is at a proper height with respect to the ramp portion 194 of the fastener 190 such that it makes contact with the ramp portion 194 and is raised up toward the support frame to deploy the locking tabs 125A, 125B when the cot 100 is manually loaded into the cot fastener system 180, and/or such that the actuator body 113 contacts the bottom surface of the latch 193 to deploy the locking tabs 125A, 125B when the cot 100 is automatically loaded into the cot fastener system 180 by the arms 182.

Additional components of the example fastener post assembly 110 will now be described.

Figure 11:
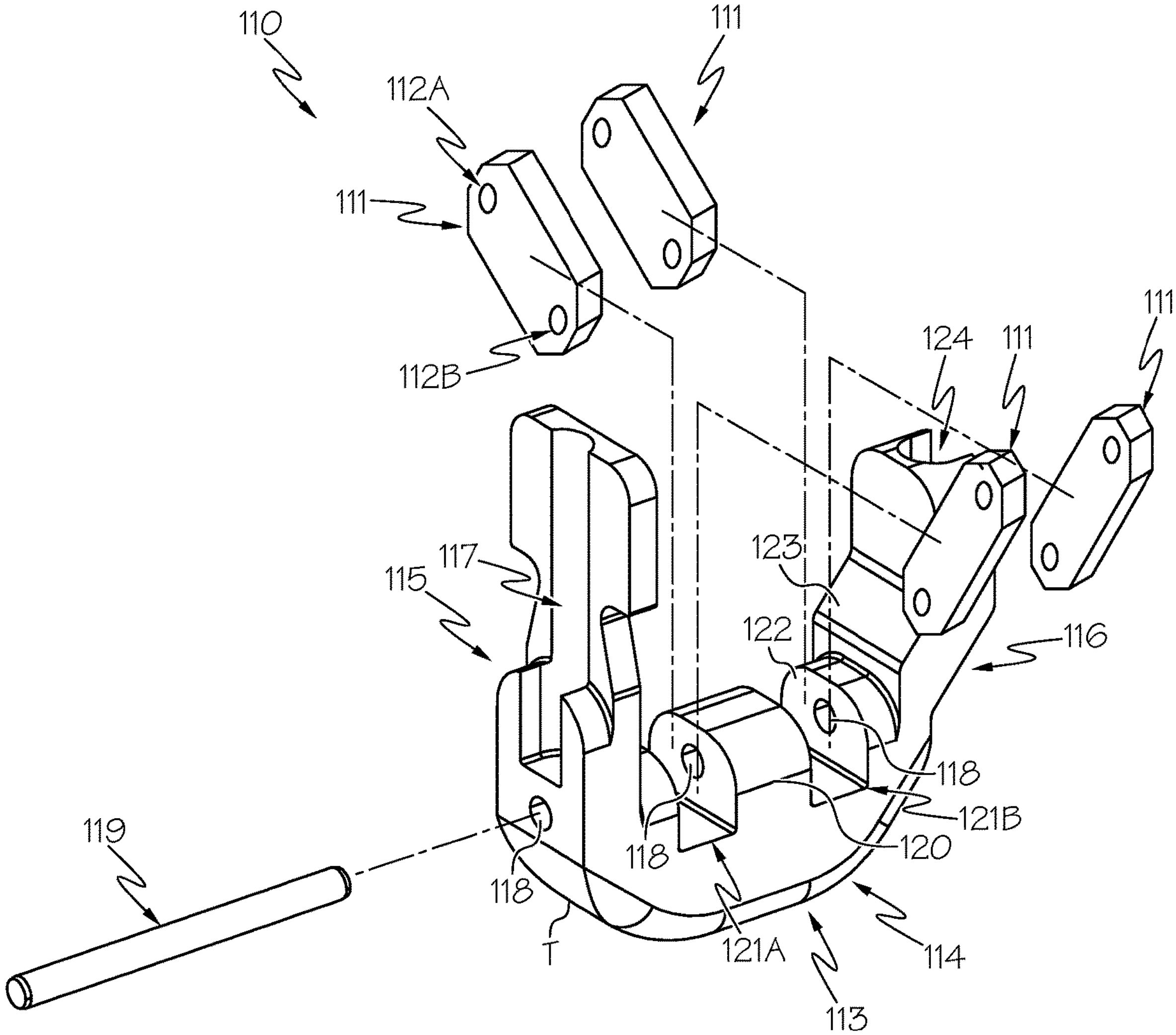

FIG. 11 illustrates an exploded view of some components of the example fastener post assembly 110. The fastener post assembly 110 includes a generally U-shaped actuator body 113 having a main portion 114, a first bias member portion 115 and a second bias member portion 116. The first bias member portion 115 and the second bias member portion 116 extend upwardly from the main portion 114 to define the general U-shape. In the illustrated embodiment, the length of the second bias member portion 116 is greater than the length of the first bias member portion 115.

The main portion 114 includes a first link seat 121A and a second link seat 121B separated by a divider 120. The first link seat 121A and the second link seat 121B are configured to receive a pair of actuator links 111 that actuate the locking tabs 125A, 125B, as described in more detail below. Of each pair of actuator links 111, one is coupled to the first locking tab 125A and the other is coupled to the second locking tab 125B. As such, each actuator link 111 of the pairs is angled in different directions. Each actuator link 111 includes a first through-hole 112A and a second through-hole 112B for securing the actuator links 111 to the actuator body 113 and to the first and second locking tabs 125A, 125B. Each of the first link seat 121A, the divider 120, and the second link seat 121B include a through-hole for receiving a pivot pin 119. The actuator links 111 are stacked in the respective first link seat 121A and second link seat 121B such that their second through-holes 112B are aligned with one another and the through-holes 118 of the actuator body 113. The pivot pin 119 is disposed through the through-holes 118 of the actuator body 113 and the second through-holes 112B of the actuator links 111 to pivotably couple the actuator links 111 to the actuator body 113. The actuator links 111 have an axis of rotation about a pivot point defined by the pivot pin 119.

The main portion 114 of the actuator body 113 has a tapered surface T that is tapered to contact the ramp portion 194 of the fastener 190 to encourage the actuator body 113 to both move in a linear direction parallel to the fixed rail 186 and a vertical direction orthogonal to the fixed rail 186 to actuate the locking tabs 125A, 125B.

Figure 13:
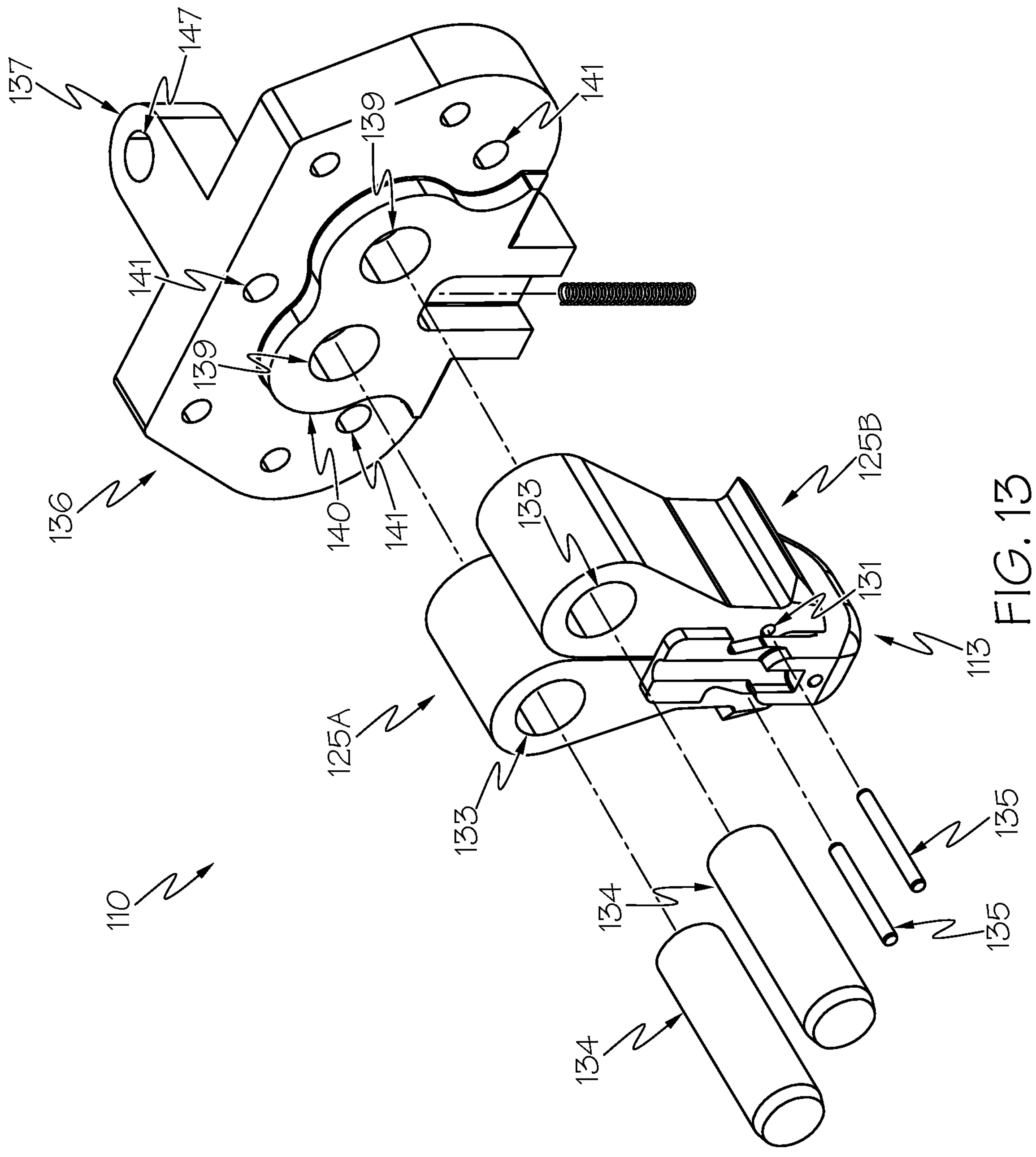

The first bias member portion 115 has a first bias member slot 117 for receiving a first bias member 137A (FIG. 14) at its outward face. The second bias member portion 116 has a second bias member slot 124 for receiving a second bias member 137B (FIG. 13). The first and second bias members 137A, 137B bias the actuator body 113 in a downward direction away from the support frame of the cot 100, as described in more detail below.

Figure 12:
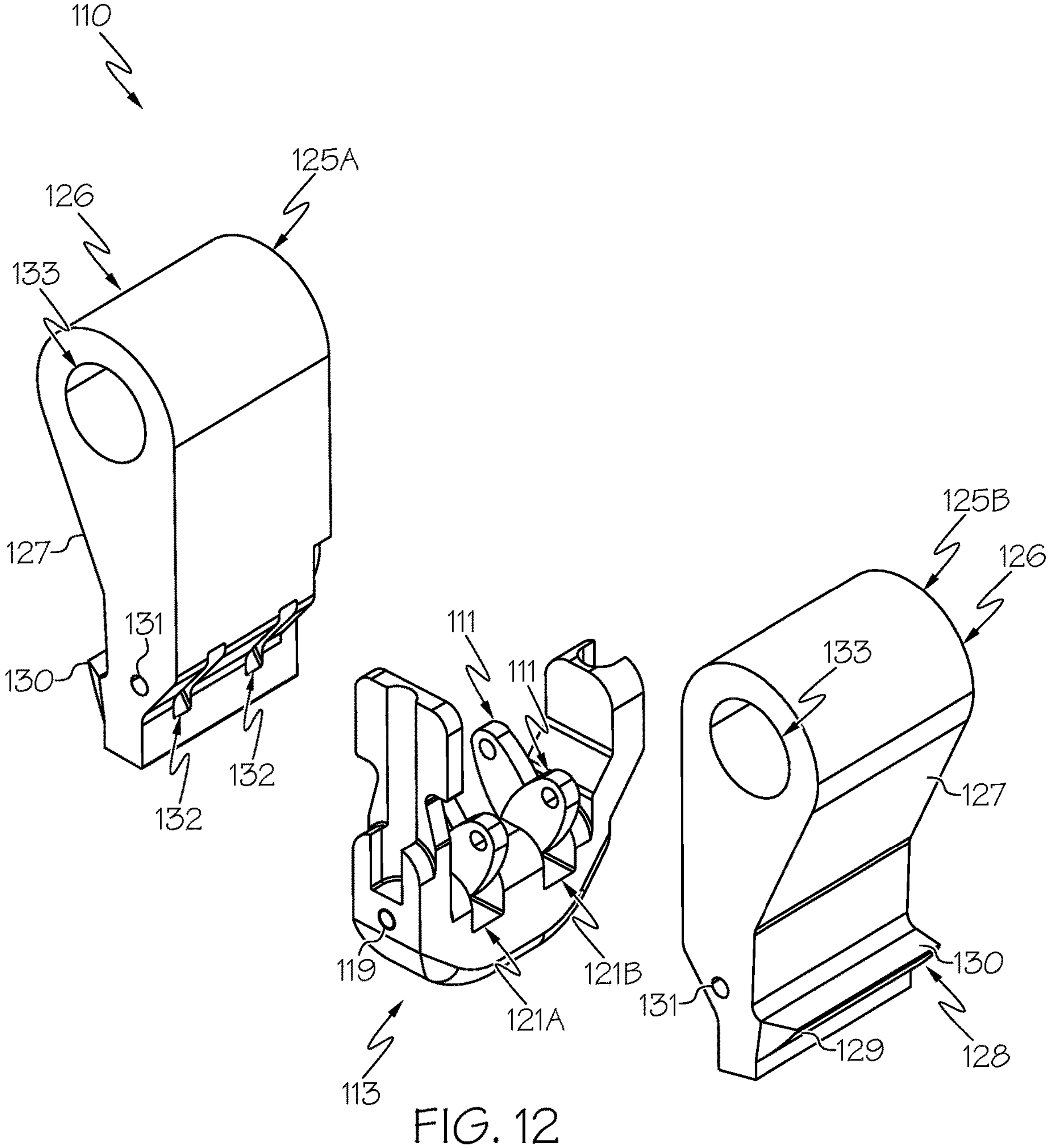

Referring now to FIG. 12, a partially exploded view of the assembled actuator body 113 and actuator links 111 is illustrated with the first locking tab 125A and the second locking tab 125B. Each locking tab 125A, 125B has a hook 128 defined by a tapered surface 129 and a flat, engaging surface 130 operable to engage the slot 192 of the fastener 190. Each locking tab 125A, 125B also includes an opening 133 at a main body 126, and a tapered surface 127 that is tapered to reduce the width of the locking tab 125A, 125B proximate the hook 128. An inner surface of the locking tabs 125A, 125B opposite from the hook 128 has grooves 132 for receiving an upper portion of the actuator links 111. A through-hole 131 is disposed through the locking tabs 125A, 125B that pass through the grooves 132 such that the through-hole 131 is aligned with the first through-holes 112A of the actuator links 111.

Referring now to FIG. 13, first dowel pins 135 are disposed within the through-holes 131 of the first and second locking tabs 125A, 125B and the first through-holes 112A of the actuator links to secure the first and second locking tabs 125A, 125B to the actuator links 111. FIG. 11 further illustrates a rear plate 136. The rear plate 136 includes an offset mating face 140 that is offset from a remaining portion of a face of the rear plate 136. The offset mating face 140 is configured to contact the first and second locking tabs 125A, 125B. Two blind bores 139 are disposed within the rear plate 136 at the offset mating face 140. The first and second locking tabs 125A, 125B are coupled to the rear plate 136 by way of second dowel pins 134 that are disposed within the openings 133 of the first and second locking tabs 125A, 125B and the blind bores 139 of the rear plate 136.

The rear plate 136 further includes a second bias member slot 138 positioned below the blind bores 139 in a direction toward the actuator body 113. A first bias member 137A, which may be configured as a spring, is disposed within the second bias member slot 138 of the rear plate 136 and the second bias member slot 124 of the actuator body 113. The bias member is compressed such that it biases the actuator body 113 downward away from the rear plate 136.

The rear plate 136 further includes holes 141 for receiving fasteners 154, as described in more detail below with respect to FIG. 13. The example rear plate 136 also has a flange 137 that extends rearward in a direction away from the offset mating face 140. The flange 137 has an opening 147 to receive an anti-rotation pin 153 (FIG. 13) that prevents rotation of the fastener post assembly 110 with respect to the cot 100.

Figure 14:
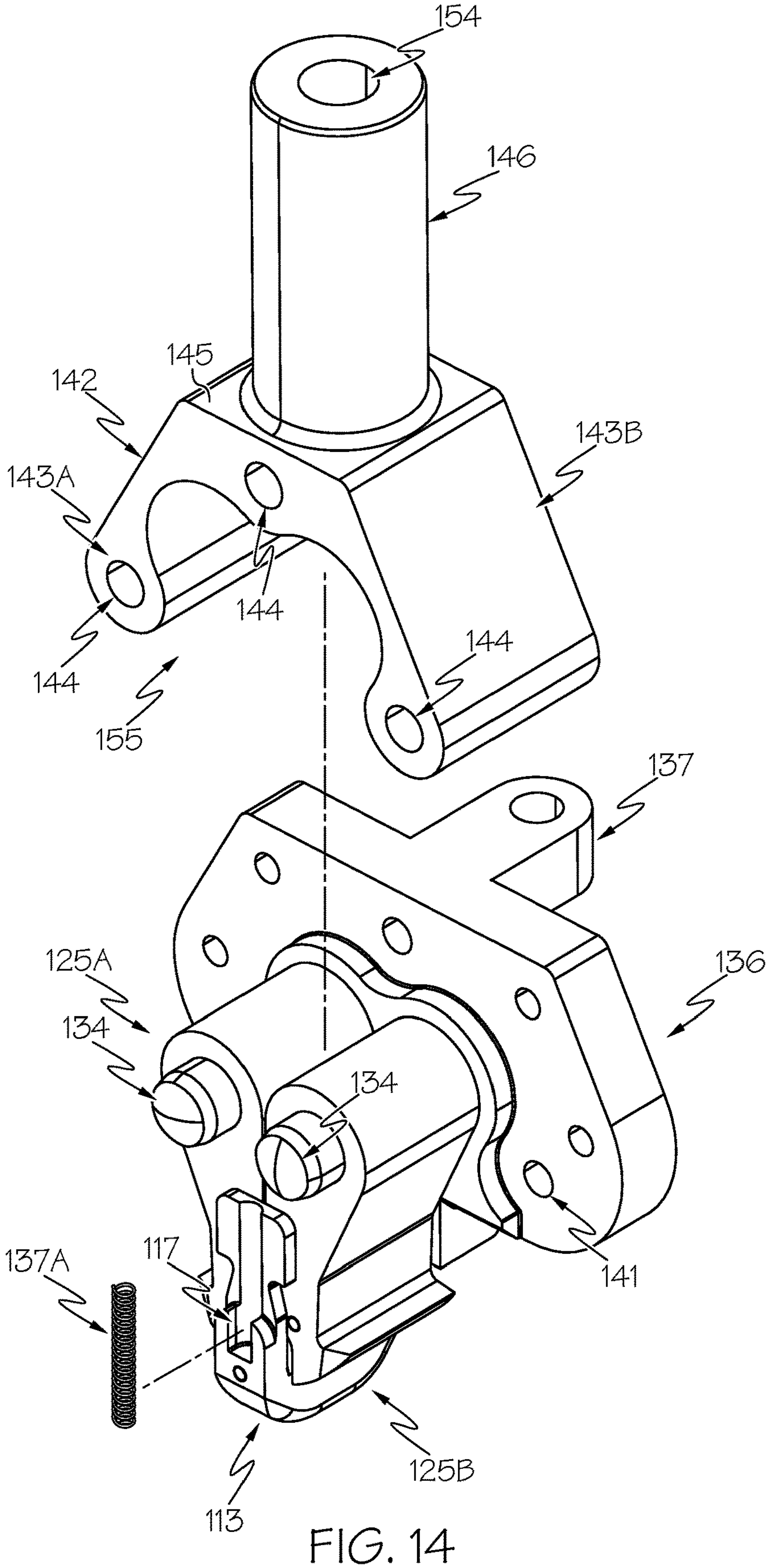

Referring now to FIG. 14, a first bias member 137A, such as a spring, is positioned within the first bias member slot 117. The first bias member 137A is compressed to bias the actuator body 113 in a direction away from the first and second locking tabs 125A, 125B.

The fastener post assembly 110 further comprises a post body 142 that includes the post 146 that extends from a top surface 145. As described above, the post 146 is used to couple the fastener post assembly 110 to the cot 100. The post 146 may have a threaded bore 154 to receive a fastener to couple the fastener post assembly 110 to the cot 100, for example.

The post body 142 further has two arms 143A, 143B having an inner surface that define an recess 155 shaped to receive the main body 126 of the first and second locking tabs 125A, 125B. Through-holes 144 are provided to couple the post body 142 to the rear plate 136. The through-holes 144 are aligned with the blind bores 141 of the rear plate 136 when assembled.

Figure 15:
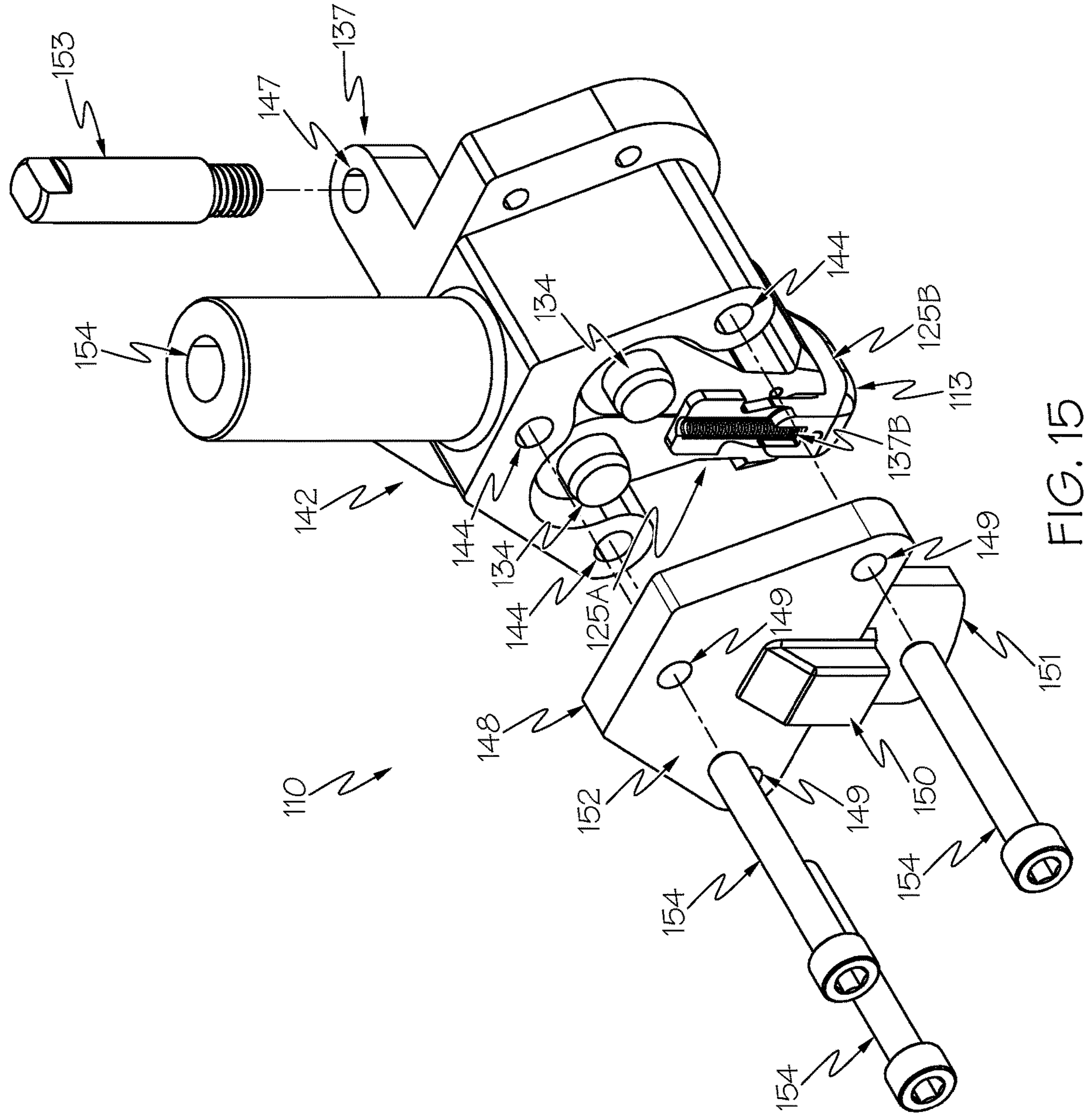

Referring now to FIG. 15, the fastener post assembly 110 further includes a front plate 148. The front plate has a body 152 that may be shaped to align with the shape of the arms 143A, 143B of the post body 142. The body 152 has through-holes 149 that are aligned with the through-holes 144 of the post body 142 when assembled. Fasteners 154 may be positioned in through-holes 149, through-holes 144 and holes 141 to secure the front plate 148, the post body 142 and the rear plate 136 together. Any or all of the through-holes 149, through-holes 144 and holes 141 may be threaded, or not threaded (e.g., bolts are threaded on the fasteners 154 at the rear plate 136). The holes 141 may be through-holes or blind bores.

The front plate 148 further include the guard portion 151 that extends downward from the body 152 in a direction toward the actuator body 113. When assembled, the guard portion 151 at least partially covers the hooks of the first and second locking tabs 125A, 125B. Thus, the guard portion 151 protects the first and second locking tabs 125A, 125B when they are in a retracted, non-actuated state. Having the first and second locking tabs 125A, 125B biased inward and protected by the guard portion 151 may prevent the first and second locking tabs 125A, 125B from inadvertently catching on an unintended object. It is noted that the front plate 148 further includes a bump-out 150 to provide clearance to accommodate the second bias member 137B.

Referring once again to FIG. 10A, an assembled fastener post assembly 110 is illustrated. The first and second locking arms 125A, 125B are shown in a non-actuated and retracted state. The first and second bias members and actuator links bias the first and second locking arms 125A, 125B inwardly toward one another. When the fastener post assembly 110 is disposed within a fastener 190, the actuator body 113 is pressed upwardly in a direction toward the front plate 148 and the rear plate 136. Referring to both FIGS. 10A and 12, upward movement of the actuator body 113 causes the actuator links 111 to pivot about pivot pin 119 such that the upper portions of the actuator links flare outward away from one another. Because the top portions of the actuator links 111 are coupled to the first and second locking arms 125A, 125B, this movement of the actuator links 111 causes the first and second locking arms 125A, 125B to move outward away from one another in the actuated state. When the fastener post assembly 110 is removed from the fastener 190, the first and second bias members 137A, 137B push the actuator body 113 back down to its biased, non-actuated state which brings the first and second locking arms 125A, 125B closer together and at least partially disposed behind the guard portion 151.

Figure 15A:
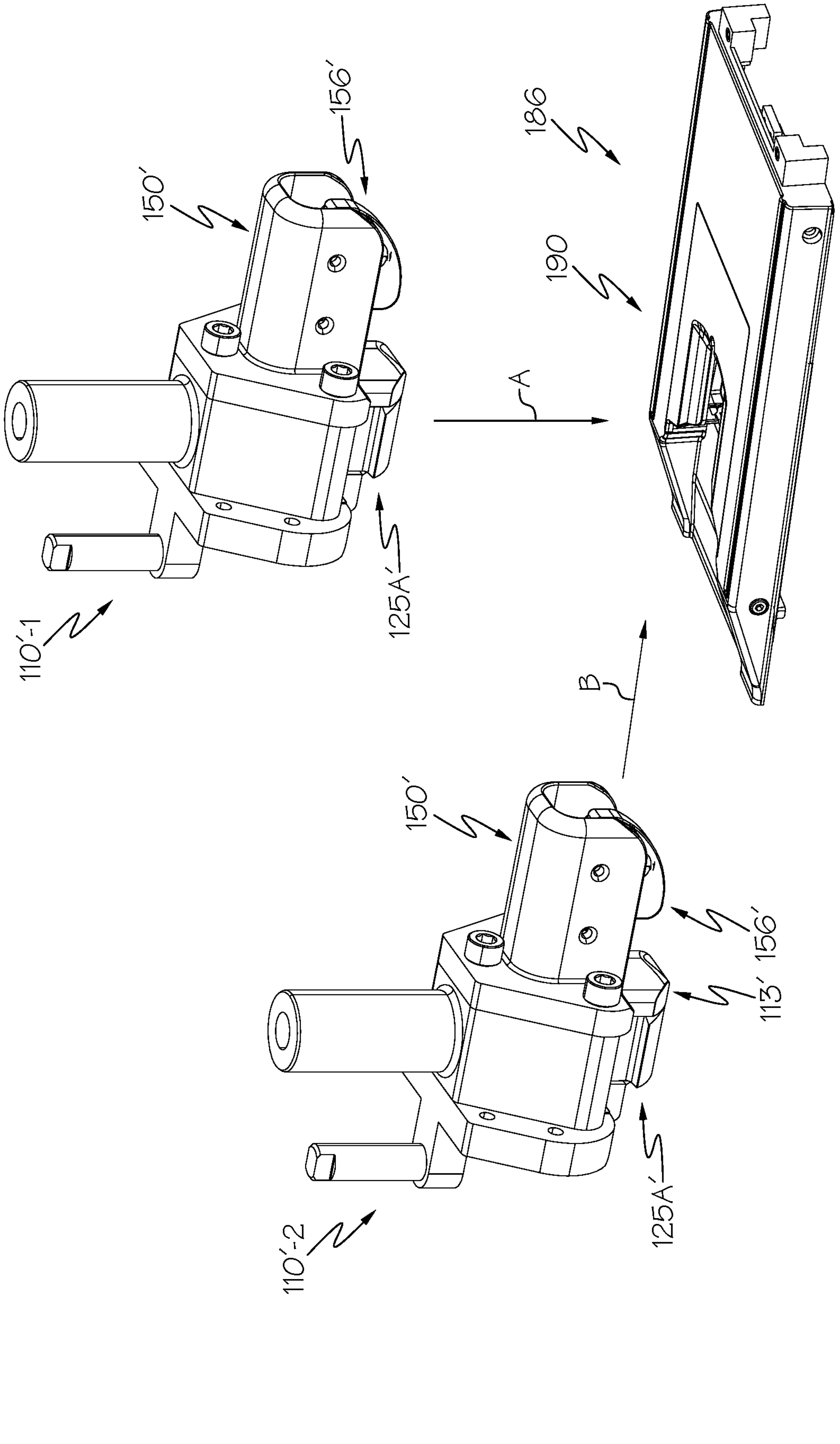
FIGS. 15A-15I illustrate various views of another example fastener post assembly for mating with a fastener of a vehicle according to one or more embodiments described and illustrated herein.
Figure 15B:
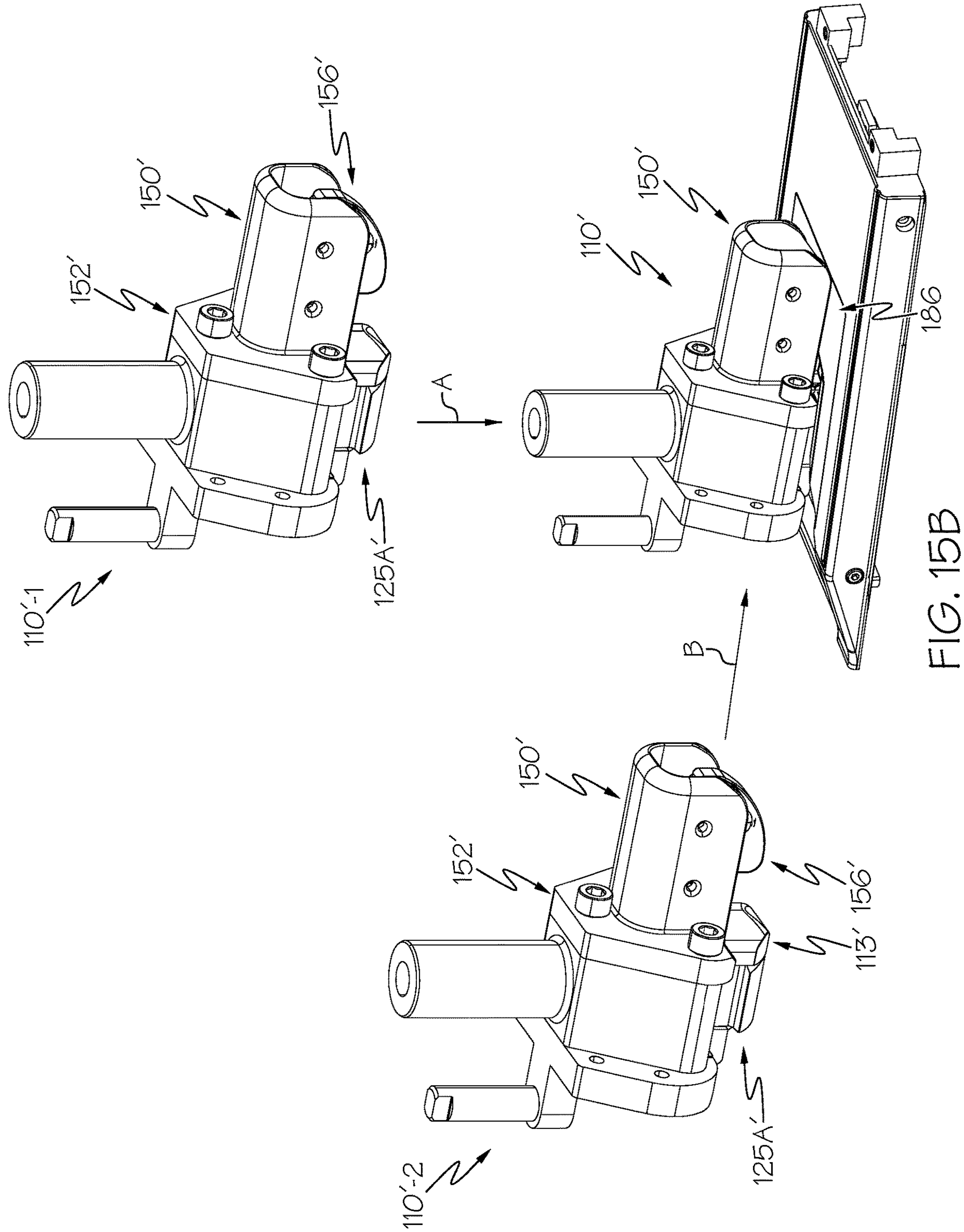

Referring now to FIG. 15A, another embodiment of a fastener post assembly 110' is illustrated. More particularly, FIG. 15A illustrates a first fastener post assembly 110'-1 to be locked to a fastener 190 from above as indicated by arrow A, and a second fastener post assembly 110'-2 to be locked to the fastener 190 in a lateral direction as indicated by arrow B. FIG. 15B illustrates a fastener post assembly 110' secured to the fastener 190, either laterally as indicated by fastener post assembly 110'-2 or vertically as indicated by fastener post assembly 110'-1. Thus, FIGS. 15A and 15B illustrate how a fastener post assembly 110' can be mated to a fastener 190 in two directions.

The fasteners 110'-1, 110'-2 of FIGS. 15A and 15B are similar to the fastener post assembly 110 illustrated in FIGS. 10A-15 but it further includes additional components to provide a more rigid and strong connection to the receiver. The fasteners 110'-1 and 110'-2 (collectively referred to as fastener post assembly 110') have a shroud 150' that extends from a front face of the body 152'. When locked to the fastener 190, the shroud 150' rests on a surface of the fixed rail 186 at the fastener 190, which prevents pivoting of the fastener post assembly 110' about the y-axis. The shroud 150' thus prevents the fastener post assembly 110' from rocking back and forth when the emergency vehicle traverses rough terrain, or in the event that the emergency vehicle is in an accident. The shroud 150' increases the stability of the connection between the fastener post assembly 110' and the fastener 190.

Figure 15C:
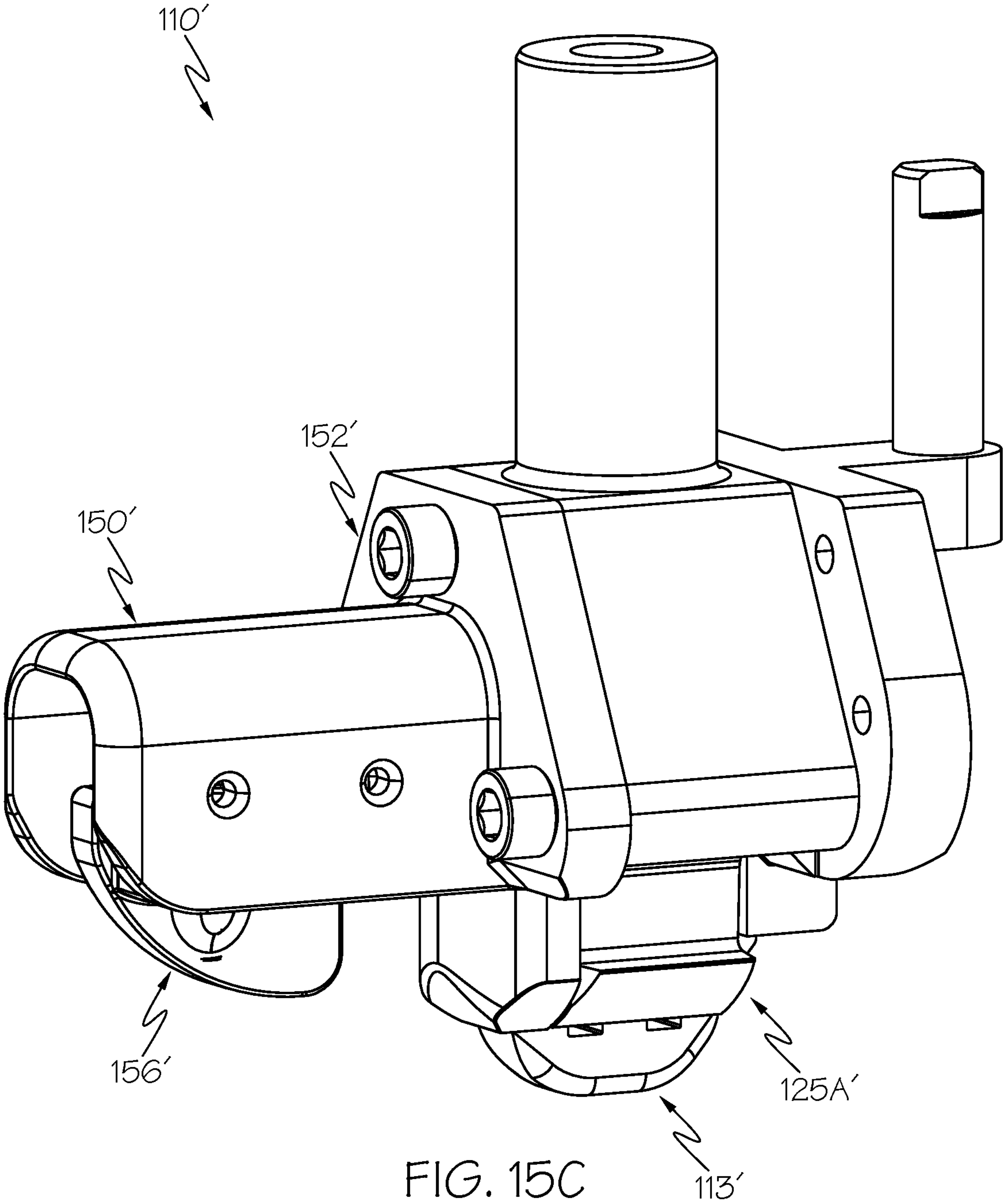

FIG. 15C illustrates the example fastener post assembly 110' in a front perspective view. Referring collectively to FIGS. 15A-15C, the example fastener post assembly 110' also includes a locking mechanism including a lock button 156' that prevents inward movement of the locking tabs 125A', 125B' when the locking mechanism is in the locked state. Thus, the locking mechanism prevents inadvertent unlocking of the fastener post assembly 110' with respect to the fastener 190. When fastener post assembly 110'-1 is lowered into the fastener 190 in a direction as indicated by arrow A, the lock button 156' slides vertically into a recess defined by the shroud 150'. Additionally, the actuator body 113' moves vertically as described above, which allows the locking tabs 125A', 125B' to outwardly pivot. Movement of the lock button 156' into the shroud 150' puts the fastener post assembly 110'-1 into a locked state whereby the locking tabs 125A', 125B cannot inwardly pivot. Similarly, when fastener post assembly 110'-2 is slid onto the fastener 190 in a lateral direction as indicated by arrow B, the lock button 156' slides up into the recess defined by the shroud 150', and the activator body 113' is also moves up to outwardly pivot the locking tabs 125A', 125B.

Figure 15D:
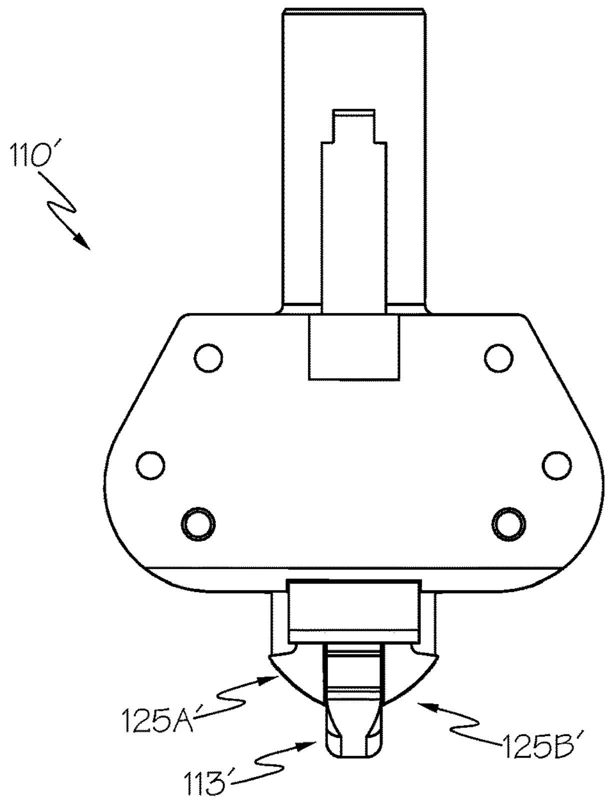
Figure 15E:
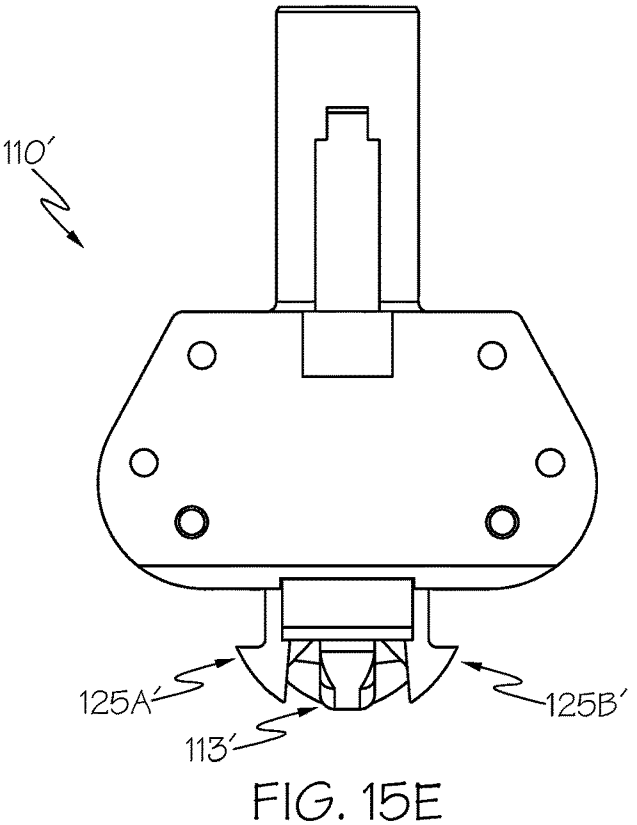

FIG. 15D illustrates a rear view of a fastener post assembly 110' in a deactivated, unlocked state. As shown, the actuator body 113' extends below the locking tabs 125A', 125B', which are inwardly pivoted. FIG. 15E illustrates the fastener post assembly 110' in an activated, locked state. The actuator body 113' is pushed up (e.g., by contact with a surface of the fastener 190), which causes the locking tabs 125A', 125B to outwardly pivot and engage the fastener 190 to lock the fastener post assembly 110' to the fastener 190.

Figure 15F:
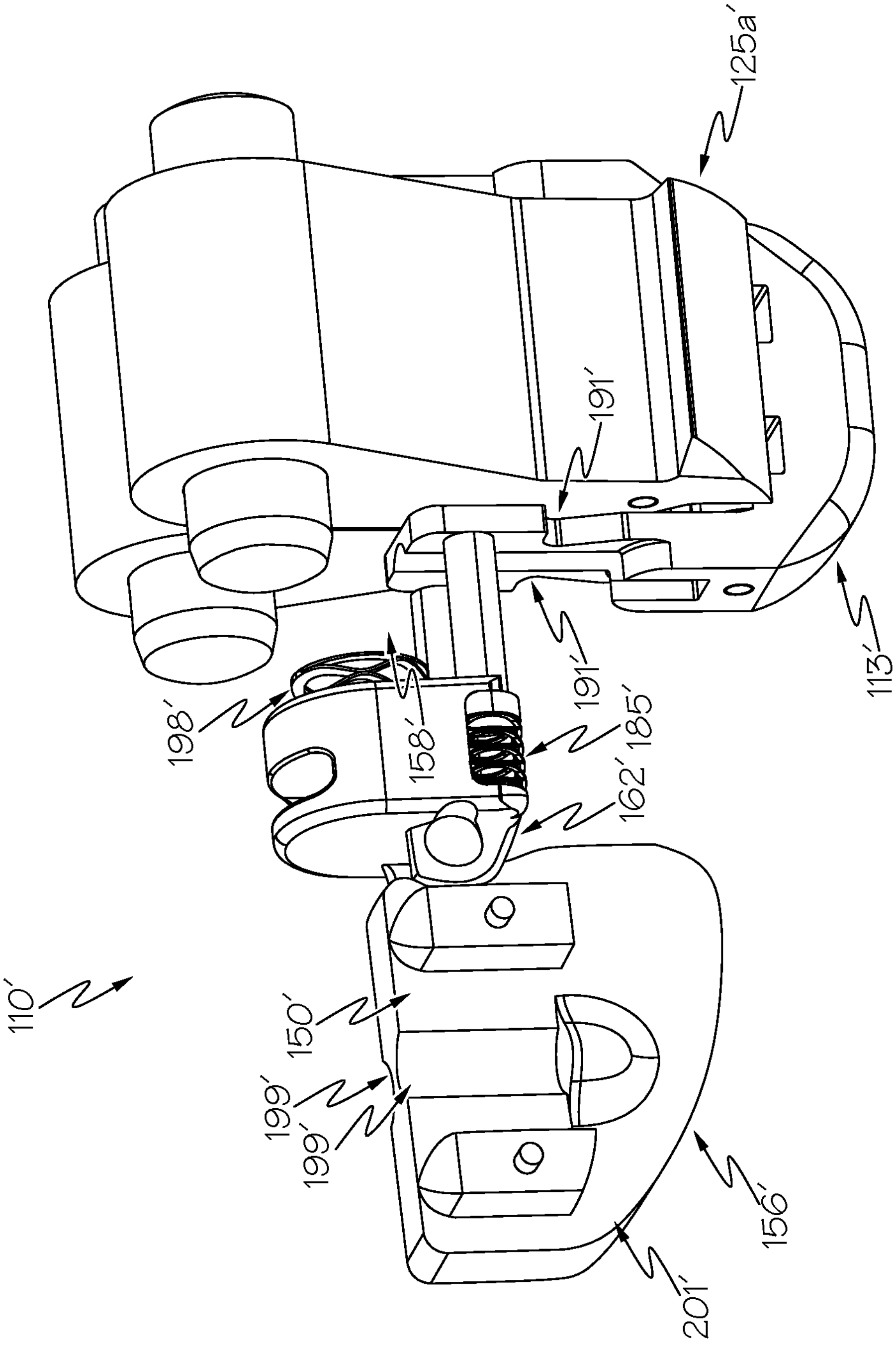

FIG. 15F illustrates a front perspective view of the fastener post assembly 110' with the body 152' and shroud 150' removed. Both the actuator body 113' and the lock button are in a deactivated state and thus the fastener post assembly 110' is not locked to a receiver in FIG. 15F. As stated above, the lock button 150' is operable to translate in a vertical direction along the Z-axis. The lock button 150' is biased downward in the negative z-axis direction by a pair of bias springs (not shown) that are seated in lock button spring seats 199'. The lock button 150' has a tapered front end 201' to allow it to contact a surface of the receiver such that the lock button 150' is translated upward when it is laterally slid into a fastener 190.

Figure 15G:
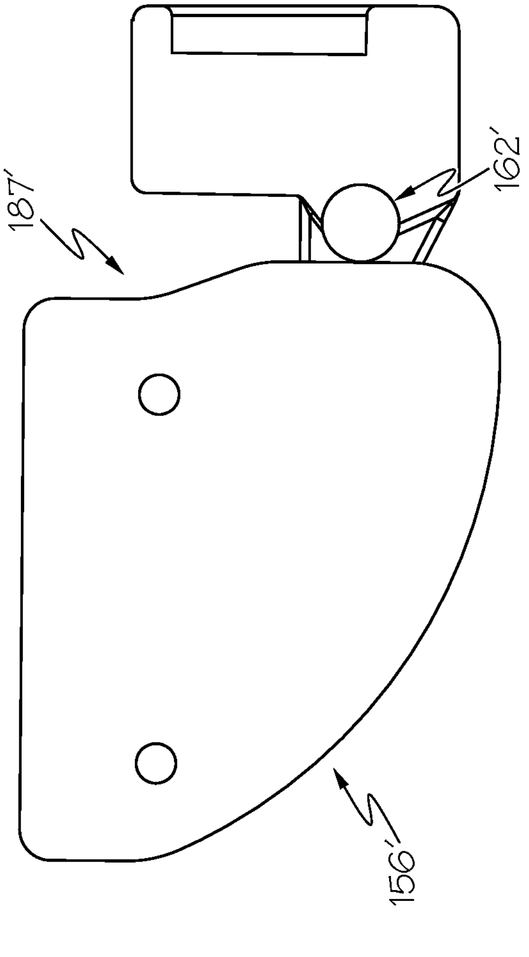

Referring briefly to FIG. 15G, the end of the lock button 150' opposite from the tapered front end 201' is a cam surface 187'. The cam surface 187' is operable to contact a cam follower 162' of a slider 183'. The cam surface 187' is shaped such that it pushes the cam follower 162' and the slider 183' forward along the positive x-axis when the lock button 150' is moved upward along the positive z-axis.

Referring once again to FIG. 15F, the slider 183' includes the cam follower 162', as well as two locking pins 158' that are biased in a forward direction along the positive x-axis by a pair of pin bias springs 185'. A slider return spring 198' is provided between a face of the slider 183' and an interior surface of the front plate (not shown in FIG. 15F). The slider return spring 198' allows the slider 183' to move back along the negative x-axis when the lock button 156' moves down to its deactivated, unlocked state.

In the deactivated state shown in FIG. 15F, the ends of the locking pins 158' are pressed against, or nearly contact, a front face of an upper portion of the actuator body 113'. The actuator body 113' also includes a pair of pin slots 191' operable to receive locking pins 158' when both the actuator body 113' and the lock button 156' are pushed upward along the positive z-axis.

Figure 15H:
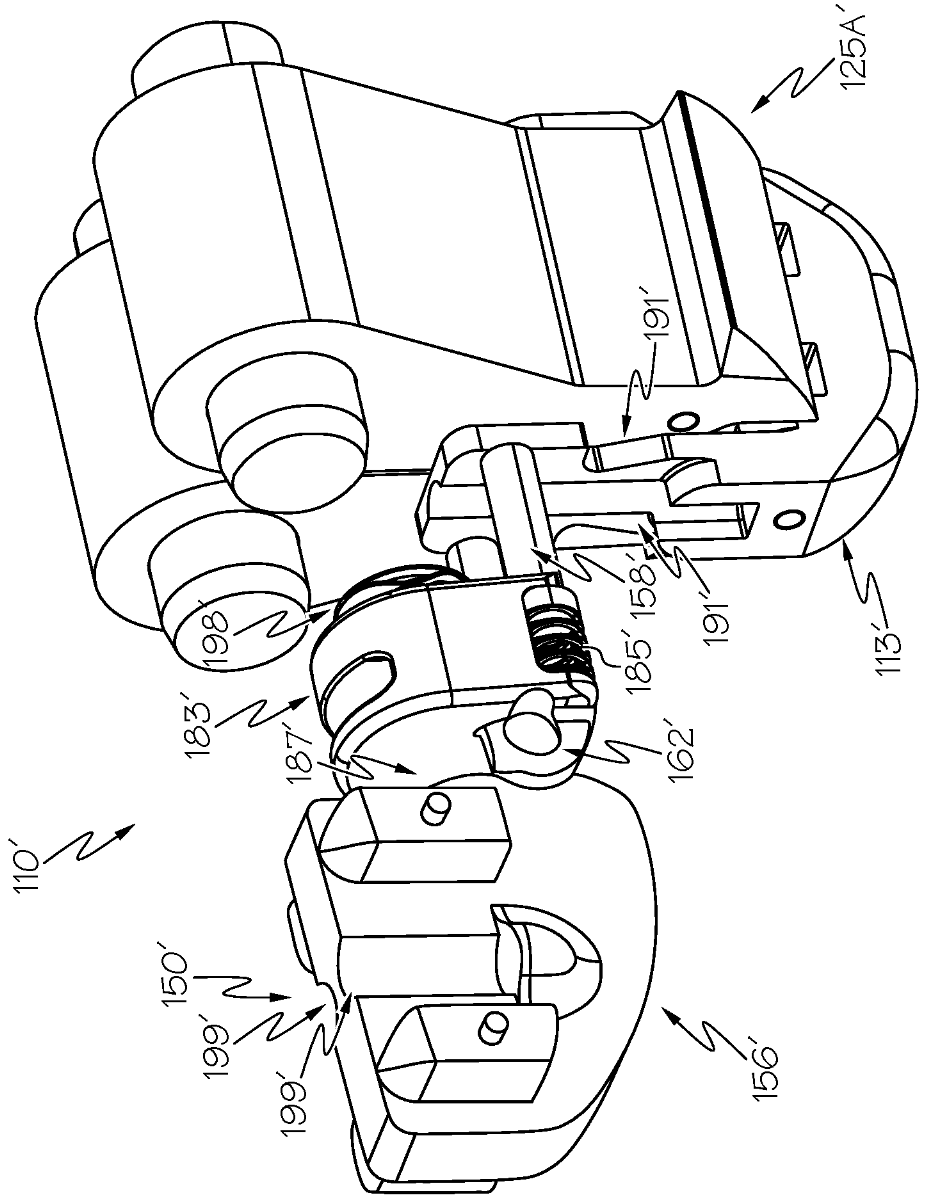

Because the lock button 156' is positioned forward of the actuator body 113', it is translated upward by a surface of the fastener 190 prior to the actuator body 113'. FIG. 15H illustrates the lock button 156' in an activated state (i.e., pushed up along the positive z-axis) and the actuator body 113' still in a deactivated state. In the activated state, the cam surface 187' pushes the cam follower 162' and the slider 183' toward the actuator body 113' such that the locking pins 158' are pressed against the upper portion of the actuator body 113' because the actuator body 113' is not yet raised. The pin bias springs 185' are in compression in this state.

Figure 15I:
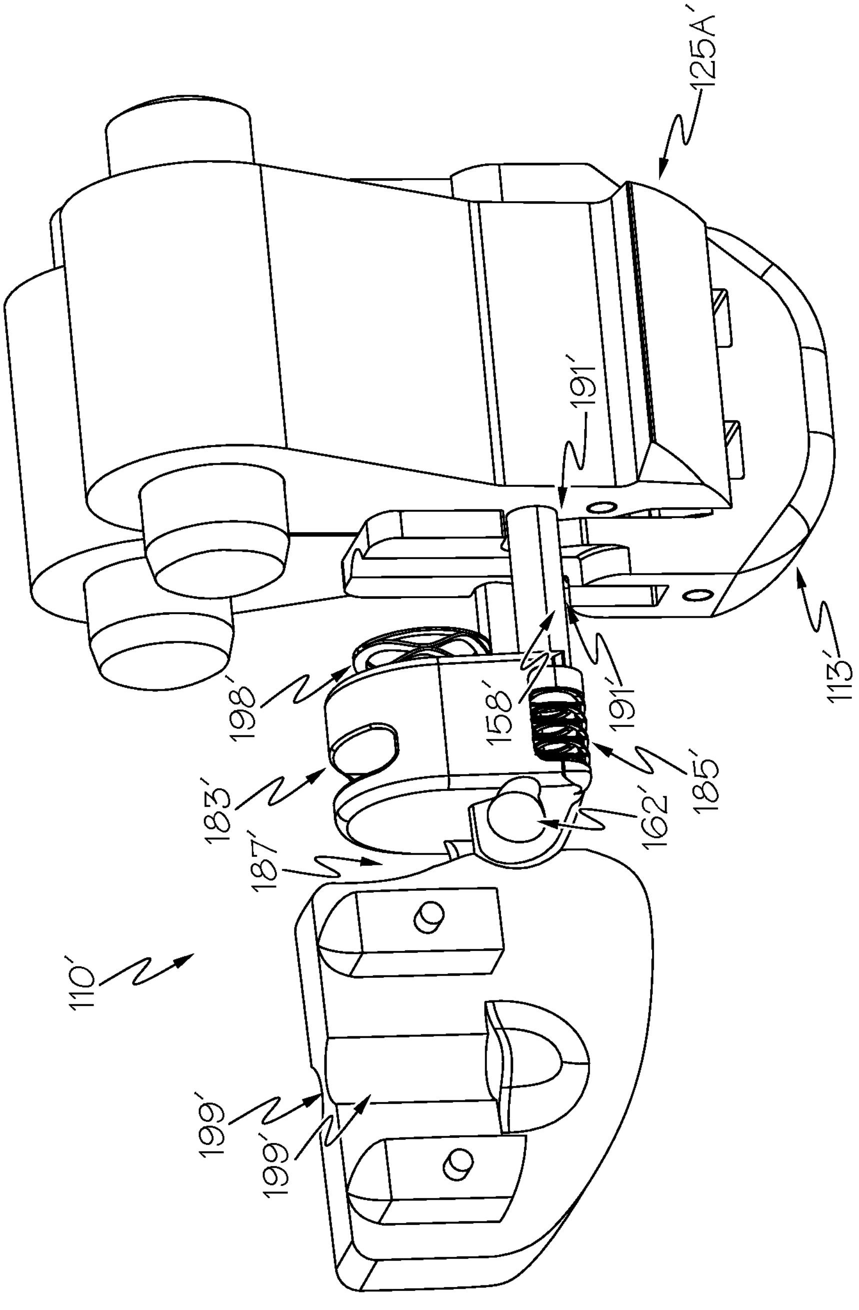

FIG. 15I illustrates the fastener post assembly 110' when both the lock button 156' and the actuator body 113' are in an activated state (i.e., the fastener post assembly 110' is locked to a fastener 190). The slider 183' is still pushed forward by the cam surface 187' of the lock button 156'. The actuator body 113' is now pushed up in the positive z-axis direction. In this position of the actuator body 113' the pin slots 191' are now aligned with the locking pins 158'. Because the pin bias springs 185' are in compression, they push the locking pins 158' toward the actuator body 113' such that they snap into the pin slots 191'. The locking pins 158' prevent downward motion of the actuator body 113', and thus keep the fastener post assembly 110' locked to the fastener 190. In this manner, the locking mechanism can maintain the fastener post assembly 110' in a locked state even when the emergency vehicle is traveling over rough terrain or is in an accident.

When the fastener post assembly 110' is removed from the fastener 190, the lock button 156' slides down, which changes the position of the cam follower 162' on the cam surface 187'. The slider return spring 198' is in compression and therefore moves the slider 183' and the locking pins 158' away from the actuator body 113' such that the locking pins 158' are removed from the pin slots 191'. Removal of the locking pins 158' from the pin slots 191' allows the actuator body 113' to drop, which causes the locking arms 125A, 125B to rotate inward to unlock the fastener post assembly 110' from the receiver.

Figure 16:
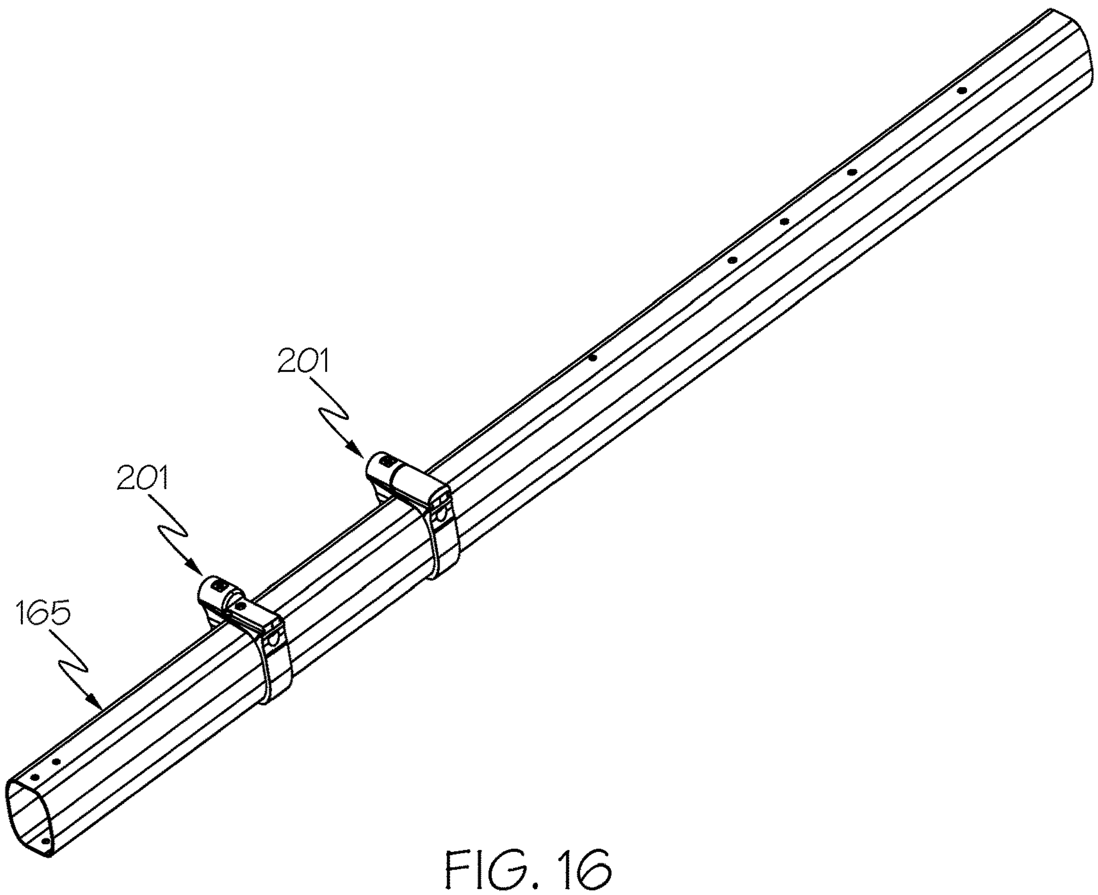
FIG. 16 illustrates a perspective view of an example side rail of a cot according to one or more embodiments described and illustrated herein.
Figure 17:
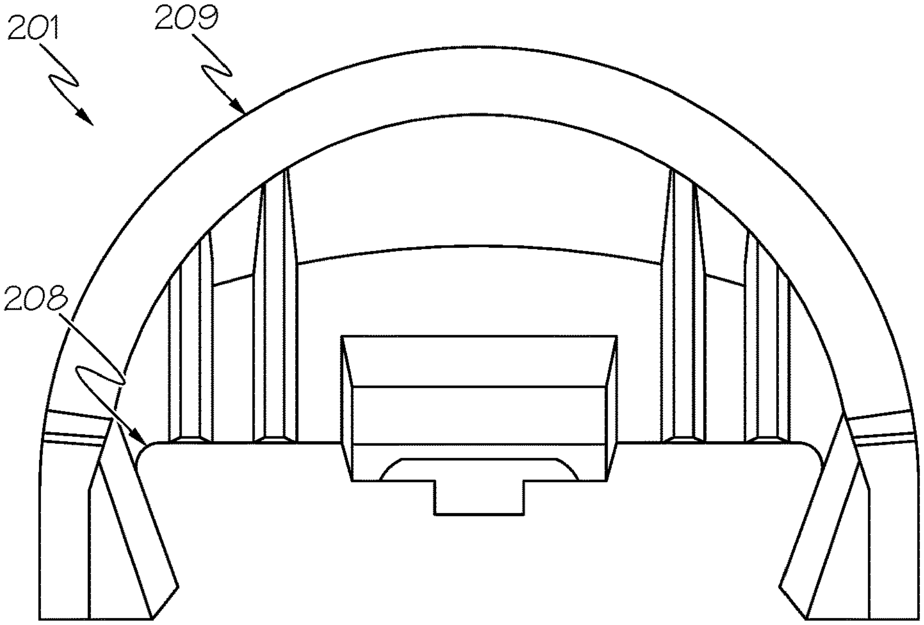
FIG. 17 illustrates a front view of an example universal accessory mount according to one or more embodiments described and illustrated herein.
Figure 18:
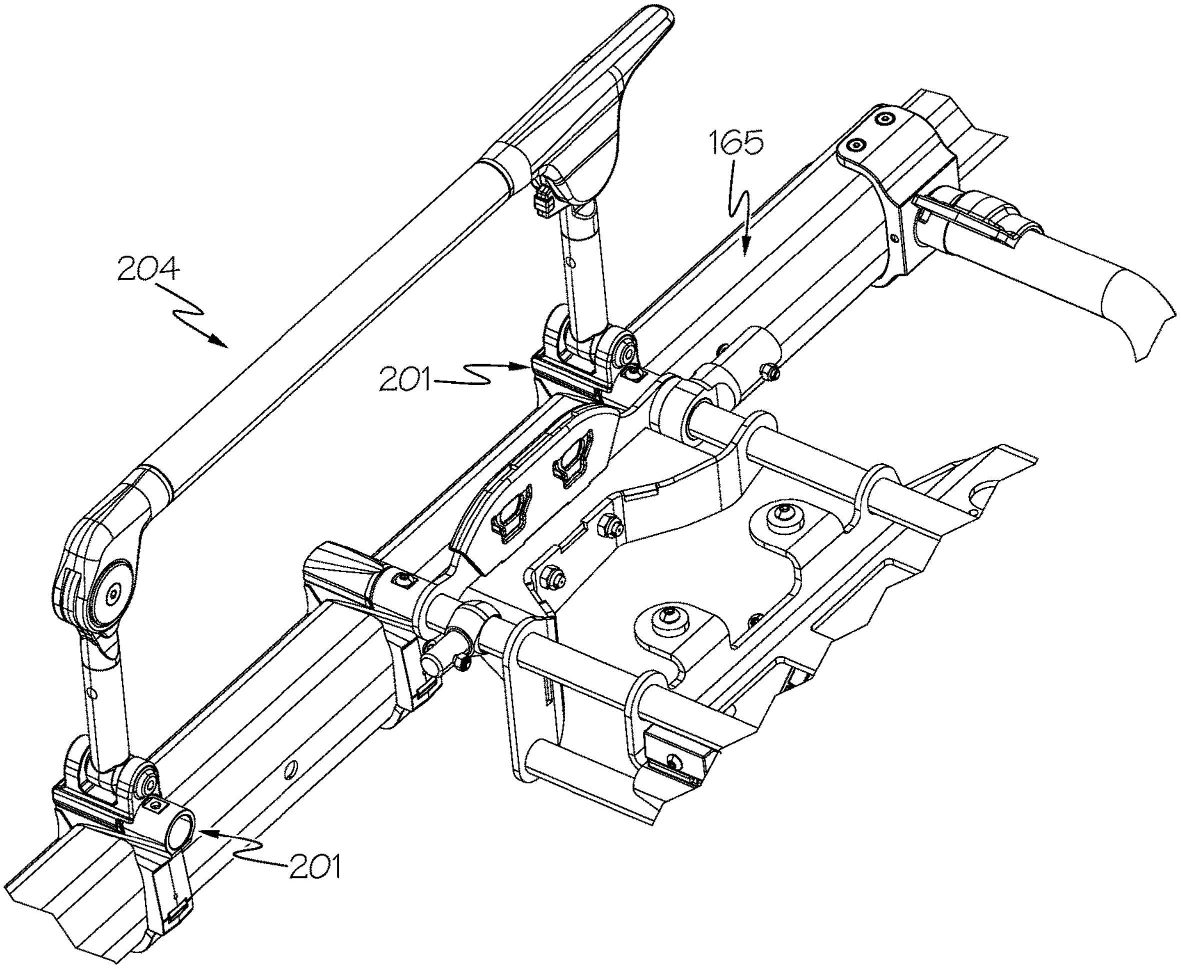
FIG. 18 illustrates a perspective view of an accessory mounted to a side rail by a universal accessory mount according to one or more embodiments described and illustrated herein.

In some embodiments, the cot 100 includes universal mounts 201 for connecting accessories to the support frame 102. FIG. 16 illustrates two universal mounts 291 that are clamped onto the second rail 165. The universal mounts 291 may have a lower portion and an upper portion so that they may be securely clamped onto the second rail 165. Any number of universal mounts 291 may be positioned on the second rail 165 at different locations. The universal mounts 291 have a dovetail configuration on a top surface 208 that may be covered by a cover 209 when not in use, as shown in FIGS. 16 and 17. FIG. 18 illustrates a surface extender 204 accessory that is slid onto the universal mounts 291. Any type of accessory may be slid onto the universal mounts 291. Each accessory has a corresponding mating feature that is configured to mate with the dovetail surface of the universal mounts 291.

Figure 19:
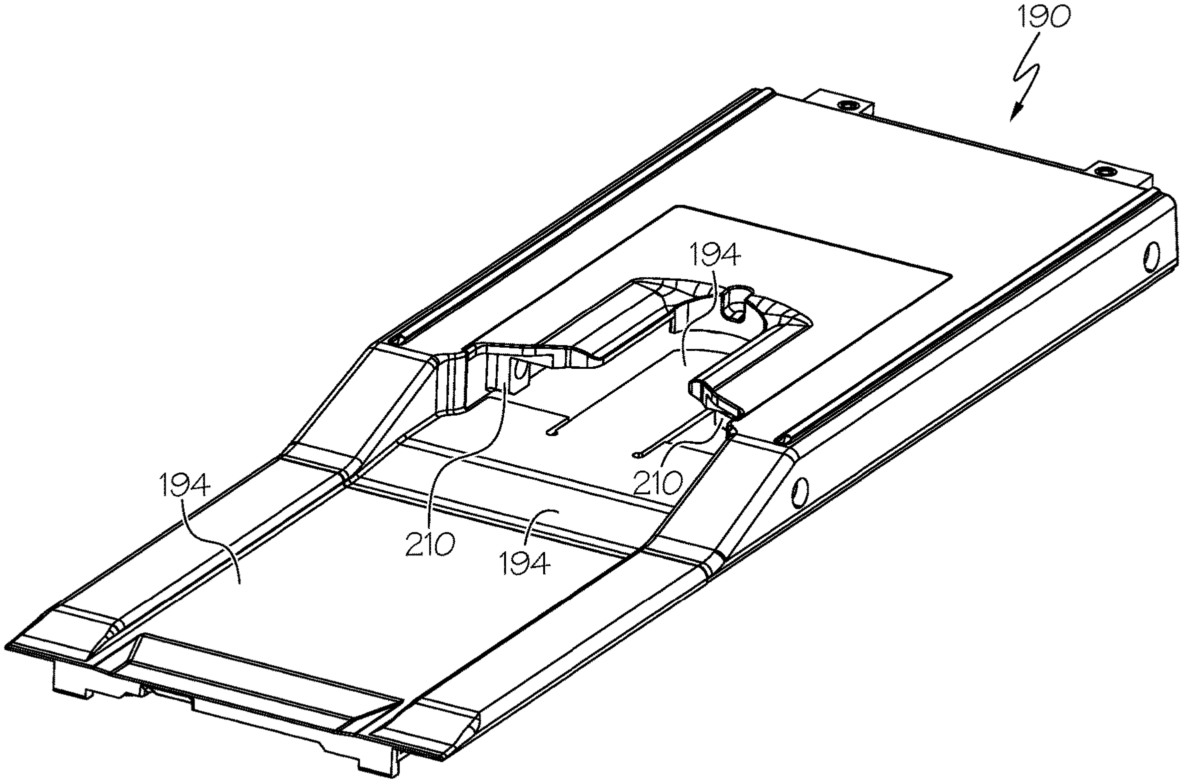
FIG. 19 illustrates close-up perspective view of a fastener according to one or more embodiments described and illustrated herein.

In some embodiments, the cot 100 may have a rechargeable battery that is recharged when it is positioned within the fastener system 180. Two cot contacts mate with two fastener system contacts to provide electrical current to the battery. FIG. 19 illustrates an example fastener 190 having two fastener system contacts 210 on opposite sides of an activation surface 194. These fastener system contacts 210 are positioned and configured to mate with corresponding cot contacts or charging pins, and are electrically coupled to a power source associated with the emergency vehicle, such as the main battery of the emergency vehicle.

Figure 19A:
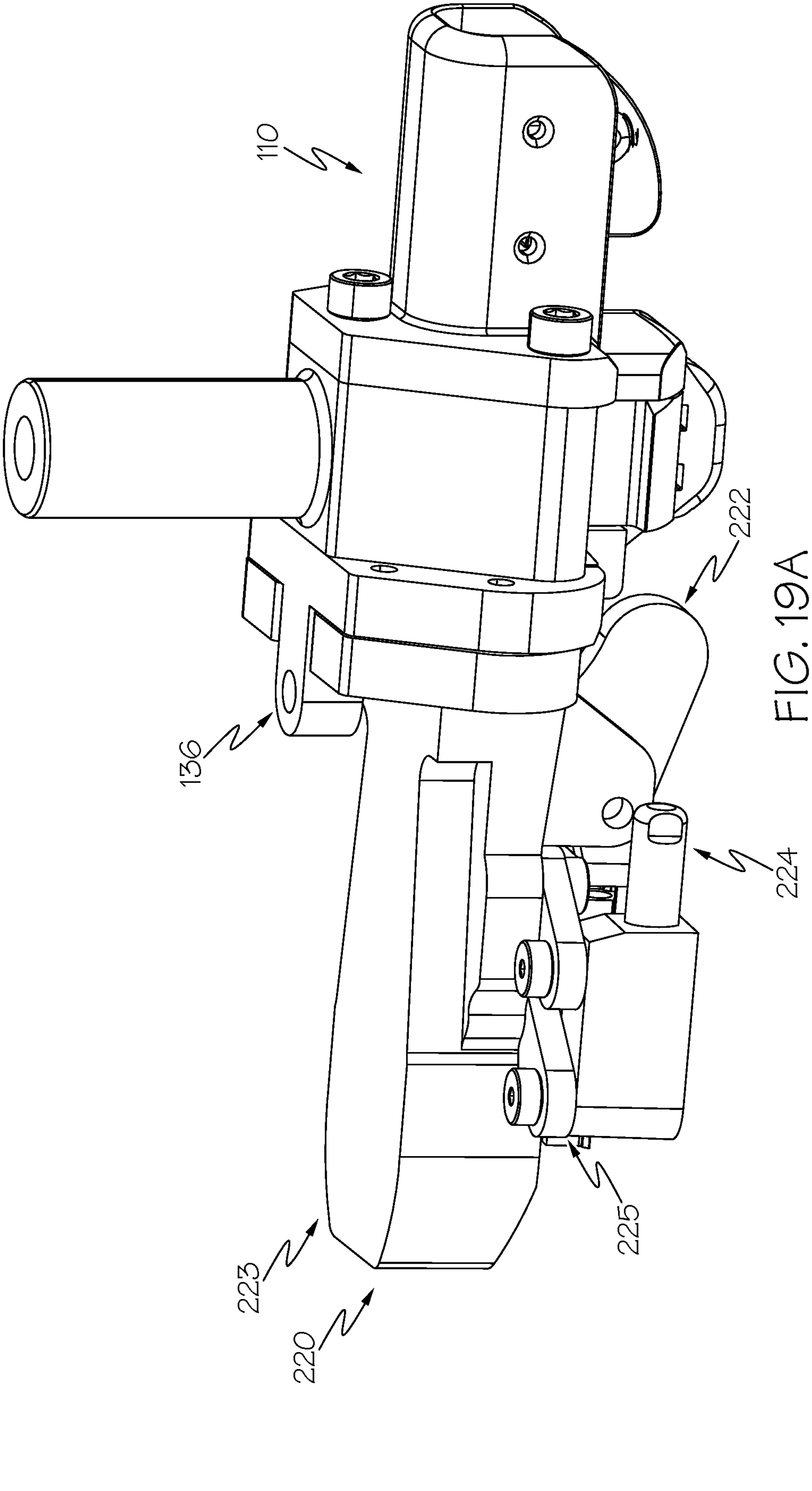
FIGS. 19A and 19B illustrate perspective views of an example cot charging assembly according to one or more embodiments described and illustrated herein.
Figure 19B:
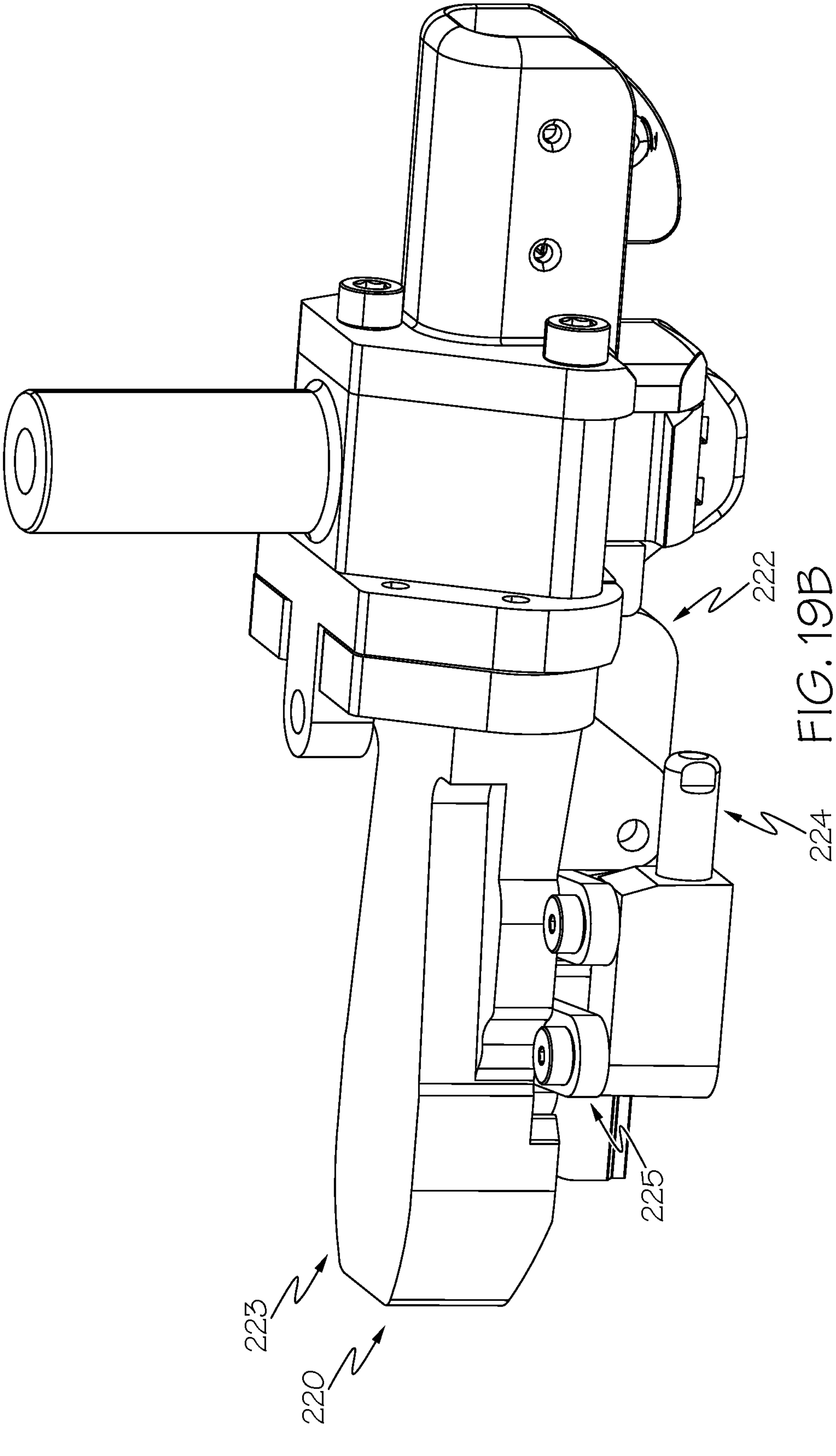

The cot contacts may take on a variety of different configurations. FIGS. 19A and 19B illustrate an example cot charging assembly 220 operable to mate with the fastener system contacts 210. FIG. 19A illustrates the cot charging assembly 220 in a disengaged state (i.e., the fastener post assembly 110 is not within the fastener 190) and, FIG. 19B illustrates an engaged state (i.e., the fastener post assembly 110 is within the fastener 190). In this example, the cot charging assembly 220 is attached to the rear plate 136 of the fastener post assembly 110. Thus, the cot charging assembly 220 follows the fastener post assembly 110 as the cot 100 is loaded into the fastener system 180. In other embodiments, the cot charging assembly 220 is not attached to the rear plate.

The cot charging assembly 220 includes an activation lever 222 that is positioned and configured to contact the activation surface 194 of the fastener 190, and two cot charging contacts 224 configured as pins that are coupled to a main body 223 by linkages 225. A force applied to the activation lever 222, such as the activation lever contacting the activation surface 194, causes the activation lever 222 to rise up, which further causes the linkages to pivot and swing the cot charging contacts 224 forward toward the fastener post assembly 110. This causes the end surfaces of the cot charging contacts 224 to make contact with the two fastener system contacts 210 to provide an electrical connection therebetween. The two cot charging contacts 224 are electrically coupled to the battery (not shown) of the cot 100. Electrical current flows between the power source of the emergency vehicle to the battery of the cot 100 through the electrical contact between the two fastener system contacts 210 and the two cot charging contacts 224. The cot charging contacts 224 swing back away from the fastener post assembly 110 when the cot 100 is removed from the cot fastening system 180.

Figure 20A:
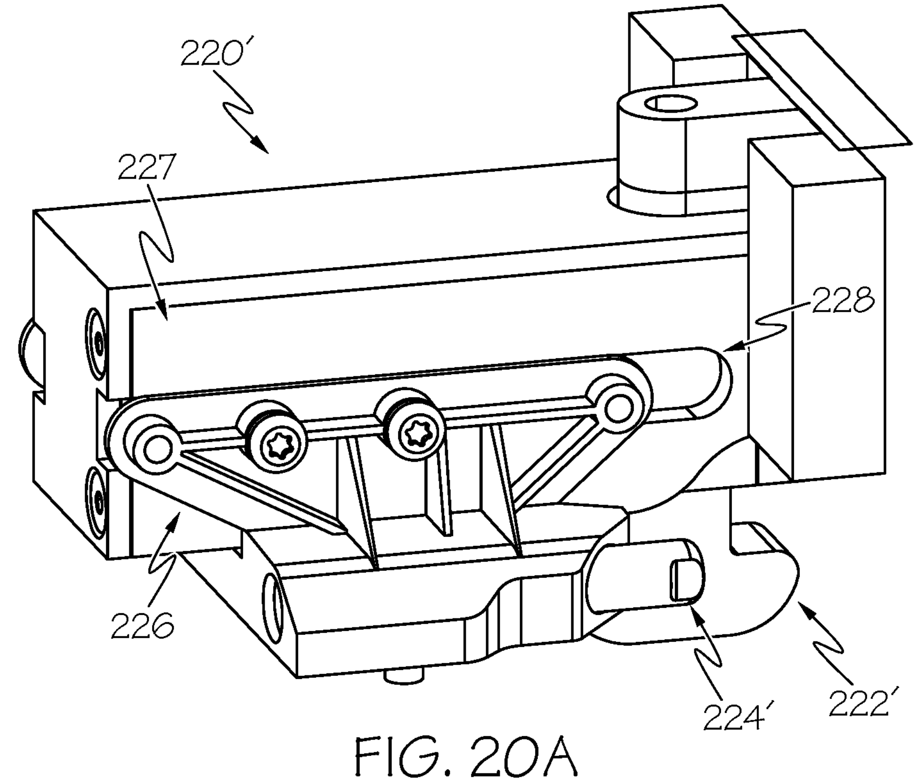
FIGS. 20A-20D illustrate perspective views of another example cot charging assembly according to one or more embodiments described and illustrated herein.
Figure 20B:
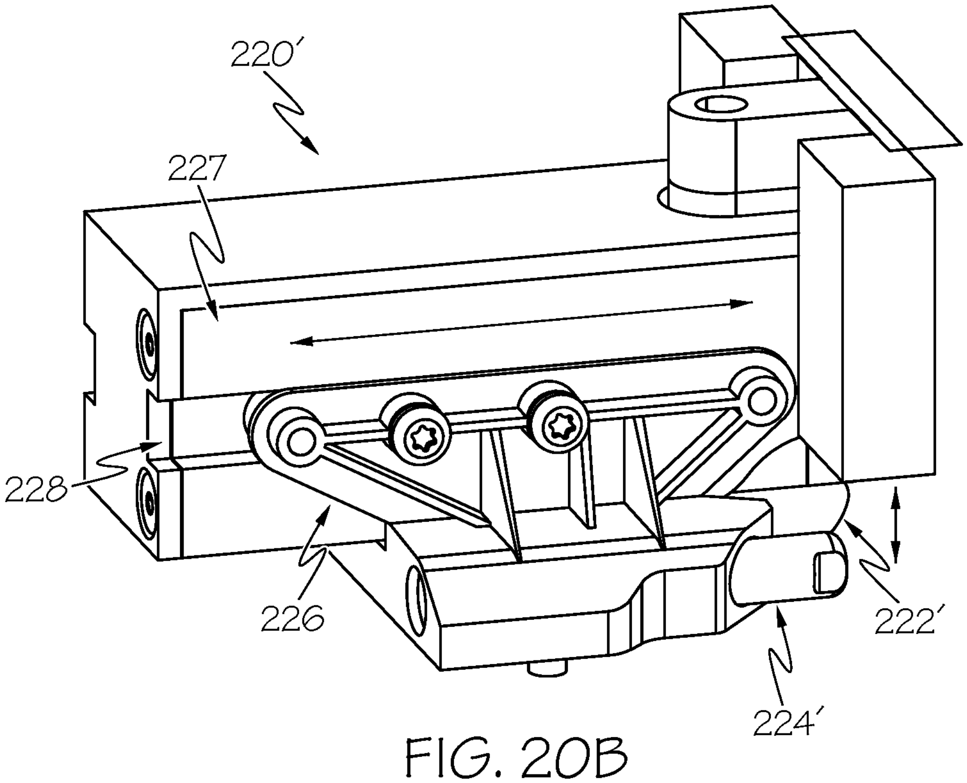
Figure 20C:
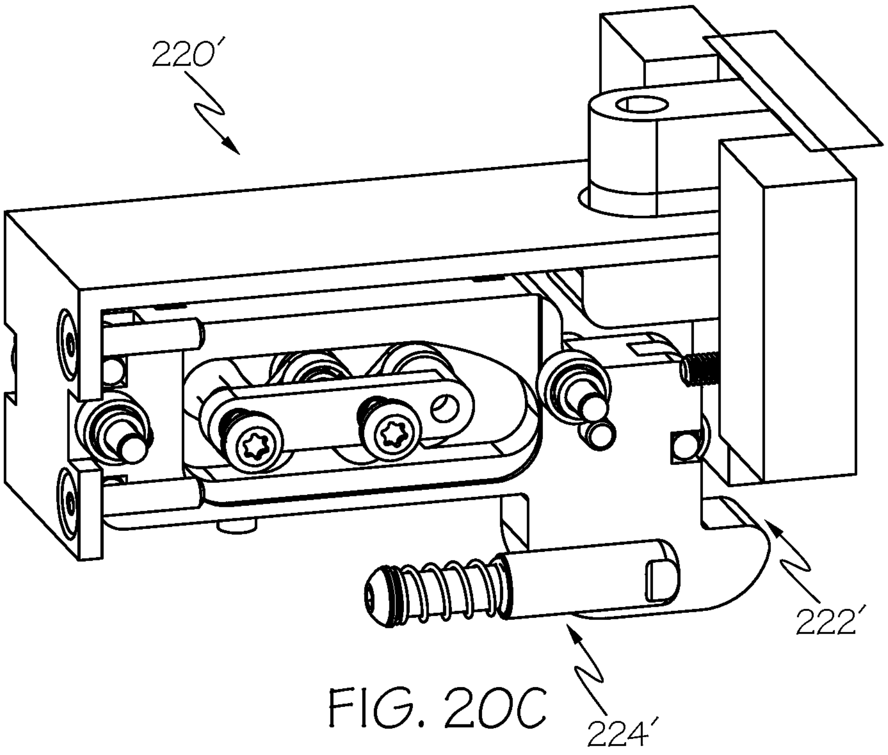
Figure 20D:
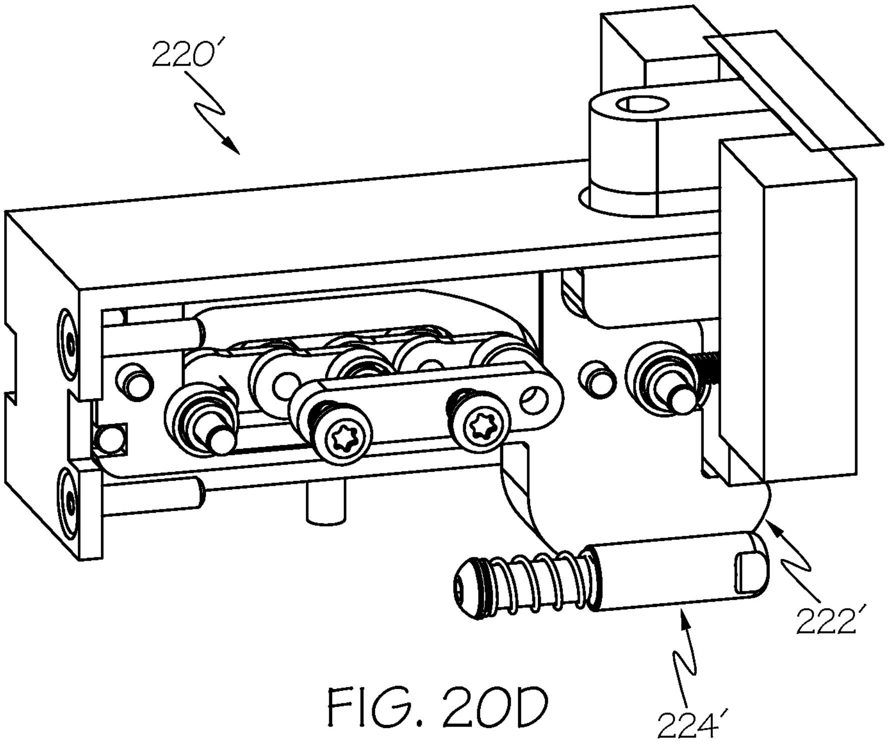

Referring now to FIGS. 20A-20D, another example cot charging assembly 220' is illustrated. FIG. 20A illustrates a fully assembled view of the cot charging assembly 220' in a disengaged state, while FIG. 20B illustrates a fully assembled view of the cot charging assembly 220' in an engaged state. FIGS. 20C and 20D are the same views as FIGS. 20A and 20B but with some components removed.

The cot charging assembly 220' includes two cot charging contacts 224' configured as pins that are disposed within a base of a linkage and roller assembly 226. The cot charging contacts 224' may have bias members that fit within bores of the linkage and roller assembly 226 to bias the cot charging contacts 224' against the fastener system contacts 210. The cot charging assembly 220' further includes an activation lever 222', and a plate 227 having a groove in which rollers of the linkage and roller assembly 226 are seated. Upward force on the activation lever 222' causes the linkage and roller assembly 226 to linearly translate toward the fastener post assembly 110 (not shown). This causes the cot charging contacts 224' to contact the fastener system contacts 210.

Figure 21A:
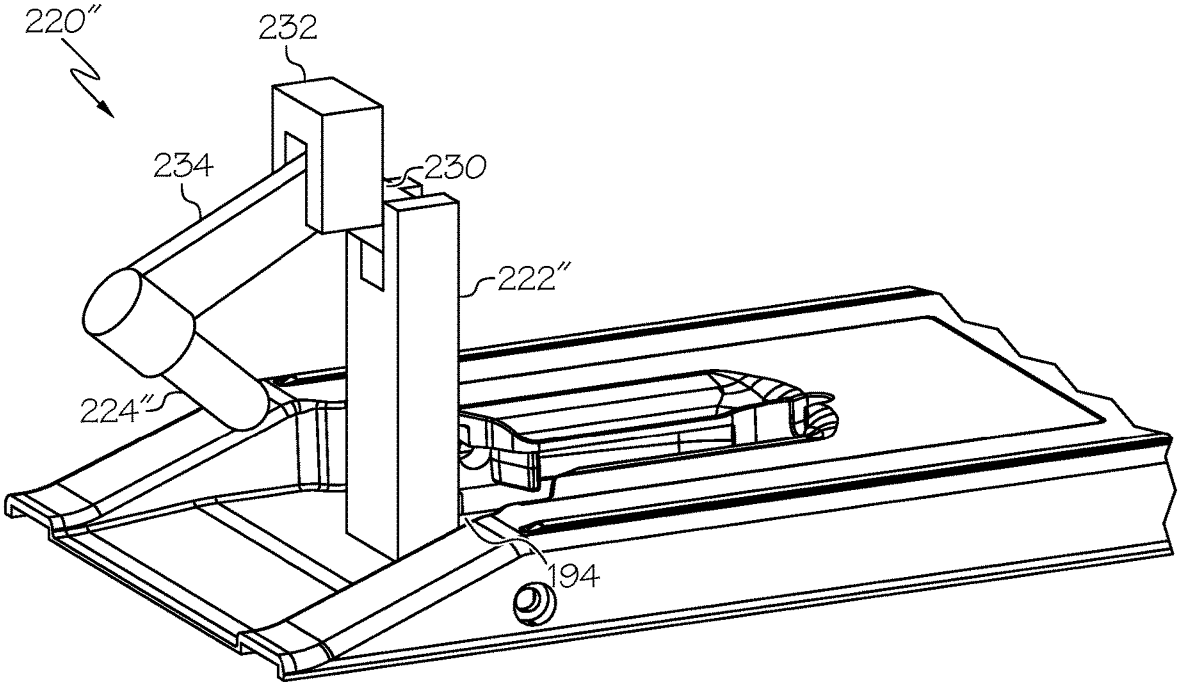
FIGS. 21A and 21B illustrate perspective views of another example cot charging assembly according to one or more embodiments described and illustrated herein.
Figure 21B:
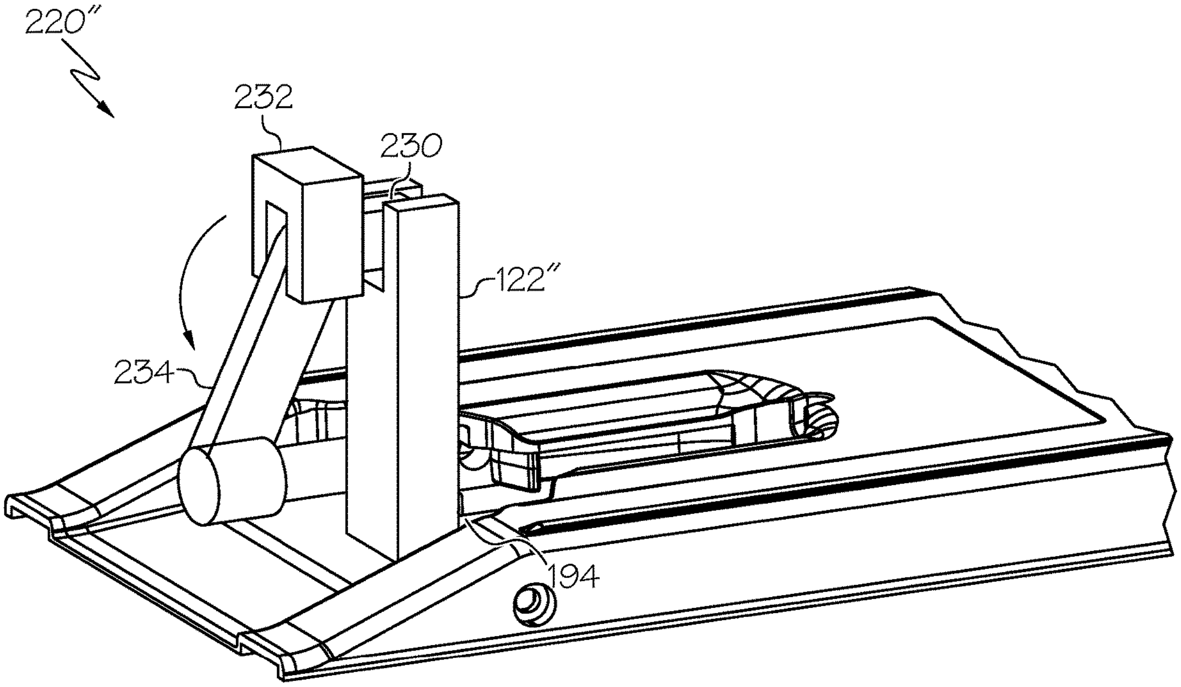

FIGS. 21A and 21B illustrate another example cot charging assembly 220". In this example, the activation lever 222" is a post that is pivotably coupled to a cot mount 232 by a first link 230. The cot mount 232 is rigidly coupled to a surface of the cot while the activation lever 222" is free to move up and down by way of the first link 230. A cot charging contact 224" is coupled to the first link 230 and the cot mount 232 by a second link 234. It should be understood that only one of the cot mount 232, activation lever 222", first link 230, second link 234 and cot charging contact 224" is shown for ease of illustration, and that another set of these components is provided to allow charging of the cot battery.

FIG. 21A shows the cot charging assembly 220" in a disengaged state. The weight of the activation levers 222" moves the cot charging contacts 224" up in a disengaged state. When the bottom of the activation levers 222" make contact with the activation surface 194 as shown in FIG. 21B, the activation levers 222" move upward, which causes the first link 230 and the second link 234 to pivot and swing the cot charging contacts 224" downward toward the fastener system contacts 210 (not visible in FIGS. 21A and 21B) as indicated by the arrow. When the cot 100 is removed from the fastener system 180, the cot charging contacts 224" swing up from the engaged state to the disengaged state due to the activation levers 222" moving down by gravity.

Figure 22A:
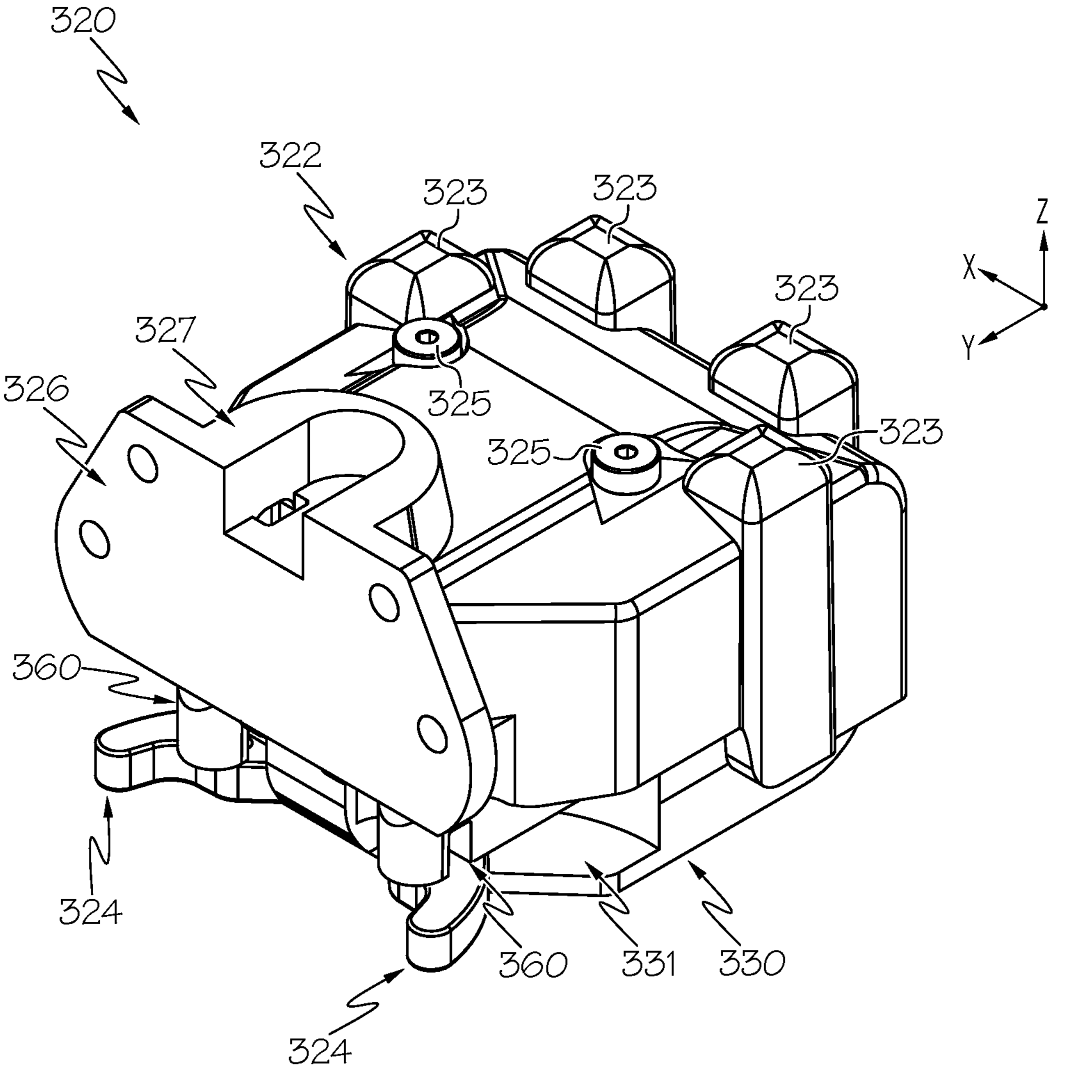
FIGS. 22A-22P illustrate various views of components of another example cot charging assembly according to one or more embodiments described and illustrated herein.
Figure 22B:
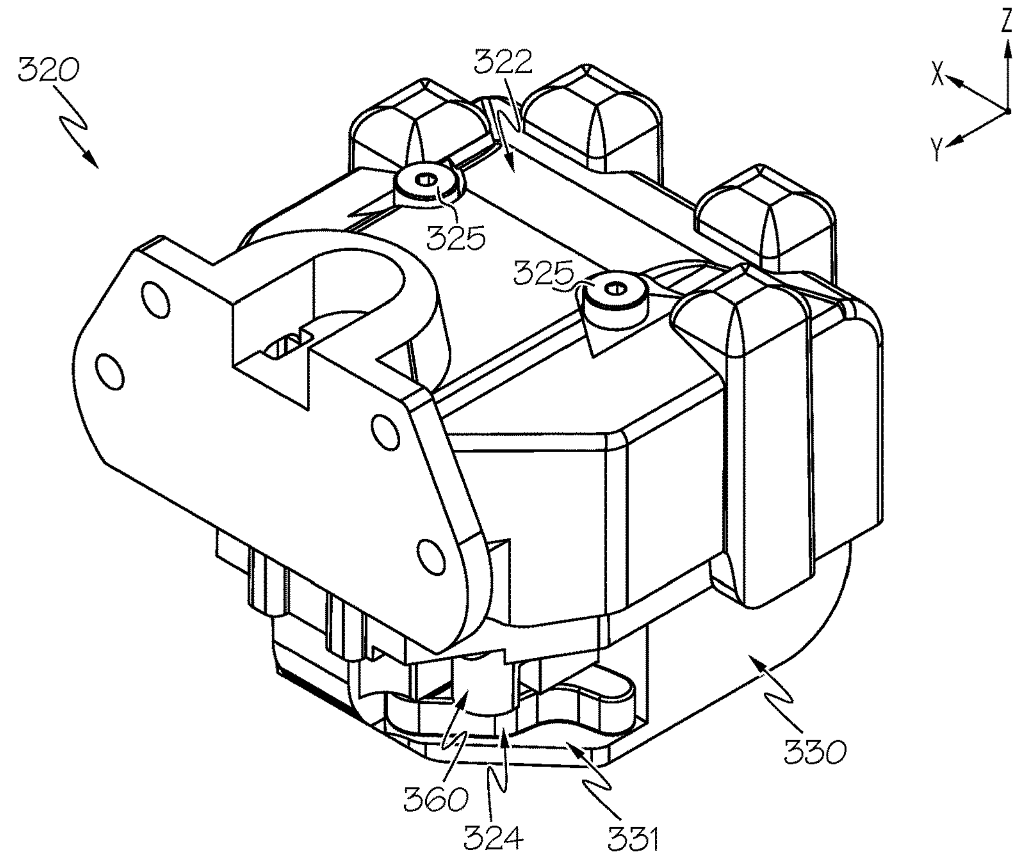
Figure 22C:
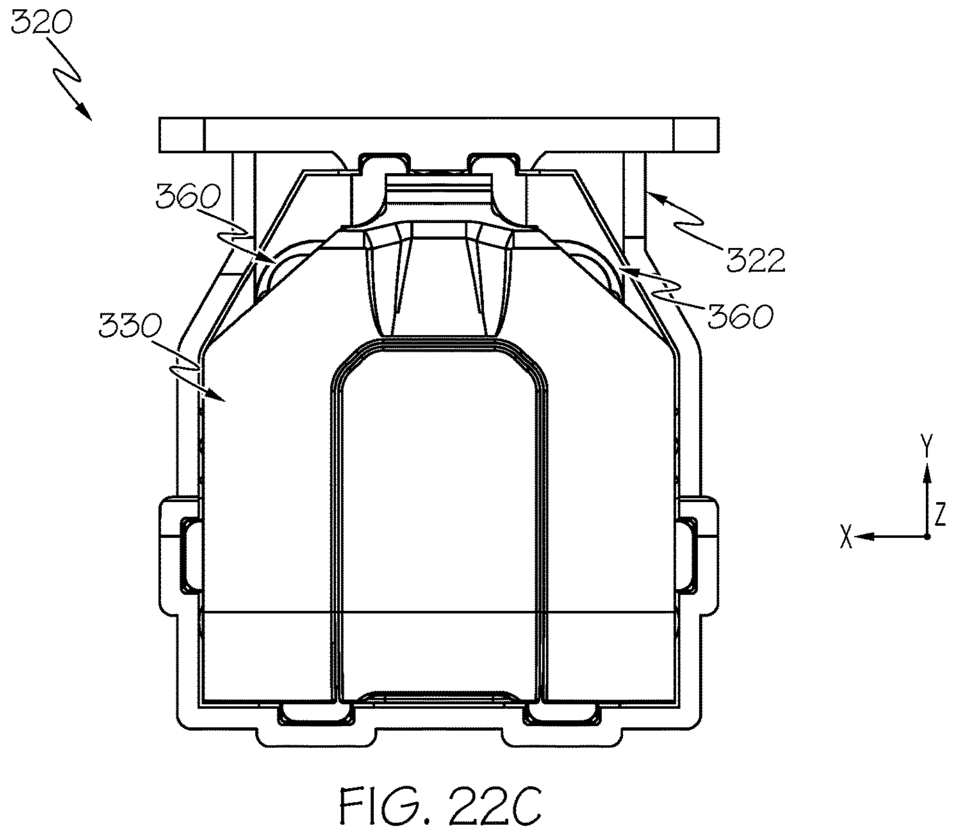
Figure 22D:
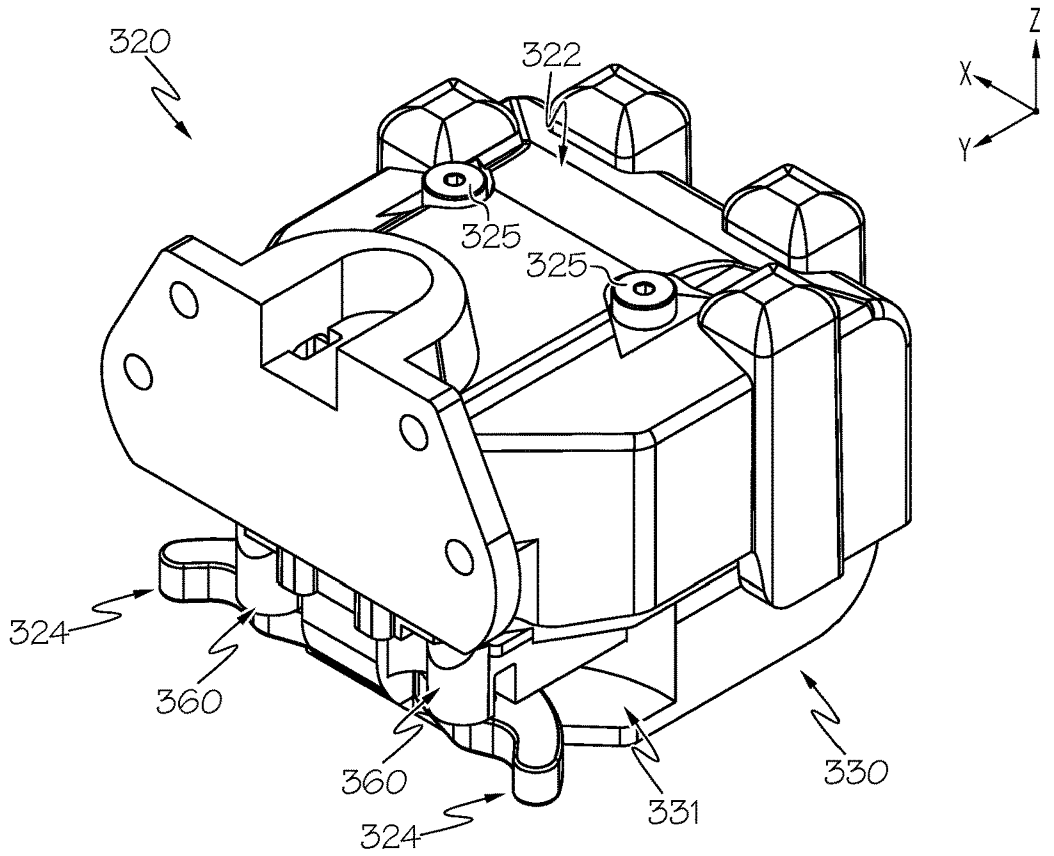
Figure 22E:
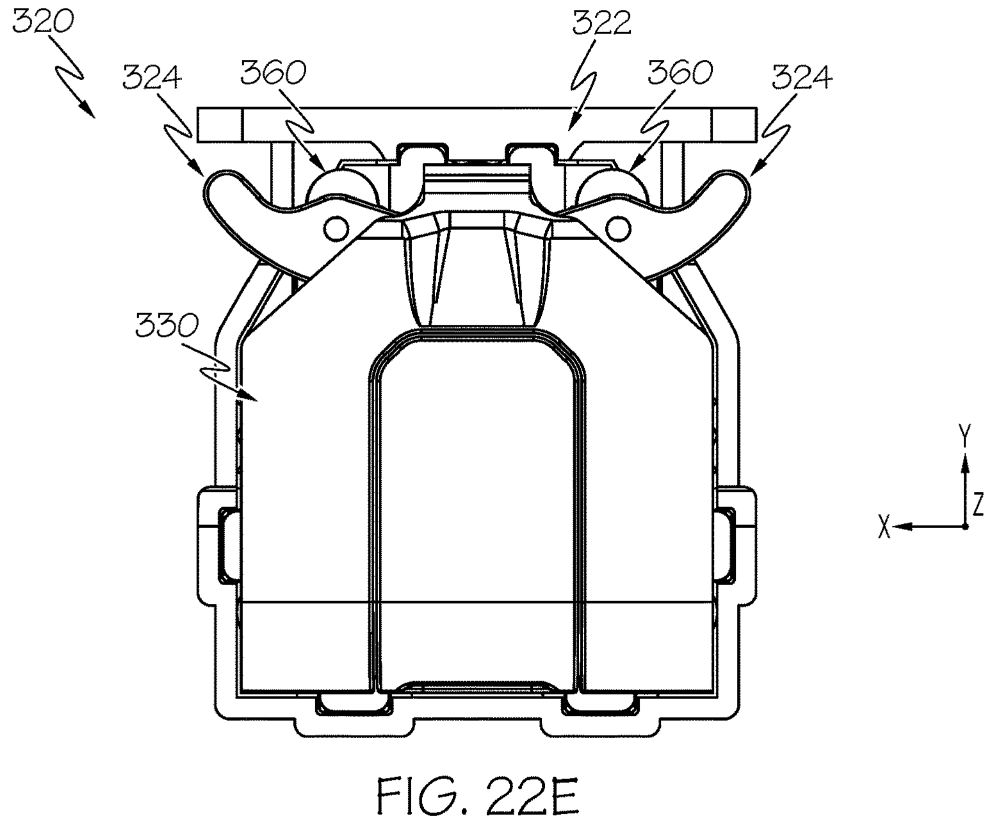
Figure 22F:
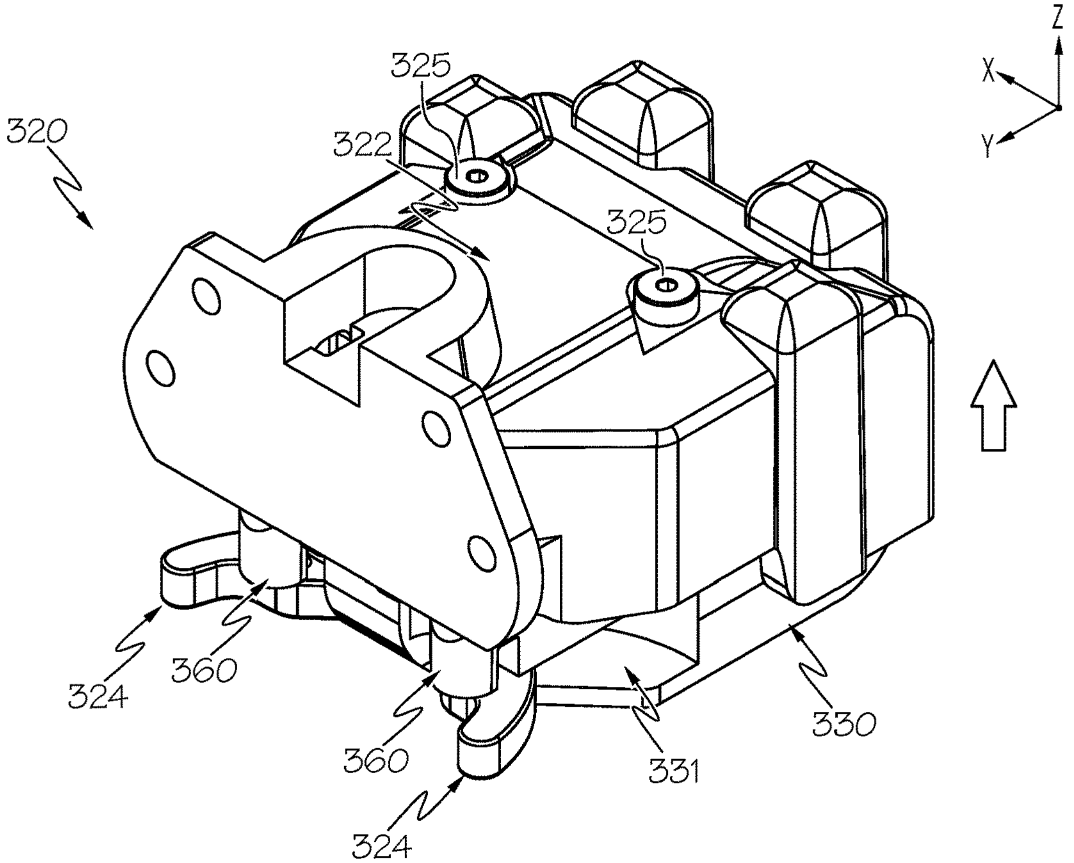
Figure 22G:
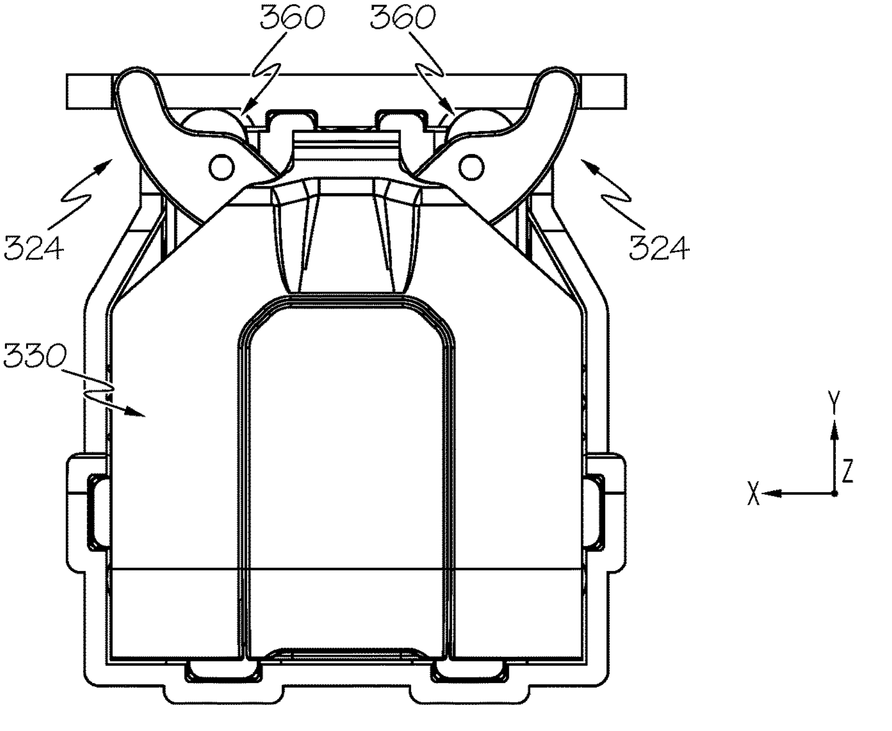
Figure 22H:
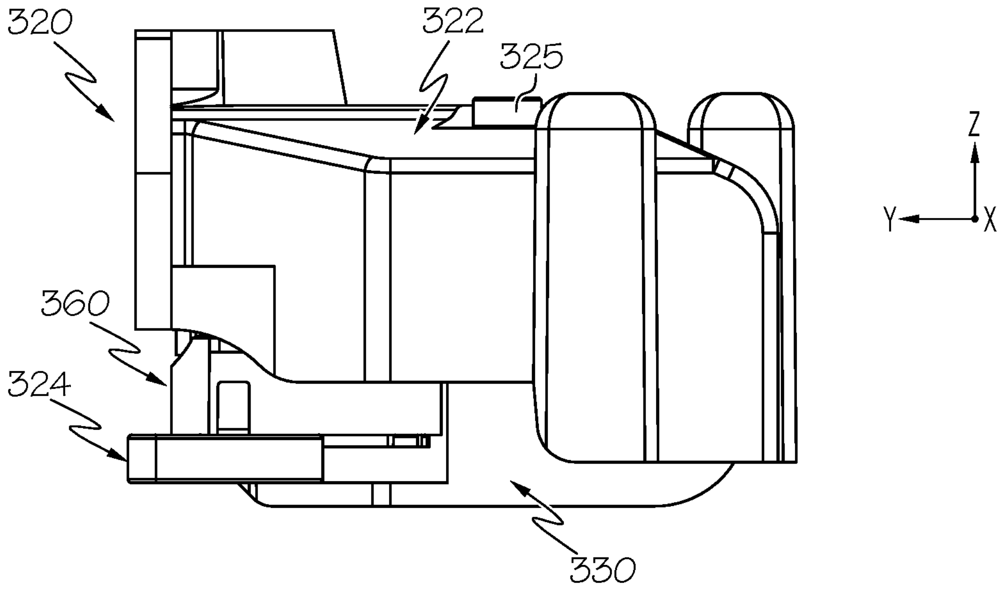
Figure 22I:
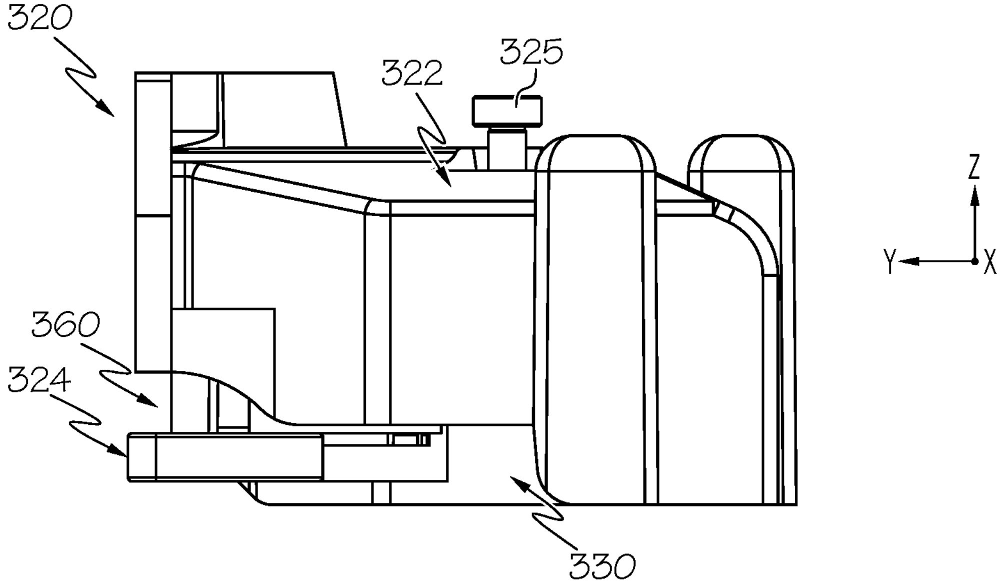
Figure 22J:
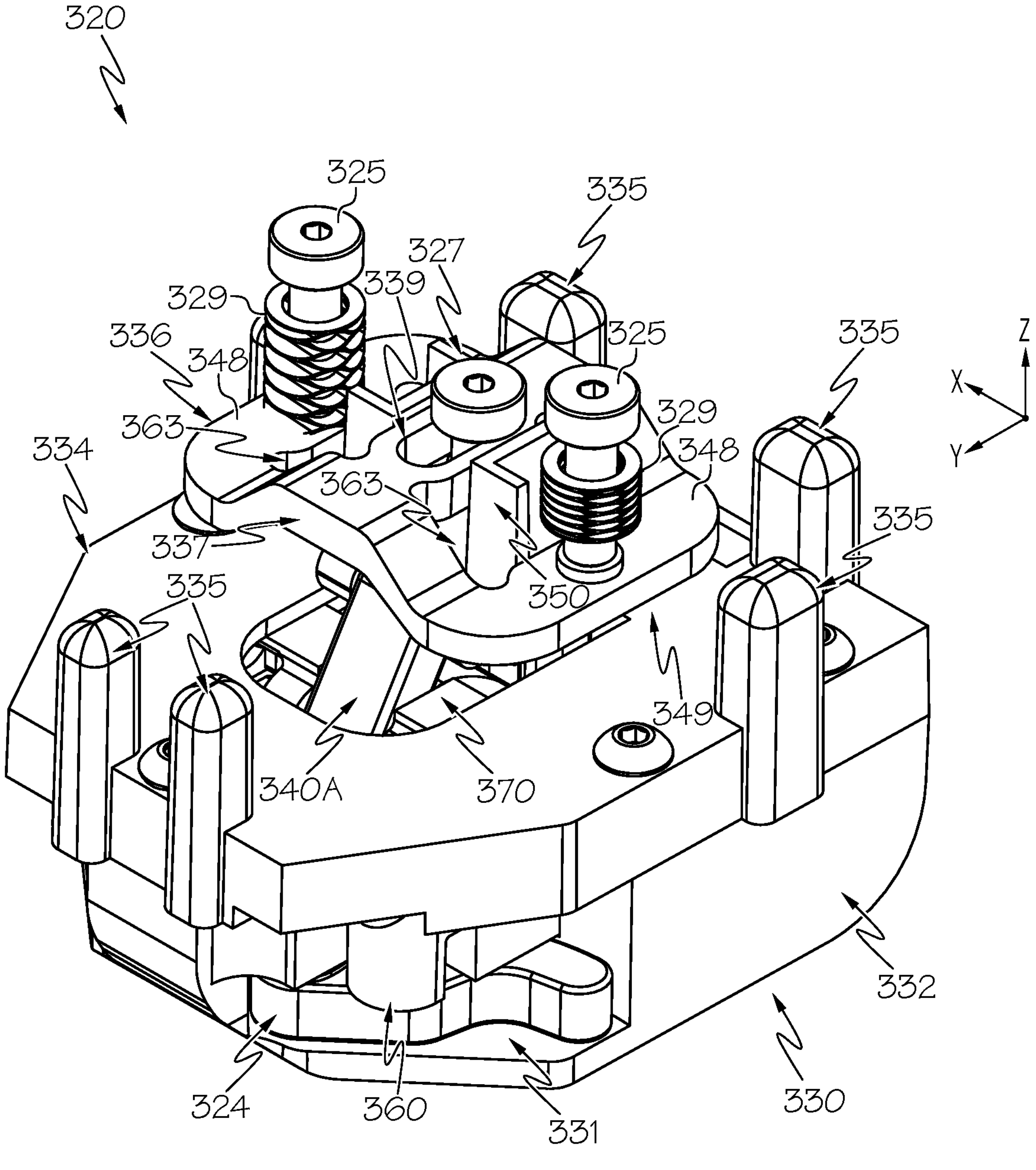
Figure 22K:
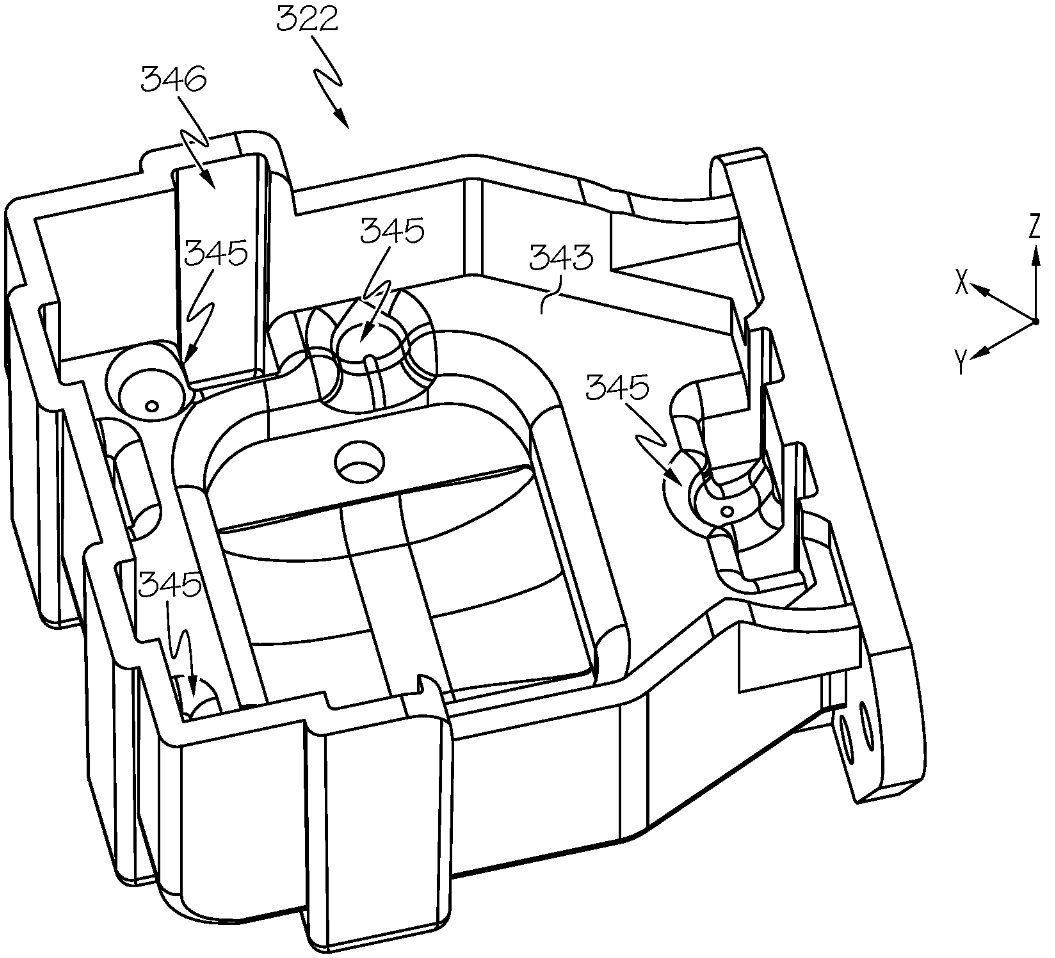
Figure 22L:
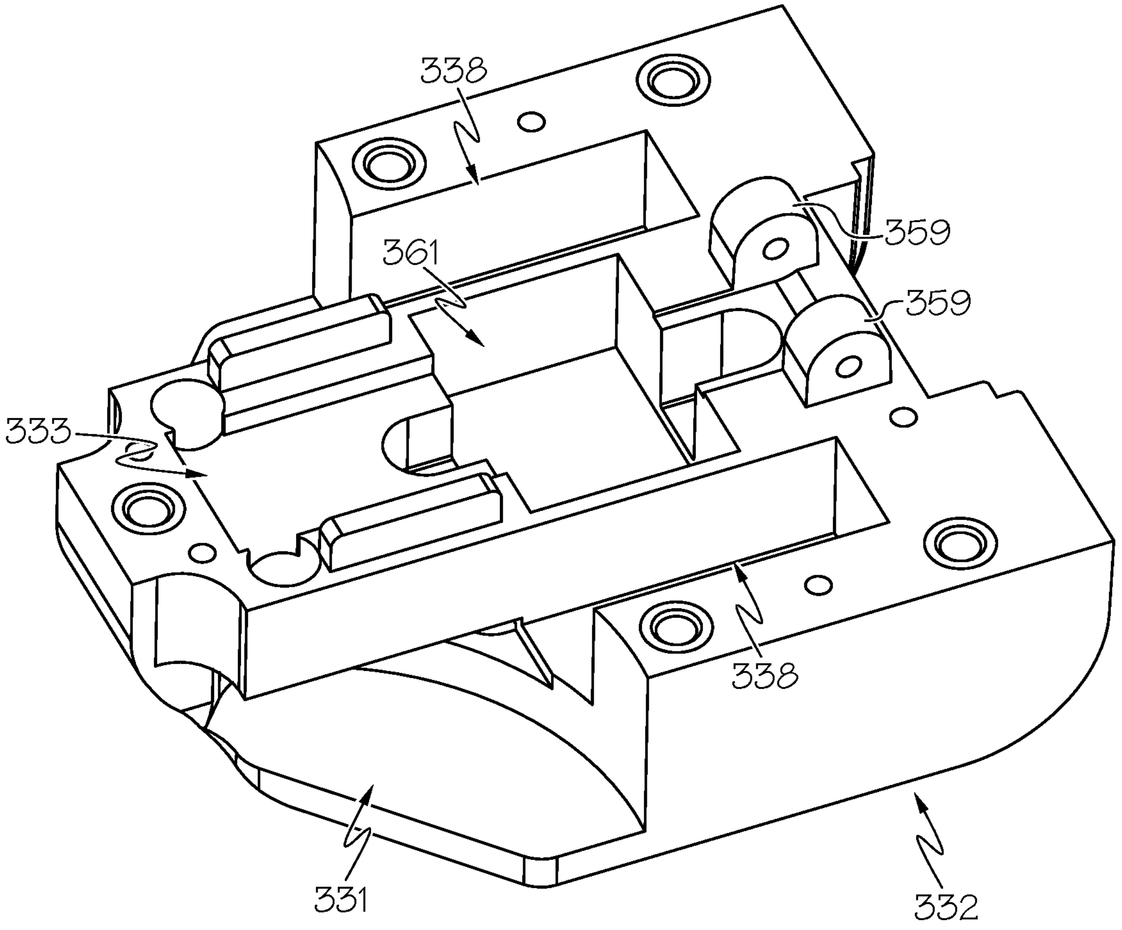
Figure 22M:
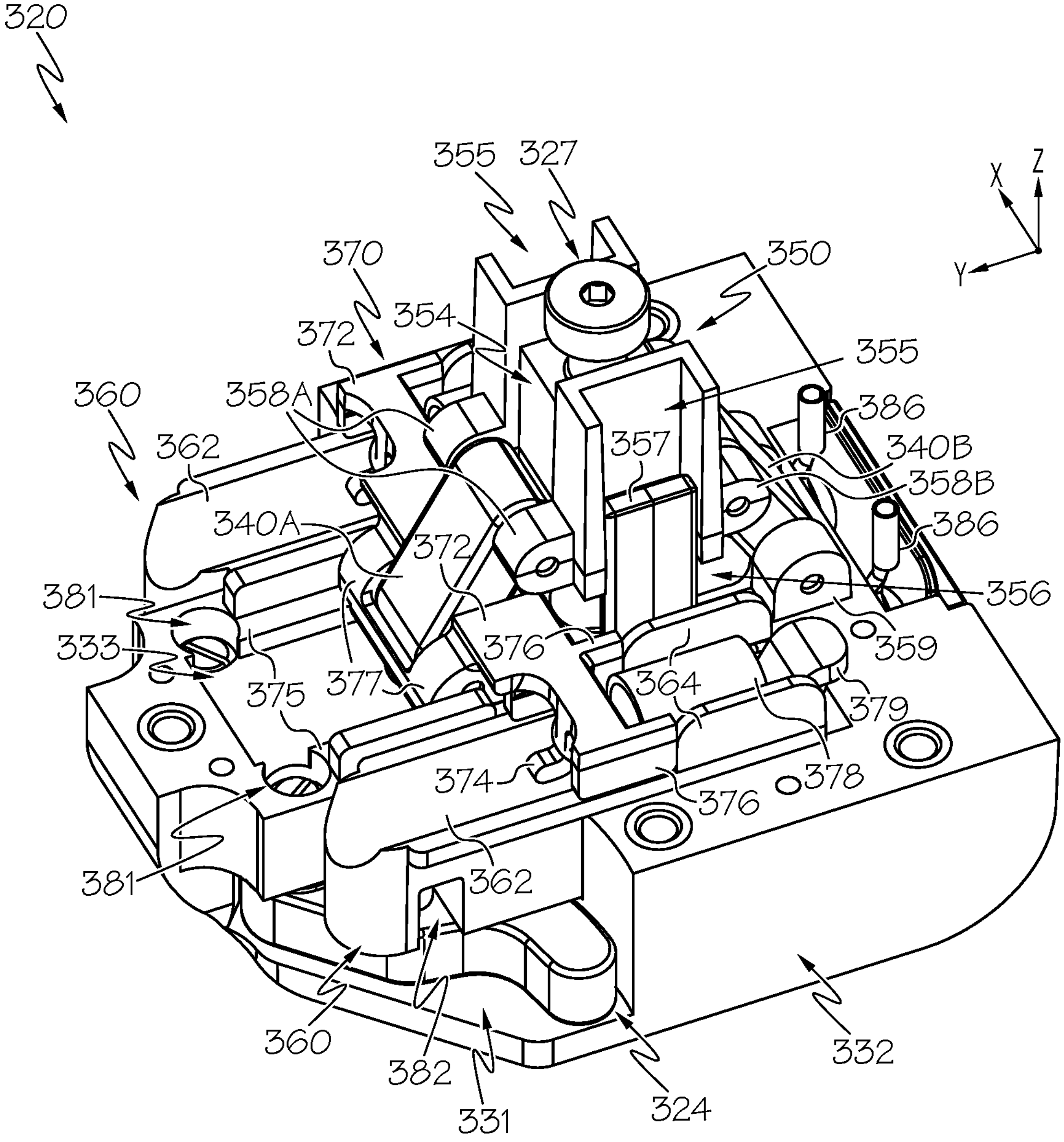
Figure 22N:
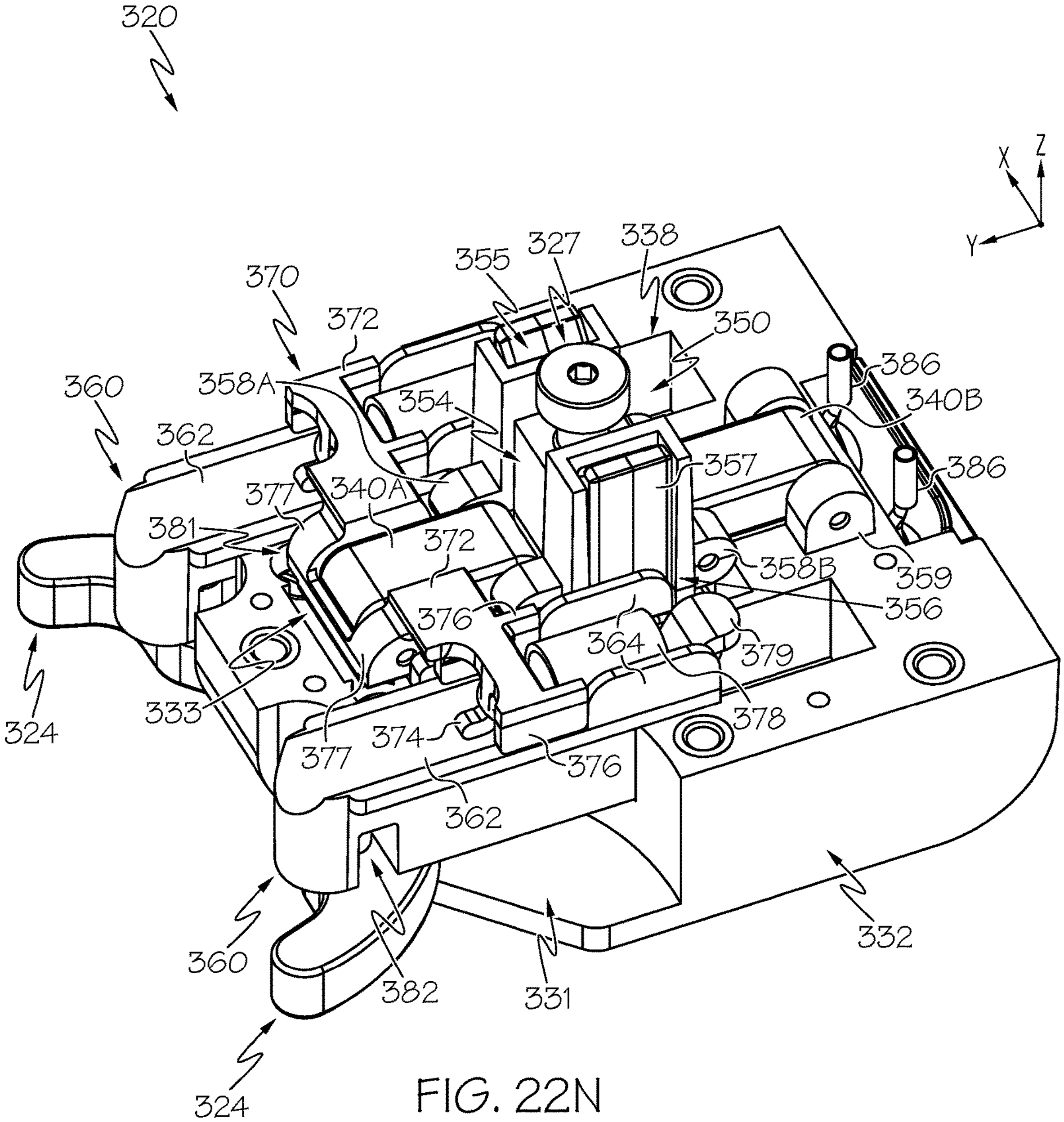
Figure 220:
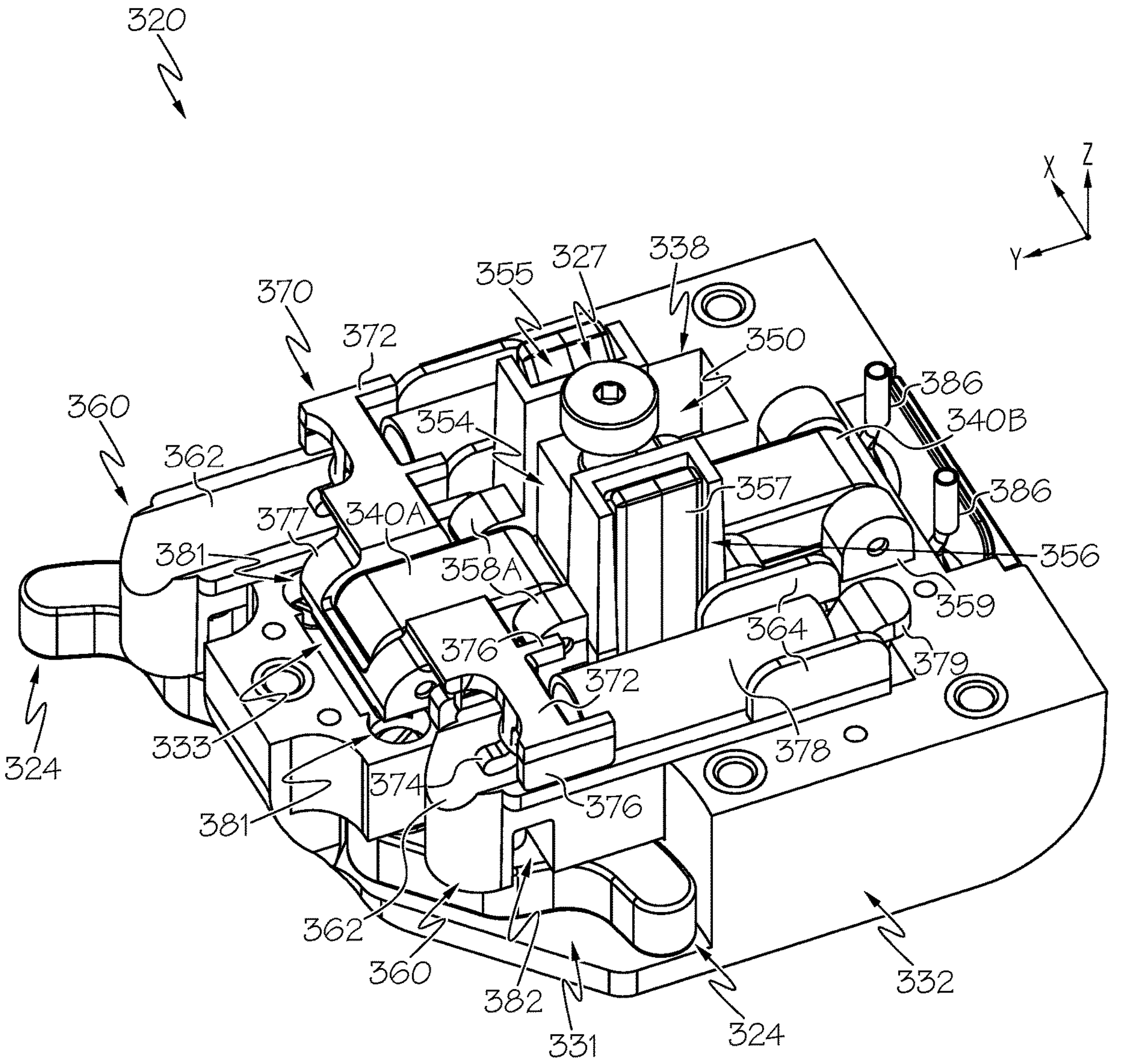
Figure 22P:
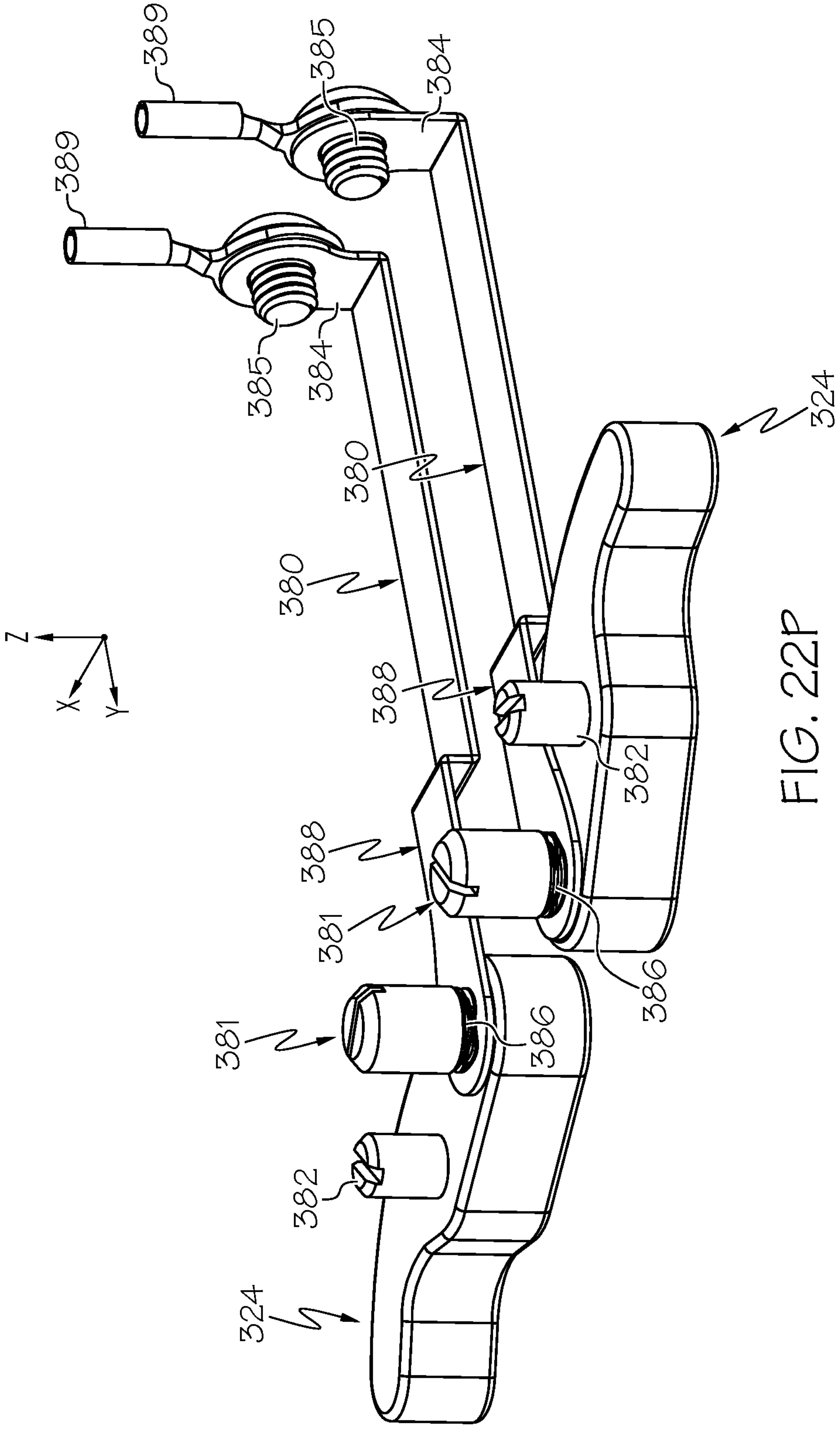

FIGS. 22A-22P illustrate another example cot charging assembly 320. As described in more detail below, in this embodiment charging pins 324 are rotated between an engaged and disengaged state. Referring particularly, to FIG. 22A, the example cot charging assembly 320 generally includes an outer housing 322 (also referred to herein as a first housing or an upper body), an inner housing 330 (also referred to herein as a second housing or inner body) and a pair of charging pins 324. The outer housing 322 includes a mounting portion 326, which is configured as a mounting bracket having holes that align with a holes of a component of the fastener post assembly, such as rear plate 136 of the fastener post assembly 110 illustrated by FIGS. 11-15.

The outer housing 322 is coupled to the inner housing 330 such that the inner housing 330 is positioned within a recess 346 (see FIG. 22K) and is free to translate toward an interior 343 surface of the outer housing 322 within the recess 346 along the Z-axis. The pair of charging pins 324 are positioned within a pair of charging pin notches 331 of the inner housing 330. When the inner housing 330 is pressed into the recess 346 of the outer housing 322, such as by contact with the surface of the fastener mounted within an emergency vehicle, the arcuate charging pins 324 pivot outward and toward one another such that they extend out of the charging pin notches 331 in the positive Y-axis direction. Thus, the inner housing 330 acts as the actuator portion of the cot charging assembly 320.

FIGS. 22B and 22C illustrate the cot charging assembly 320 of FIG. 22A in a disengaged state (i.e., a non-actuated state) by a perspective view and a bottom view, respectively. In the disengaged state, the charging pins 324 are retracted into the charging pin notches 331 of the inner housing 330. In this state they are protected from getting caught on other components or objects as they are not exposed. As described in more detail below, each charging pin 324 is coupled to a push block 360 that pushes the charging pins 324 so that they pivot into the engaged position.

FIGS. 22D and 22E illustrate the cot charging assembly 320 of FIG. 22A in a partially engaged state (i.e., a partially actuated state) by a perspective view and a bottom view, respectively. In this state, a force is pressing the inner housing 330 into the recess 346 of the outer housing 322 as indicated by the arrow in FIG. 22D. This force may be provided by the bottom surface of the inner housing 330 contacting the surface of a fastener within an emergency vehicle. Thus, this contact between the cot charging assembly 320 and the fastener causes the charging pins 324 to be deployed. As described in more detail below, translation of the inner housing 330 in the positive Z-axis direction causes the push blocks 360 to translate in the positive Y-axis direction, which pivots the charging pins 324 out of the charging pin notches 331. As shown by FIGS. 22D and 22E, the charging pins 324 are partially deployed out of charging pin notches 331 because the inner housing 330 is only partially translated into the recess 346 of the outer housing 322.

FIGS. 22F and 22G illustrate the cot charging assembly 320 of FIG. 22A in a partially engaged state (i.e., a partially actuated state) by a perspective view and a bottom view, respectively. In this state, the force as indicated by the arrow has fully pressed the inner housing 330 into the recess 346 of the outer housing 322, which causes the push blocks 360 to be fully translated along the positive Y-axis to fully pivot/extend the charging pins 324. In this state, the charging pins 324 contact the contacts 210 of the fastener (see FIG. 19) to provide electrical current between the charging pins 324 and the contacts 210 for charging of the cot battery.

In some embodiments, after the charging pins 324 are fully extended, the inner housing 330 can move further into the outer housing 322 to allow for over-travel to adjust for different heights that the cot charging assembly may encounter. For example, fasteners may have different configurations resulting in different heights. The ability for the inner housing 330 to further travel within the recess 346 of the outer housing 322 accounts for such height differences. FIG. 22H provides a side view of the cot charging assembly 320 when inner housing 330 is translated enough into the outer housing 322 to fully extend the charging pins 324. FIG. 22I illustrates a side view side view of the cot charging assembly 320 when inner housing 330 is translated into the outer housing 322 beyond a distance to fully extend the charging pins 324. In this position, fasteners 325 (e.g., bolts) are pushed through openings in the top surface of the outer housing 322 such that a portion of their length is exposed. The area of the motion illustrated by FIG. 22I may have a higher spring rate to allow engagement of the pins first and then further travel of the inner housing 330.

Internal components of the example cot charging assembly 320 will now be described. Referring to FIG. 22J, the cot charging assembly 320 is illustrated in a perspective view showing the outer housing 322 removed. The inner housing 330 of the example cot charging assembly 320 includes a first inner housing 332 (also referred to herein as a lower inner housing) and a second inner housing 334 (also referred to herein as an upper inner housing). The second inner housing 334 is secured to the first inner housing 332 to trap the push blocks 360 such that they may translate along the Y-axis in recesses between the first inner housing 332 and the second inner housing 334. The first inner housing 332 may be secured to the second inner housing 334 by any means, such as by adhesive, by welding, or by fasteners such as screws as shown in FIG. 22J.

The second inner housing 334 has a plurality of posts 335 that extend from a surface in the positive Z-axis direction. These posts 335 are provided to guide the inner housing 330 as it translates within the outer housing 322 along the Z-axis. FIG. 22K illustrates a bottom perspective view of the outer housing 322. The outer housing 322 defines a recess 346 into which the inner housing 330 is positioned. The outer housing 322 further includes a plurality of holes 345 (e.g., blind bores) within an interior surface 343. When assembled, the plurality of posts 335 are disposed within the plurality of holes 345. The depth of the plurality of holes 345 with respect to the length of the plurality of posts 335 is such that the inner housing 330 is free to travel up and down within the recess 346 along the Z-axis.

FIG. 22L illustrates a top perspective view of the first inner housing 332. The first inner housing 332 includes a linkage recess 333 for receiving a first linkage 340A as described in more detail below. The first inner housing 332 further includes a pair of push block channels 338 that receive the pair of push blocks 360. The pair of push blocks 360 are operable to translate within the push block channels 338 along the Y-axis when the inner housing 330 is translated with respect to the outer housing 322 along the Z-axis. The first inner housing 332 also includes a guide seat 361 for receiving a guide post 350 and a guide member having a pair of guide arms 357 (see FIG. 22M) that are described in more detail below. The dimension of the guide seat 361 along the Y-axis is such that the guide post 350 and the pair of guide arms 357 may translate back and forth along the Y-axis within the guide seat 361. A pair of linkage mounts 359 are also provided on the surface of the first inner housing 332 to pivotally couple a second linkage 340B to the first inner housing 332, as described below with respect to FIG. 22M.

Referring once again to FIG. 22J, the pair of charging pin notches 331 are formed within the first inner housing 332. Further, the pair of push blocks 360 are partially positioned within a space formed by the pair of charging pin notches 331 and between the first inner housing 332 and the second inner housing 334, as well as within push block channels 338. The second inner housing 334 further includes an opening for various components to protrude from, such as linkages 340A, 340B and a guide post 350, which are described in more detail below.

The cot charging assembly 320 further includes a mounting plate 336 that is coupled to the outer housing 322 by way of fasteners 325 in a manner such that the mounting plate 336 is free to move with respect to the outer housing 322 in the Z-axis direction. The fasteners are secured at wings 348 of the mounting plate 336. In the illustrated embodiment, a pair of biasing springs 329 are positioned around the fasteners 325, and are captured between the mounting plate 336 and the interior surface 343 of the outer housing 322. The pair of biasing springs 329 bias the inner housing 330 away from the outer housing 322 and into the non-engaged state with the charging pins 324 stowed within the pin notches 331.

The mounting plate 336 includes a raised central rib 337 that is higher in elevation on the Z-axis than the wings 348. The raised central rib 337 includes a slot 339 through which fastener 327 is positioned. Fastener 327 is secured (e.g., by a threaded connection) with the guide post 350. The guide post 350 is loosely secured to the mounting plate 336 by fastener 327 such that the guide post 350 is free to travel along the Y-axis due to the length of the slot 339. Thus, fastener 327 travels within the slot 339 when the inner housing 330 is translated with respect to the outer housing 322 along the Z-axis direction.

Referring now to FIG. 22M, the cot charging assembly 320 is illustrated with the mounting plate 336 removed. FIG. 22M illustrates the cot charging assembly 320 in the disengaged state where the charging pins 324 are retracted. A pair of guide arms 357 (only one is visible in FIG. 22M) may be formed by a U-shaped member, the bottom of which is positioned within the guide seat 361 of the first inner housing 332. The guide post 350 includes a pair of guides 355 or channels that receive the pair of guide arms 357. The pair of guide arms 357 are free to translate within the pair of guides 355 along the Z-axis. As shown in FIG. 22J, the pair of guide arms 357 are positioned through openings 363 of the mounting plate 336.

The guide post 350 further includes a pair of first linkage mounts 358A and a pair of second linkage mounts 358B. The second linkage 340B is coupled to the pair of second linkage mounts 358B as well as the linkage mounts 359 on the surface of the first inner housing 332. Thus, the second linkage 340B is pivotally coupled to both the guide post 350 and the first inner housing 332. The first linkage 340A is pivotally coupled to the guide post 350 at the pair of first linkage mounts 358A.

The pair of push blocks 360 is disposed within the pair of push block channels 338. Each push block 360 has a spring channel 362 and a pair of wall stops 364. A pin spring 378 is positioned within each spring channel 362 and between the pair of wall stops 364.

The example cot charging assembly further includes a pin engagement member 370 comprising a pair of pin engagement wings 372 extending from a pair of third linkage mounts 375. The first linkage 340A is pivotally coupled to the pin engagement member 370 at the pair of third linkage mounts 375. Thus, the first linkage 340A is pivotally coupled to both the pin engagement member 370 and the guide post 350. The pair of third linkage mounts 375 is loosely disposed within the linkage recess 333 such that a portion of the pair of third linkage mounts 375 rest on a pair of ledges 377.

A portion of each pin engagement wing 372 extends over a respective push block 360. Each pin engagement wing 372 includes a spring coupling member 374, such as a hook, that extends into the spring channel 362 of the respective push block 360. The spring coupling member 374 is coupled to a pin spring 378, such as by a spring hook or a spring loop, for example. The other end of the spring is coupled to a rear of the push block 360 at a spring tab 379.

Each pin engagement wing 372 also includes a pair of side walls 376. The pin spring 378 pulls the pin engagement wing 372 in the negative Y-axis direction such that the pair of side walls 376 of the pin engagement wing 372 is pressed against the pair of wall stops 364 of the push block 360.

Each charging pin 324 includes a hinge pin 381 and a push pin 382 (see FIG. 22P). The hinge pins 381 are pivotally disposed within openings of the first inner housing 332, while the push pins 382 are pivotally disposed within an opening of the push blocks 360.

FIG. 22N provides the same view of the cot charging assembly 320 as FIG. 22M but with the cot charging assembly 320 in an engaged state, and with the charging pins 324 fully extended. The cot charging assembly 320 transitions from the disengaged state as shown in FIG. 22M to an engaged state as shown in FIG. 22N by applying a force urging the inner housing 330 (including the first inner housing 332) in the positive Z-axis direction toward the outer housing 322. This force may be the bottom of the inner housing 330 contacting a surface of a fastener mounted in the cargo area of a vehicle, for example. Movement of the first inner housing 332 in the positive Z-axis direction causes the pair of guide arms 357 to move upward in the positive Z-axis direction. At the same time, the location of the pair of third linkage mounts 375 within the linkage recess 333 causes the first linkage 340A to pivot about the pair of first linkage mounts 358A and also advance the pair of third linkage mounts 375 on the pair of ledges 377 within the linkage recess 333 in the positive Y-axis direction. Further, the second linkage 340B pivots about the linkage mounts 359 on the first inner housing 332, which pushes the pair of second linkage mounts 358B in the positive Y-axis direction. The pivoting of both the first linkage 340A and the second linkage 340B is operable to translate the guide post 350, the pair of guide arms 357, the pin engagement member 370 and the pair of push blocks 360 in the positive Y-axis direction. The slot 339 (FIG. 22J) within the mounting plate 336 allows fastener 327, the guide post 350 and the pair of guide arms 357 to translate along the Y-axis.

Movement of the push blocks 360 in the positive Y-axis direction pushes on the push pins 382 of the pair of charging pins 324, which causes the pair of charging pins 324 to rotate about the hinge pins 381 within the first inner housing 332. In this manner, the charging pins 324 are pivoted into their engaged state. When the force is removed from the inner housing 330, the inner housing 330 is urged in a direction away from the outer housing 322 by the pair of biasing springs 329 (FIG. 22J), which causes the guide post 350 and the pair of guide arms 357 to translate in the negative Y-axis direction into the position shown in FIG. 22M.

Each charging pin 324 is independently moveable with respect to the other. Referring now to FIG. 22O, the cot charging assembly 320 is shown in the engaged state (i.e., the inner housing 330 is pushed into the recess of the outer housing 322) with one of the charging pins 324 pulled back into the charging pin notch 331. Rotating the charging pin 324 back in the negative Y-axis direction causes the corresponding push block 360 to also be pushed back in the negative Y-axis direction due to the push pin 382. In this state the pin engagement member 370 remains static in its position on the Y-axis. Thus, the pin spring 378 is put into tension as the distance between the spring coupling member 374 and the spring tab 379 is increased. Release of the charging pin 324 causes it to spring back to the engaged state due to the pin spring 378 returning to its compressed state. The ability for the charging pins 324 to independently move assists in overcoming misalignment when the cot is positioned within the fastener of the emergency vehicle, for example.

Referring now to FIG. 22P, the pair of charging pins 324 and a pair of conductor members 380 are illustrated. The pair of charging pins 324 and the pair of conductor members 380 are each fabricated from an electrically conductive material, such as, without limitation, steel, aluminum, and copper. In the illustrated embodiment, each conductor member 380 comprises a pin lug connector 388 and a wire lug connector 384. The lug connectors 388 are disposed between the hinge pins 381 and the charging pins 324. A conductor spring 386 may be disposed between the pin lug connector 388 and the hinge pin 381 to ensure electrical contact between the pin lug connector 388 and the charging pin 324 in some embodiments. The wire lug connectors 384 are coupled to lugs 389 of conductive wires (not shown) that are electrically coupled to a battery of the cot by fasteners 385, for example. It should be understood that other means of electrically coupling the charging pins 324 to the battery of the cot are possible.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A directional wheel lock assembly comprising:

a pedal;

a linking rod coupled to the pedal;

an actuation plunger comprising an upper opening;

an actuation pin disposed through the upper opening of the actuator plunger, wherein the linking rod is coupled to an end of the actuation pin;

an actuation plate comprising a recess and an opening within the recess, wherein the actuation plunger is positioned within the opening; and a wheel lock plate comprising a lock opening, wherein the wheel lock plate is operable to be coupled to a wheel.

2. The directional wheel lock assembly of claim 1, wherein:

actuation of the pedal into a locked position pushes the linking rod such that the linking rod rotates the actuation pin, which causes the actuation pin to drop into the recess and lower the actuation plunger into the lock opening of a wheel lock plate to prevent a swivel motion of the wheel, and actuation of the pedal into an unlocked position pulls the linking rod such that the linking rod rotates the actuation pin, which causes the actuation pin to raise out of the recess and raise the actuation plunger from the lock opening of the wheel lock plate to allow the swivel motion of the wheel.

3. The directional wheel lock assembly of claim 1, wherein the wheel lock plate comprises a tapered wall that in part defines the recess.

4. The directional wheel lock assembly of claim 3, wherein the actuation pin slides along the tapered wall when transitioning between the locked position and the unlocked position.

5. The directional wheel lock assembly of claim 1, wherein the actuation plunger has an end having a shape that corresponds with a shape of the lock opening.

6. The directional wheel lock assembly of claim 1, wherein the actuation pin is orthogonal to the actuation plunger.

7. The directional wheel lock assembly of claim 1, further comprising a second pedal, a second linking rod, a second actuation plunger, a second actuation pin, a second actuation plate, a second wheel lock plate, and a cross-bar, wherein the cross-bar is coupled to the first pedal and the second pedal such that actuation of one of the first pedal and the second pedal actuates the other of the first pedal and the second pedal.

8. The directional wheel lock assembly of claim 1, wherein the linking rod comprises a bent portion that is bent around a portion of the actuation plate having the recess.

9. The directional wheel lock assembly of claim 1, wherein the linking rod is such that the pedal is operable to be offset from the wheel by a distance that is greater than or equal to ten centimeters.

10. A wheeled device comprising:

a frame;

a base frame coupled to the frame;

a first pair of wheels coupled to the frame and a second pair of wheels coupled to the frame;

a directional wheel lock assembly comprising:

a pedal;

a linking rod coupled to the pedal such that the pedal is configured to be offset from a wheel;

an actuation plunger comprising an upper opening;

an actuation pin disposed through the upper opening of the actuator plunger, wherein the linking rod is coupled to an end of the actuation pin;

an actuation plate comprising a recess and an opening within the recess, wherein the actuation plunger is positioned within the opening; and a wheel lock plate comprising a lock opening, wherein the wheel lock plate is operable to be coupled to a wheel.

11. The wheeled device of claim 10, wherein:

actuation of the pedal into a locked position pushes the linking rod such that the linking rod rotates the actuation pin, which causes the actuation pin to drop into the recess and lower the actuation plunger into the lock opening of a wheel lock plate to prevent a swivel motion of the wheel, and actuation of the pedal into an unlocked position pulls the linking rod such that the linking rod rotates the actuation pin, which causes the actuation pin to raise out of the recess and raise the actuation plunger from the lock opening of the wheel lock plate to allow the swivel motion of the wheel.

12. The wheeled device of claim 10, wherein the wheeled device is an emergency cot.

13. The wheeled device of claim 10, wherein the wheel lock plate comprises a tapered wall that in part defines the recess.

14. The wheeled device of claim 13, wherein the actuation pin slides along the tapered wall when transitioning between the locked position and the unlocked position.

15. The wheeled device of claim 10, wherein the actuation plunger has an end having a shape that corresponds with a shape of the lock opening.

16. The wheeled device of claim 10, wherein the actuation pin is orthogonal to the actuation plunger.

17. The wheeled device of claim 10, wherein the directional wheel lock assembly further comprises a second pedal, a second linking rod, a second actuation plunger, a second actuation pin, a second actuation plate, a second wheel lock plate, and a cross-bar, wherein the cross-bar is coupled to the first pedal and the second pedal such that actuation of one of the first pedal and the second pedal actuates the other of the first pedal and the second pedal.

18. The wheeled device of claim 10, wherein the linking rod comprises a bent portion that is bent around a portion of the actuation plate having the recess.

19. The wheeled device of claim 10, wherein the linking rod is such that the pedal is operable to be offset from the wheel by a distance that is greater than or equal to ten centimeters.

* * * * *